United States Patent
Suzuki et al.

(10) Patent No.: US 8,118,012 B2
(45) Date of Patent: Feb. 21, 2012

(54) INTERNAL COMBUSTION ENGINE USING HYDROGEN

(75) Inventors: Makoto Suzuki, Mishima (JP);
Tomohiro Shinagawa, Sunto-gun (JP);
Masahiko Masubuchi, Mishima (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 1020 days.

(21) Appl. No.: 12/066,161

(22) PCT Filed: Sep. 14, 2006

(86) PCT No.: PCT/IB2006/002524
§ 371 (c)(1),
(2), (4) Date: Mar. 7, 2008

(87) PCT Pub. No.: WO2007/031848
PCT Pub. Date: Mar. 22, 2007

(65) Prior Publication Data
US 2008/0223344 A1 Sep. 18, 2008

(30) Foreign Application Priority Data

| Sep. 15, 2005 | (JP) | 2005-268913 |
| Sep. 16, 2005 | (JP) | 2005-270171 |
| Sep. 16, 2005 | (JP) | 2005-270327 |
| Apr. 5, 2006 | (JP) | 2006-104561 |

(51) Int. Cl.
*F02M 21/02* (2006.01)
(52) U.S. Cl. ........ 123/525; 123/3; 123/DIG. 12
(58) Field of Classification Search .......... 123/1 A, 123/3, DIG. 12, 575, 576, 577, 578, 525
See application file for complete search history.

(56) References Cited

U.S. PATENT DOCUMENTS

| 4,528,947 A * | 7/1985 | Olivera .................... 123/3 |
| 4,570,578 A * | 2/1986 | Peschka et al. .......... 123/1 A |
| 5,372,617 A * | 12/1994 | Kerrebrock et al. ........ 48/61 |
| 5,887,554 A | 3/1999 | Cohn et al. |
| 6,401,445 B1 * | 6/2002 | Demetri .................... 60/776 |
| 6,615,940 B2 * | 9/2003 | Morisawa ................. 180/65.1 |
| 6,739,350 B1 * | 5/2004 | Op De Beeck et al. ..... 137/202 |
| 6,946,104 B2 * | 9/2005 | Rusta-Sallehy et al. .... 422/198 |
| 7,021,249 B1 | 4/2006 | Christison |
| 7,228,841 B2 * | 6/2007 | Takemoto et al. ......... 123/304 |
| 7,401,578 B2 | 7/2008 | Otterstrom et al. |
| 7,775,196 B2 * | 8/2010 | Suzuki et al. ............. 123/538 |
| 7,789,047 B2 * | 9/2010 | Kuroki et al. ............... 123/3 |

(Continued)

FOREIGN PATENT DOCUMENTS

JP 57-66267 U 4/1982

(Continued)

*Primary Examiner* — Michael Cuff
*Assistant Examiner* — Long T Tran
(74) *Attorney, Agent, or Firm* — Oblon, Spivak, McClelland, Maier & Neustadt, L.L.P.

(57) ABSTRACT

In an internal combustion engine using hydrocarbon fuel and hydrogen gas as fuels and including a fuel injection device that injects liquid fuel, a hydrogen-blended fuel in which hydrogen gas is contained in the form of minute bubbles in a liquid hydrocarbon fuel, that is supplied to the fuel injection device. The hydrogen-blended fuel is stored in a fuel tank. Hydrogen gas that has escaped from the hydrogen-blended fuel in the fuel tank is fed to a minute-bubble producing device, which forms the fuel gas into minute bubbles and mixes the minute bubbles back into the hydrogen-blended fuel.

26 Claims, 25 Drawing Sheets

U.S. PATENT DOCUMENTS

| | | | |
|---|---|---|---|
| 2001/0008192 A1* | 7/2001 | Morisawa | 180/197 |
| 2002/0104697 A1* | 8/2002 | Hatanaka | 180/65.4 |
| 2002/0185086 A1 | 12/2002 | Newman et al. | |
| 2003/0008183 A1* | 1/2003 | Hsu | 429/13 |
| 2003/0056510 A1 | 3/2003 | Ovshinsky et al. | |
| 2003/0082424 A1* | 5/2003 | Kohrs et al. | 429/27 |
| 2004/0255873 A1* | 12/2004 | Cueman et al. | 123/1 A |
| 2006/0090712 A1 | 5/2006 | Ehresman | |
| 2006/0101823 A1* | 5/2006 | Takemoto et al. | 60/716 |

FOREIGN PATENT DOCUMENTS

| | | |
|---|---|---|
| JP | 60-33992 | 8/1985 |
| JP | 61 35066 | 2/1986 |
| JP | 4-8853 | 1/1992 |
| JP | 2002 98009 | 4/2002 |
| JP | 2002-156102 | 5/2002 |
| JP | 2002-227712 | 8/2002 |
| JP | 2003-20487 | 1/2003 |
| JP | 2003 293809 | 10/2003 |
| JP | 2004 100501 | 4/2004 |
| JP | 2005-240657 A | 9/2005 |
| JP | 2005 245817 | 9/2005 |
| WO | 02 090749 | 11/2002 |
| WO | WO 02/090743 A1 | 11/2002 |

* cited by examiner

F I G . 2
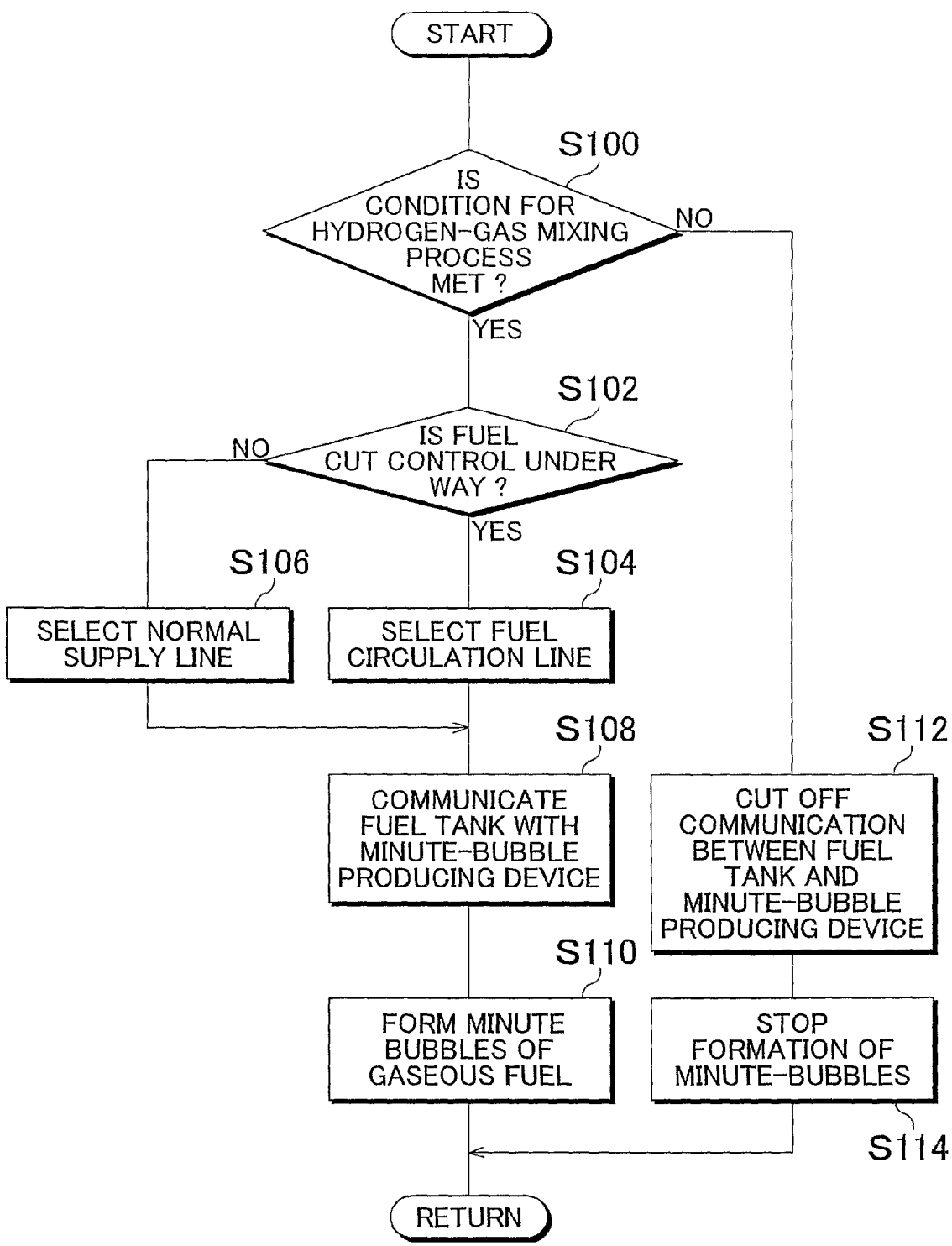

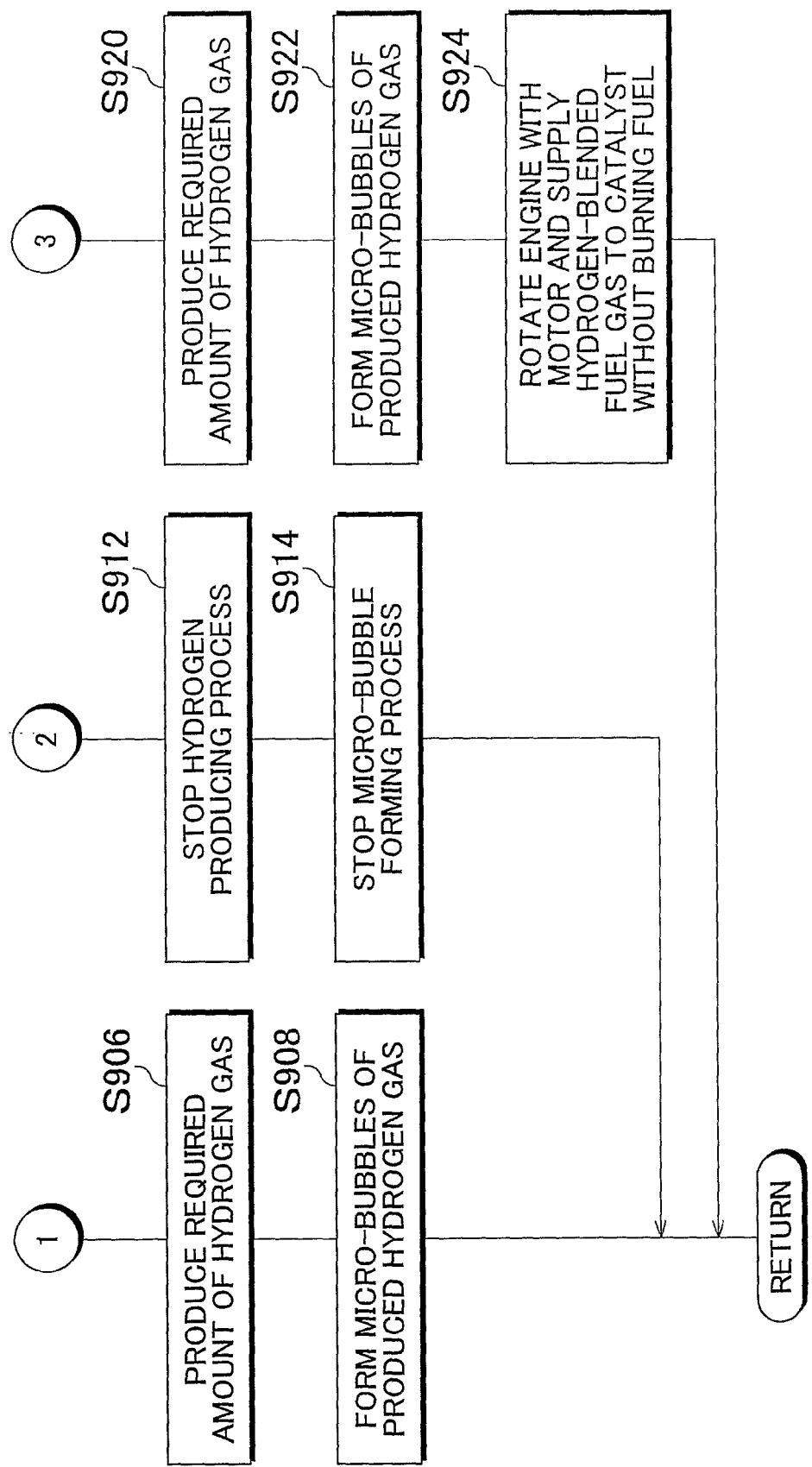

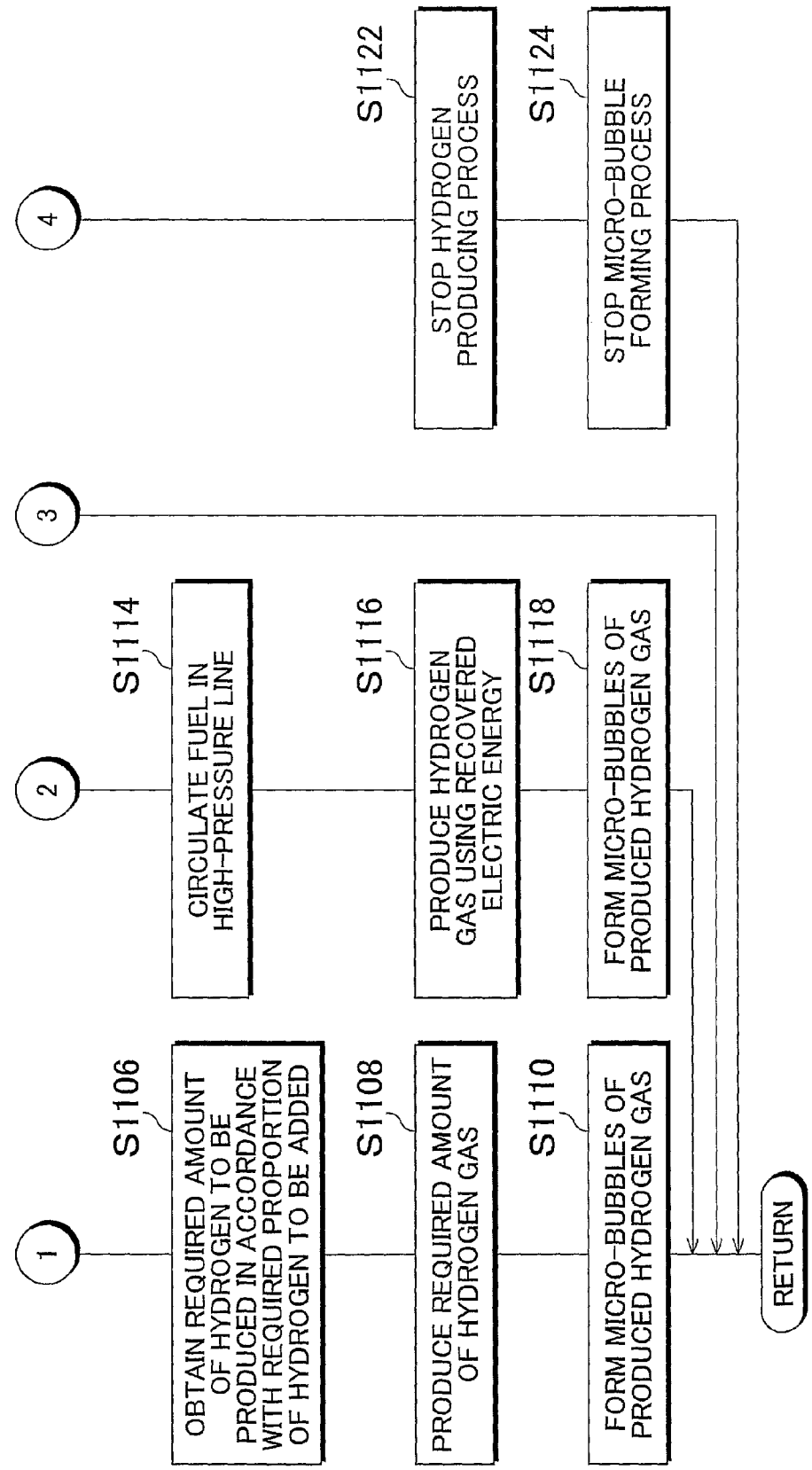

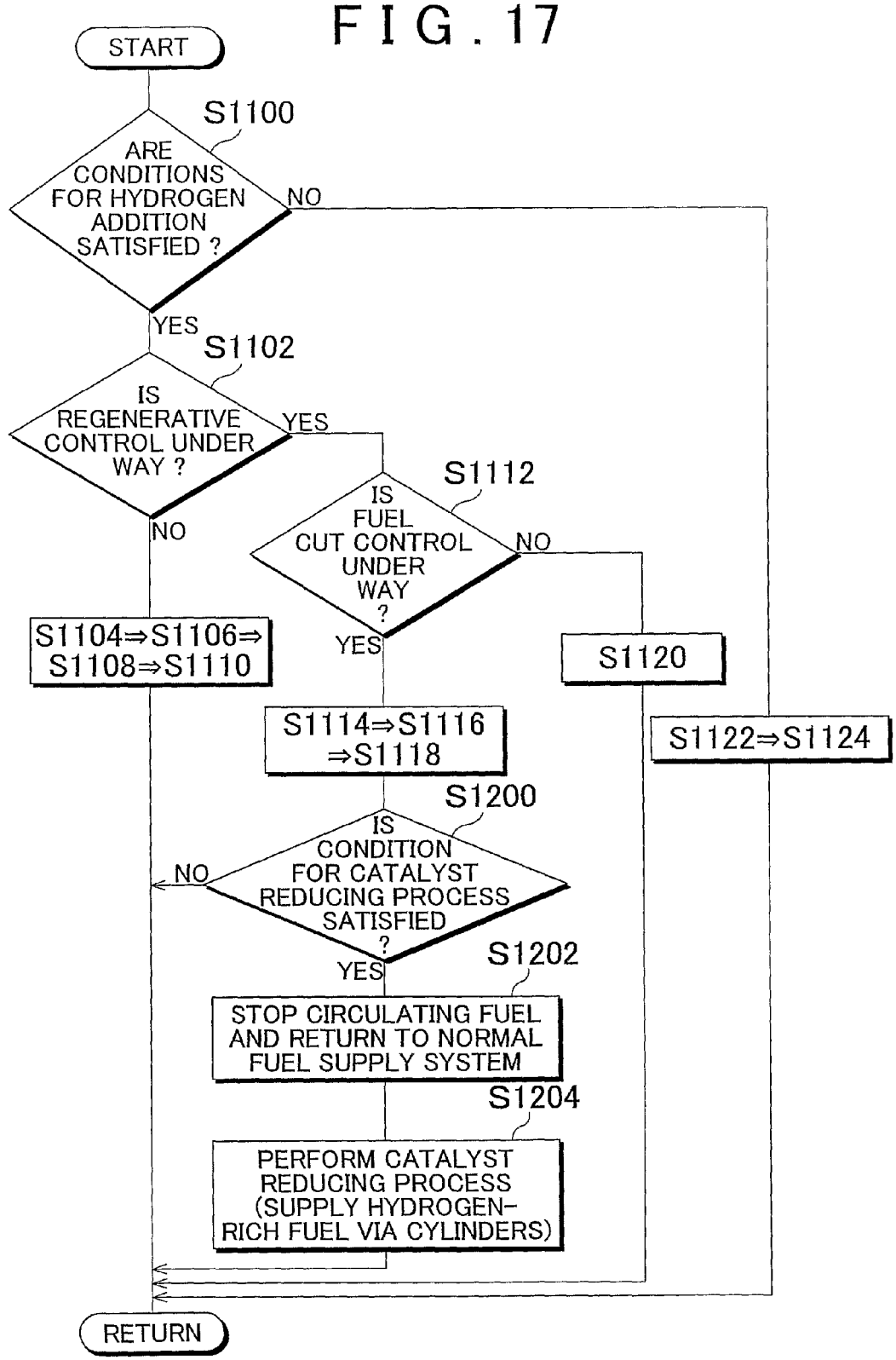

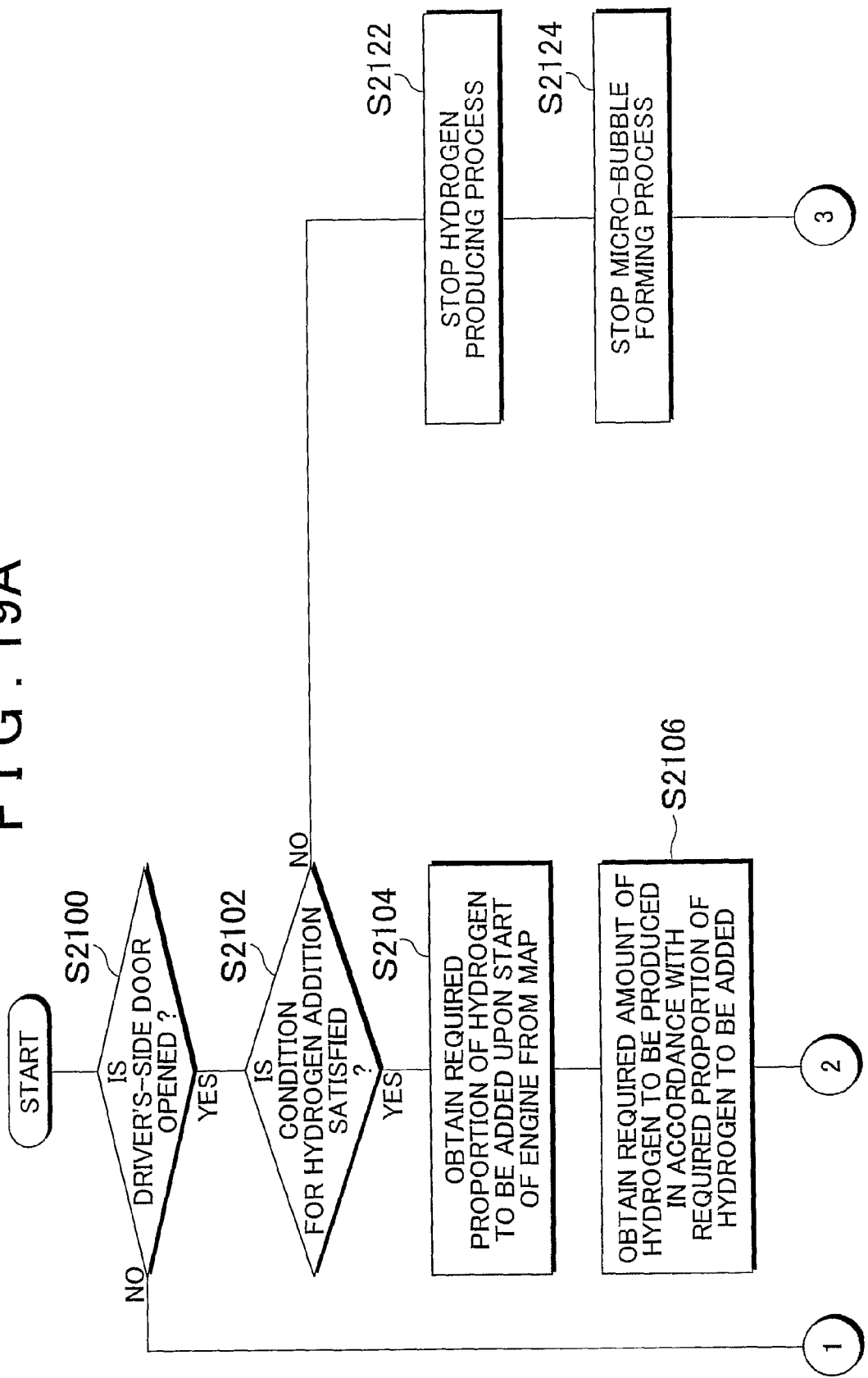

INTERNAL COMBUSTION ENGINE USING HYDROGEN

TECHNICAL FIELD

The invention relates to a hydrogen-using internal combustion engine, which is capable of using a hydrocarbon fuel and hydrogen gas as fuels.

BACKGROUND ART

Internal combustion engines (hydrogen-using internal combustion engines) are known which use hydrogen gas as a fuel, in addition to a hydrocarbon base fuel, such as gasoline. Hydrogen gas has higher combustibility than hydrocarbon fuel. Thus, addition of hydrogen gas to hydrocarbon fuel allows the engine to operate in an expanded lean-burn region at a low load, thus providing noticeable effects, for example, improved fuel economy and reduction in the amount of NOx emissions. When the engine operates at a high load, on the other hand, addition of hydrogen gas to hydrocarbon fuel makes it possible to suppress knocking and improve the engine power output to maintain the accelerating ability of the vehicle.

One example of such hydrogen-using internal combustion engines is described in Japanese Laid-open Patent Publication 2003-293809. The hydrogen-using engine described in this publication includes an injector that injects a liquid hydrocarbon fuel and a hydrogen tank connected to the injector via a hydrogen-supply line, and is arranged such that the hydrocarbon fuel and hydrogen gas can be simultaneously injected from the injector in single injection event.

In the above-described hydrogen-using internal combustion engine, two fuel supply lines, namely a hydrogen gas supply line and a hydrocarbon fuel supply line through which hydrogen gas and the hydrocarbon fuel are respectively supplied to the injector, are separately provided. This arrangement complicates the engine system considerably, which reduces efficiency in the installation of the system on the vehicle due to an increased number of components, and increases manufacturing cost, relative to an internal combustion engine that only uses hydrocarbon fuel.

The known hydrogen-using engine as described above uses the hydrogen tank as a means for accommodating hydrogen gas. It is, however, to be noted that hydrogen gas as a gaseous fuel exhibits poor installation or storage efficiency when installed on the vehicle, as compared with a liquid fuel, such as gasoline. In recent years, it has been proposed to produce hydrogen gas from a liquid hydride on the vehicle, so that hydrogen can be stored in a liquid state (in the form of a liquid hydride) having high installation efficiency.

As a method of producing hydrogen gas from a liquid hydride, various methods have been proposed which include, for example, electrolysis, decomposition of the liquid hydride using low-temperature plasma (as described in JP-A-2001-335302), and reduction of the liquid hydride using a metal in a highly active state (as described in JP-A-2004-123517 and JP-A-2003-212501).

In any of the above-indicated methods, a large quantity of electric energy is needed to produce hydrogen gas from a liquid hydride. The electric energy used for producing hydrogen gas may be readily supplied from an on-board (or vehicle-mounted) battery. It is, however, necessary for the engine to drive an alternator so as to charge the battery with electric energy, and, in this case, the amount of fuel consumed by the engine is increased accordingly. Thus, securing electric energy for producing hydrogen gas will be of great importance, in order to achieve high energy-efficiency while yielding advantageous effects from addition of hydrogen to the liquid fuel.

In any of the above-indicated methods of producing hydrogen gas, it takes some time for the produced hydrogen gas to reach the injector. If hydrogen gas is going to be injected from the injector immediately after the engine is started, there is a need to store hydrogen gas in such an amount as to be used immediately after start of the engine. While a tank may be used as a means for storing hydrogen gas, storage of hydrogen gas in the tank is the least desirable in view of the efficiency or easiness with which the tank is installed on the vehicle.

SUMMARY OF THE INVENTION

The invention provides a hydrogen-using internal combustion engine that uses hydrogen gas as a fuel, in addition to a hydrocarbon fuel, without making the engine system complicated. The invention also provides a hydrogen-using internal combustion engine, which produces hydrogen gas to be blended into a hydrocarbon fuel by utilizing deceleration energy of the vehicle (i.e., energy generated during deceleration of the vehicle), thereby to achieve high energy-efficiency. The invention further provides a hydrogen-using internal combustion engine in which a hydrocarbon fuel is blended with hydrogen gas and injected immediately after start of the engine, without requiring a separate tank for storing hydrogen gas.

According to a first aspect of the invention, a hydrogen-using internal combustion engine comprises a fuel injection device that injects a hydrocarbon fuel, and fuel supplying means for supplying the fuel injection device with a hydrogen-blended fuel, in which hydrogen gas is contained in the form of minute bubbles in a liquid hydrocarbon fuel.

In the first aspect of the invention, hydrogen gas is present in the hydrogen-blended in the form of minute bubbles in the liquid hydrocarbon fuel that is used as a fuel of the engine. Thus, the engine may use hydrogen gas as a fuel in addition to the hydrocarbon fuel, without making the engine system complicated, or without requiring a complicated system as used in the case where hydrogen gas and a hydrocarbon fuel are supplied to a fuel injection device via separate fuel supply lines.

In one embodiment of the first aspect of the invention, the fuel supplying means comprises a fuel tank in which the hydrogen-blended fuel is stored, and a mixing means for forming a hydrogen gas escaped from the hydrogen-blended fuel in the fuel tank into minute bubbles and mixing the minute bubbles of the fuel gas back into the hydrogen-blended fuel.

According to the above embodiment, hydrogen gas is contained in the form of minute bubbles and thus blended into the hydrocarbon fuel, which makes it unnecessary to provide a means for accommodating hydrogen gas separately from the hydrocarbon fuel, and simplifies the engine system. Even if hydrogen gas escapes from the hydrogen-blended fuel as it is left standing for a long period of time, the escaped hydrogen gas can be mixed in the form of minute bubbles back into the fuel, thus assuring a steady concentration of hydrogen in the hydrogen-blended fuel supplied to the engine.

In the above embodiment of the invention, the mixing means may mix the escaped fuel gas back into the hydrogen-blended fuel during supply of the fuel to the fuel injection device, in a fuel supply passage that connects the fuel tank with the fuel injection device. With this arrangement, even if the concentration of hydrogen in the hydrogen-blended fuel in the fuel tank is reduced due to escape of hydrogen gas from the fuel, hydrogen-blended fuel having a specified hydrogen concentration can be injected from the fuel injection device.

In the above embodiment of the invention, the mixing means may mix the escaped fuel gas back into the hydrogen-blended fuel circulating in a fuel circulation passage through which the hydrogen-blended fuel delivered from the fuel tank returns to the fuel tank. With this arrangement, the hydrogen-blended fuel can be stably stored in the fuel tank for a long period of time, and hydrogen-blended fuel having a constant steady hydrogen concentration can be supplied from the fuel tank to the fuel injection device.

In another embodiment of the first aspect of the invention, the fuel supplying means comprises a fuel tank in which the liquid hydrocarbon fuel is stored, hydrogen producing means for producing hydrogen gas from the hydrocarbon fuel in the fuel tank, and mixing means for forming the hydrogen gas produced from the hydrocarbon fuel into minute bubbles and mixing the minute bubbles of the hydrogen gas into the hydrocarbon fuel.

According to the above embodiment, hydrogen gas to be mixed into the hydrocarbon fuel is produced from the hydrocarbon fuel. Thus, the engine does not require a storage means for accommodating hydrogen gas separately from the hydrocarbon fuel, and can be thus more simplified in construction.

In the above embodiment, the mixing means may mix the hydrogen gas produced from the hydrocarbon fuel into the hydrocarbon fuel during supply of the fuel to the fuel injection device, in a fuel supply passage that connects the fuel tank with the fuel injection device. Since the hydrogen gas is mixed into the hydrocarbon fuel while the fuel is being supplied to the fuel injection device, escape of hydrogen gas from the fuel can be minimized, and hydrogen-blended fuel having a steady hydrogen concentration can be injected from the fuel injection device.

In the above embodiment, the mixing means may mix the hydrogen gas produced from the hydrocarbon fuel into the hydrocarbon fuel circulating in a fuel circulation passage through which the hydrocarbon fuel delivered from the fuel tank returns to the fuel tank. In this case, the hydrocarbon fuel is reformed into a hydrogen-blended fuel, which is then returned to the fuel tank. Thus, the concentration of hydrogen in the hydrocarbon fuel stored in the fuel tank can be increased in advance.

In a further embodiment of the first aspect of the invention, regenerating means is provided for recovering deceleration energy of a vehicle to provide electric energy, and the hydrogen producing means produces hydrogen gas from the hydrocarbon fuel by utilizing the deceleration energy recovered by the regenerating means. By recovering the deceleration energy of the vehicle (i.e., the energy generated during deceleration of the vehicle) as electric energy and effectively utilizing the recovered deceleration energy for production of hydrogen gas, the engine of this embodiment achieves high energy-efficiency.

In another embodiment of the first aspect of the invention, the fuel supplying means comprises a storage means for accommodating a liquid hydride, a hydrogen producing means for producing hydrogen gas from the liquid hydride stored in the storage means, and a hydrogen mixing means for dissolving the hydrogen gas produced by the hydrogen producing means into the mixed fuel supplied to the fuel injection device. Furthermore, a judging means is provided for determining whether it is necessary to supply hydrogen gas to the internal combustion engine, and a control means is provided for activating the hydrogen producing means and the hydrogen mixing means when the judging means determines that it is necessary to supply hydrogen gas to the internal combustion engine.

According to the above embodiment, hydrogen is stored in the form of a liquid hydride, and hydrogen gas is produced from the liquid hydride when it needs to be supplied. This arrangement makes it unnecessary to store gaseous hydrogen in which hydrogen is difficult to handle and has poor installation efficiency. Since the produced hydrogen gas is blended into the liquid fuel and is supplied to the fuel injection device, gaseous hydrogen is treated only within a limited range, namely, from production of hydrogen gas to dissolving into the liquid fuel, and hydrogen can be injected in the form of a liquid, namely, as part of the liquid fuel. Thus, the engine of this embodiment does not require a complicated system as used in the case where gaseous hydrogen and liquid fuel are supplied to a fuel injection device via separate fuel supply lines, and gaseous hydrogen can be used as a fuel in addition to the liquid fuel, without making the system complicated.

In the above embodiment, the hydrogen mixing means may comprise means for producing minute bubbles of the hydrogen gas, and dissolve the minute bubbles of the hydrogen gas into the liquid fuel. Since hydrogen gas is formed into minute bubbles, which are then dissolved into the liquid fuel, the hydrogen gas can be uniformly dissolved in the liquid fuel, and dissolution of the hydrogen gas into the liquid fuel is promoted. Thus, the hydrogen gas is less likely to be escape from the liquid fuel during a period between dissolving of hydrogen gas into the liquid fuel and injection of the fuel. This makes it unnecessary to take measures against escaped hydrogen gas, thus simplifying the construction of the engine system.

In the above embodiment, hydrogen amount determining means may be provided for determining the amount of hydrogen required to be mixed into the liquid fuel when the judging means judges that it is necessary to supply the hydrogen gas to the internal combustion engine, and the control means may cause the hydrogen producing means to produce hydrogen gas in accordance with the required amount of hydrogen determined by the hydrogen amount determining means. With this arrangement, the required amount of hydrogen gas is produced when hydrogen gas needs to be supplied. Thus, the amount of hydrogen gas dissolved into the liquid fuel is neither larger nor smaller than the required amount, and, therefore, no buffer tank is required for accommodating a difference between the amount of hydrogen gas produced and the amount of hydrogen gas supplied, which simplifies the construction of the engine system.

In the above embodiment, the hydrogen amount determining means may determine the required amount of hydrogen to be dissolved, based on operating conditions of the internal combustion engine. In this case, hydrogen can be dissolved into the liquid fuel in the amount commensurate with the operating conditions of the engine.

In the above embodiment, the hydrogen amount determining means may determine the amount of hydrogen required to be dissolved, based on the properties of the liquid hydrocarbon fuel. In this case, hydrogen can be mixed into the liquid fuel in the proportion commensurate with the properties of the liquid hydrocarbon fuel.

In the above embodiment, the hydrogen amount determining means may determine the required amount of hydrogen to be dissolved, based on atmospheric conditions of the internal combustion engine. In this case, hydrogen can be dissolved into the liquid fuel in the proportion commensurate with the atmospheric conditions of the engine.

In the above embodiment, the hydrogen amount determining means may determine the required amount of hydrogen to be dissolved, based on conditions of a catalyst disposed in an exhaust passage of the internal combustion engine. In this case, hydrogen can be dissolved into the liquid fuel in the proportion commensurate with the conditions of the catalyst.

According to a second aspect of the invention, there is provided a control system of a hybrid vehicle including the hydrogen-using internal combustion engine as described above and a motor, the hybrid vehicle using at least the motor for driving the vehicle. In this control system, when the judging means judges that it is necessary to supply the hydrogen gas to the internal combustion engine, the motor forces the engine to rotate while combustion is stopped in the engine, and the hydrogen producing means and the hydrogen mixing means are operated so that the liquid fuel mixed with the hydrogen gas is injected from the fuel injection device.

According to the second aspect of the invention, when it is judged as being necessary to supply hydrogen gas for reduction or warm-up of the catalyst, the liquid fuel mixed with hydrogen gas can be fed to the exhaust passage, using a pumping action of the engine that is forcedly rotated by the motor, so as to effectively carry out a reducing process or warm-up process for the catalyst. Also, since the vehicle is able to run with the driving force of the motor even while combustion is being stopped in the engine, the reducing process or warm-up process for the catalyst can be performed when necessary.

In another embodiment of the first aspect of the invention, the fuel supplying means comprises a fuel tank in which the liquid fuel is stored, a hydrogen producing means for producing hydrogen gas from a liquid hydride by using electric energy, and a hydrogen mixing means for dissolving the hydrogen gas produced by the hydrogen producing means into the liquid fuel supplied from the fuel tank to the fuel injection device. Furthermore, a circulating means is provided for circulating the liquid fuel through the fuel tank and the hydrogen mixing means, and regenerating means is provided for recovering deceleration energy of a vehicle to provide electric energy. A control means is provided for activating the hydrogen producing means so as to produce hydrogen gas by utilizing the deceleration energy recovered by the regenerating means and activating the hydrogen mixing means so as to dissolve the produced hydrogen gas into the liquid fuel while causing the circulating means to circulate the liquid fuel, while the deceleration energy is being recovered by the regenerating means and fuel injection by the fuel injection device is being stopped.

According to the above embodiment of the invention, the deceleration energy of the vehicle (i.e., the energy generated during deceleration of the vehicle) is recovered as electric energy, and the recovered deceleration energy is effectively utilized for production of hydrogen gas, thus assuring high energy-efficiency. By dissolving the produced hydrogen gas into the liquid fuel, it is possible to supply liquid fuel mixed with hydrogen gas to the fuel injection device from the beginning when the fuel injection is resumed. Furthermore, hydrogen gas is dissolved into the liquid fuel that is circulating through the fuel tank and the hydrogen mixing means, so that a large amount of hydrogen gas can be stored in the liquid fuel.

In the above embodiment, the hydrogen mixing means may comprise a means for producing minute bubbles of the hydrogen gas and dissolving the minute bubbles of the hydrogen gas into the liquid fuel. Since hydrogen gas is formed into minute bubbles, which are then dissolved into the liquid fuel, dissolution of the hydrogen gas into the liquid fuel can be promoted, and a relatively large amount of hydrogen gas can be stored in the liquid fuel. As the amount of hydrogen gas that can be dissolved into the liquid fuel increases, the amount of hydrogen gas produced can be increased, and an increased amount of deceleration energy can be utilized for producing the hydrogen gas, thus assuring even higher energy efficiency.

In the above embodiment, the internal combustion engine may further include an ignition device that ignites an air-fuel mixture in a combustion chamber. When a condition for a reducing process for a catalyst provided in an exhaust passage of the engine is satisfied while the deceleration energy is being recovered by the regenerating means and fuel injection by the fuel injection device is being stopped, the above-indicated control means may inhibit the ignition device from igniting the air-fuel mixture and may cause the fuel injection device to inject the liquid fuel mixed with the hydrogen gas. In this manner, liquid fuel containing a large amount of hydrogen gas having a high reducing ability can be supplied as it is to the catalyst without being burned in the combustion chamber, thus permitting a reducing process for the catalyst to be effectively performed.

In the above embodiment, the fuel injection device may be arranged to inject the liquid fuel directly into the combustion chamber. When a condition for a reducing process for a catalyst provided in the exhaust passage is satisfied while the deceleration energy is being recovered by the regenerating means and fuel injection by the fuel injection device is being stopped, the above-indicated control means may cause the fuel injection device to inject the liquid fuel in such timing that the injected fuel does not burn in the combustion chamber. In this manner, liquid fuel containing a large amount of hydrogen gas having a high reducing ability can be supplied as it is to the catalyst without being burned in the combustion chamber, thus permitting a reducing process for the catalyst to be effectively performed.

In a still another embodiment of the first aspect of the invention, the fuel supplying means comprises a fuel tank in which the liquid fuel is stored, a hydrogen producing means for producing hydrogen gas from a liquid hydride, and a hydrogen mixing means for dissolving the hydrogen gas produced by the hydrogen producing means into the liquid fuel supplied from the fuel tank to the fuel injection device. Furthermore, a circulating means is provided for circulating the liquid fuel through the fuel tank and the hydrogen mixing means, and control means is provided for activating the hydrogen producing means so as to produce hydrogen gas and activating the hydrogen mixing gas so as to dissolve the produced hydrogen gas into the liquid fuel while causing the circulating means to circulate the liquid fuel, prior to start of fuel injection by the fuel injection device, when the internal combustion engine is started or starting of the engine is predicted.

According to the above embodiment, hydrogen gas is produced from a liquid hydride prior to start of fuel injection, and the produced hydrogen gas is dissolved into the circulating liquid fuel, so that the liquid fuel mixed with the hydrogen gas can be supplied to the fuel injection device from the beginning upon start of fuel injection. Furthermore, hydrogen gas is produced after an operation to start the engine is detected or starting of the engine is predicted, and the hydrogen gas thus produced is stored in the circulating liquid fuel, which eliminates a need to provide a tank for accommodating hydrogen gas in the gas phase.

In the above embodiment, the hydrogen mixing means may comprise a means for producing minute bubbles of the hydrogen gas, and dissolving the minute bubbles of the hydrogen gas into the liquid fuel. Since hydrogen gas is formed into minute bubbles, which are then dissolved into the liquid fuel, dissolution of the hydrogen gas into the liquid fuel can be promoted, and liquid fuel having a high proportion of hydrogen gas can be supplied.

BRIEF DESCRIPTION OF DRAWINGS

The foregoing and/or further objects, features and advantages of the invention will become more apparent from the following description of exemplary embodiments with reference to the accompanying drawings, in which like numerals are used to represent like elements and wherein:

FIG. 2 is a flowchart illustrating a routine of system control associated with a hydrogen-gas mixing process implemented in the first embodiment of the invention;

FIG. 14A and FIG. 14B are a flowchart illustrating a routine of hydrogen addition control implemented in the fifth embodiment of the invention;

FIG. 16A and FIG. 16B are a flowchart illustrating a first example of routine of hydrogen addition control implemented in the sixth embodiment of the invention;

FIG. 17 is a flowchart illustrating a second example of routine of hydrogen addition control implemented in the sixth embodiment of the invention;

FIG. 19A and FIG. 19B are a flowchart illustrating a routine of hydrogen addition control implemented in the seventh embodiment of the invention;

DETAILED DESCRIPTION OF THE INVENTION

First Embodiment

Figure 1:
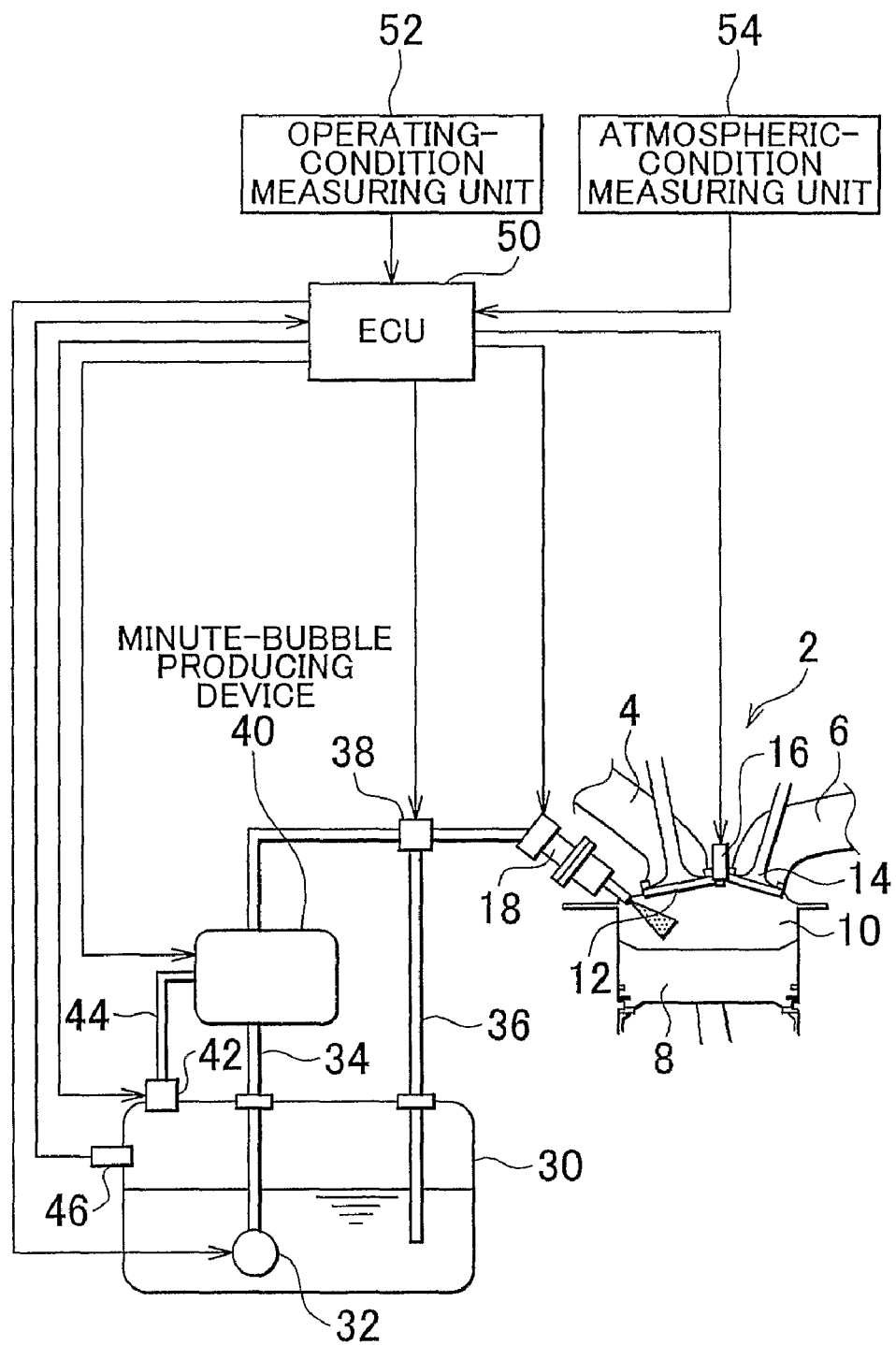
FIG. 1 is a view showing a system of a hydrogen-using internal combustion engine constructed according to a first embodiment of the invention.

Referring to FIG. 1 and FIG. 2, a first exemplary embodiment of the invention will be described in detail.

FIG. 1 schematically shows a system of a hydrogen-using internal combustion engine 2 (hereinafter simply referred to as "engine"), which is constructed according to the first embodiment of the invention. The engine 2 of this embodiment comprises of a plurality of cylinders (of which only one cylinder is illustrated in FIG. 1). The engine 2 has a piston 8 for each cylinder, and a combustion chamber 10 is formed in each cylinder such that its volume is repeatedly increased and reduced in accordance with vertical movements of the piston 8. To the engine 2 are connected an intake passage 4 through which air is supplied to the combustion chamber 10 of each cylinder, and an exhaust passage 6 through which combustion gas (or exhaust gas) is discharged from the combustion chamber 10. In the engine 2, an intake valve 12 is provided at a connecting interface between the intake passage 4 and the combustion chamber 10 for controlling fluid communication therebetween, and an exhaust valve 14 is provided at a connecting interface between the exhaust passage 6 and the combustion chamber 10 for controlling fluid communication therebetween. An in-cylinder injector 18 for injecting fuel directly into the combustion chamber 10 and an ignition plug 16 for igniting an air-fuel mixture in the combustion chamber 10 are attached to the walls of the combustion chamber 10.

The in-cylinder injector 18 is connected to a fuel tank 30 via a fuel supply channel 34. A hydrogen-blended fuel stored in the fuel tank 30 contains hydrogen gas in the form of minute bubbles dissolved in a liquid hydrocarbon fuel (liquid fuel), such as gasoline. The minute bubbles mentioned herein have a diameter of several tens of microns or smaller. The minute bubbles of hydrogen gas having the thus reduced size can be uniformly present in large quantity within the hydrocarbon fuel, as compared with normal-size bubbles, and the hydrogen-blended fuel mixed with the minute bubbles can be substantially treated as a liquid. In particular, ultra-minute bubbles (or nano-bubbles) having a diameter of 1 µm or smaller can be stably present in the liquid for a long period of time, and hydrogen gas is preferably contained in the form of nano-bubbles in the hydrogen-blended fuel. In the present embodiment, hydrogen gas, which has been formed into minute bubbles of the nano-level (i.e., nano-bubbles), is contained in the hydrogen-blended fuel. It is, however, the minute bubbles need not be nano-bubbles, but may have a larger size than nano-bubbles as long as hydrogen gas can be present in the form of minute bubbles in the liquid fuel without escaping from the fuel for a period of time in which no problem occurs to the operation of the engine.

In the first embodiment, the hydrogen-blended fuel is supposed to be produced in advance outside the vehicle and be supplied to the fuel tank 30 by a refueling system. The method of producing the hydrogen-blended fuel, namely, the method of forming minute bubbles of hydrogen gas in the liquid fuel, is not limited to any particular method. For example, any one of the following methods may be employed.

In a first example of the formation of minute bubbles, an intense flow of liquid fuel is produced, and hydrogen gas is blown into the liquid fuel so that shearing force generated in the intense flow of liquid fuel causes the hydrogen gas to be crushed into minute bubbles.

In a second example of the formation of minute bubbles, pressure is applied to hydrogen gas so that a larger amount of hydrogen gas is dissolved in liquid fuel. In this condition, cavities are formed by, for example, increasing the flow rate of the liquid fuel.

In a third example of the formation of minute bubbles, ultrasonic waves are applied to liquid fuel so as to oscillate and split bubbles of hydrogen gas contained in the liquid fuel. The third example may be readily employed for forming hydrogen gas into nano-level minute bubbles (or nano-bubbles). With the ultrasonic waves applied to the minute bubbles of hydrogen gas so as to rapidly reduce the size of the bubbles, electrostatic repulsion takes place due to an increase of the charge density on the surfaces of the bubbles. Due to the electrostatic repulsion, the reduction of the size of the minute bubbles is stopped, and the hydrogen gas remains in the form of minute bubbles without being diffused into the liquid fuel.

Preferably, ions are present in the liquid fuel so as to keep the hydrogen gas in the form of minute bubbles, particularly, in the form of nano-bubbles, over a prolonged period. If ions are present in the liquid fuel, ions adsorbed on the interfaces between the hydrogen-gas minute bubbles and the liquid and oppositely charged ions contained in the liquid fuel and attracted to the vicinity of the interfaces under the electrostatic attractive force are concentrated to a high density in a very small volume. In the presence of these ions, the hydrogen gas contained in the minute bubbles is inhibited from being diffused into the liquid fuel, and can be thus stably kept in the form of minute bubbles. The method of having ions present in the liquid fuel is not limited to any particular method. For example, an organic salt serving as an electrolyte may be added to the liquid fuel whose electric conductivity has been increased through reforming.

The hydrogen-blended fuel in the fuel tank 30 is drawn up by a fuel pump 32 into the fuel supply channel 34, and is supplied to the in-cylinder injector 18 after being compressed to a certain pressure level that is higher than the combustion gas pressure in the combustion chamber 10. The fuel pump 32 may be a mechanical pump that is driven by the engine 2, or an electric pump that is driven by a motor. To the fuel tank 30 is attached a pressure sensor 46 that transmits a signal indicative of the pressure in the fuel tank 30.

A channel selector valve 38 is disposed in the middle of the fuel supply channel 34. The channel selector valve 38 is a three-way valve having two outlet ports and one inlet port. A return channel 36 is connected to one of the outlet ports, and is connected at the other end to the fuel tank 30. The other outlet port of the channel selector valve 38 is connected to the in-cylinder injector 18 via the channel supply channel 34. When the channel selector valve 38 is placed in a position in which the outlet port connected to the return channel 36 is opened, the hydrogen-blended fuel delivered from the fuel tank 30 is returned to the fuel tank 30 via the return channel 36. In the following description, a fuel line that is established by placing the channel selector valve 38 in a position for the outlet port leading to the in-cylinder injector 18 will be called "normal supply line", and a fuel line that is established by placing the valve 38 in the position for the outlet port leading to the fuel tank 30 will be called "circulation line".

A minute-bubble producing device 40 is disposed in the fuel supply channel 34 between the fuel pump 32 and the channel selector valve 38. The minute-bubble producing device 40 is adapted to form minute bubbles of hydrogen gas and mix the bubbles into the liquid that flows through the fuel supply channel 34. The minute-bubble producing device 40 may produce minute bubbles by using ultrasonic waves so as to oscillate and split bubbles of hydrogen gas. However, the method employed by the minute-bubble producing device 40 for forming minute bubbles is not limited to this method, but may be selected from other methods provided that the device 40 is able to produce minute bubbles having substantially the same size as the minute bubbles originally contained in the hydrogen-blended fuel.

The engine system of the first embodiment, in which the minute-bubble producing device 40 is installed, is capable of producing hydrogen-blended fuel on the vehicle. In this embodiment, however, the minute-bubble producing device 40 is not installed for the purpose of newly producing hydrogen-blended fuel, but for the purpose of dissolving hydrogen gas separated from the hydrogen-blended fuel in the fuel tank 30 back into the hydrogen-blended fuel.

In this connection, hydrogen gas contained in the hydrogen-blended fuel cannot remain in the form of minute bubbles forever, but escapes from the hydrogen-blended fuel with the passage of time. As a result, the concentration of hydrogen in the hydrogen-blended fuel gradually decreases with time, which makes it difficult or impossible for the engine to provide desired performance that could be achieved through the use of the hydrogen-blended fuel. Thus, the engine system of the present embodiment is arranged to recover hydrogen gas that has escaped from the hydrogen-blended fuel and remains in the fuel tank 30, and mix the recovered hydrogen gas back into the hydrogen-blended fuel by using the minute-bubble producing device 40.

To enable the engine system to operate in the manner as described above, a gas recovery channel 44 is connected to the upper part of the fuel tank 30 for recovering hydrogen gas in the fuel tank 30 and supplying the hydrogen gas to the minute-bubble producing device 40. A switching valve 42 is provided in the gas recovery channel 44 for communicating the fuel tank 30 with the minute-bubble producing device 40 only when necessary. When the switching valve 42 is opened, hydrogen gas that has escaped from the hydrogen-blended fuel is supplied, along with fuel vapors accumulated in the fuel tank 30, to the minute-bubble producing device 40. Then, the minute-bubble producing device 40 forms the hydrogen gas into minute bubbles, and dissolves the hydrogen bubbles back into the hydrogen-blended fuel flowing through the fuel supply channel 34.

The minute-bubble producing device 40 and the switching valve 42 are controlled by ECU (Electronic Control Unit) 50 of the engine system. In addition to the minute-bubble producing device 40 and the switching valve 42, the ignition plug 16, in-cylinder injector 18, fuel pump 32, channel selector valve 38 and various other devices or components are connected to the output part of the ECU 50. To the input part of the ECU 50 are connected various sensors, including the above-indicated pressure sensor 46, operating-condition measurement unit 52 for acquiring information (including, for example, accelerator pedal position, vehicle speed, engine speed, air/fuel ratio, water temperature and knock signal) concerning the operating conditions of the engine 2, and an atmospheric-condition measurement unit 54 for acquiring information (including, for example, ambient temperature, humidity, and barometric pressure) concerning the atmospheric or ambient conditions. The ECU 50 controls the above-indicated devices and others according to certain control programs, based on signals received from the above-indicated sensors and others.

In the engine system constructed as described above, the engine uses, as a fuel, a hydrogen-blended fuel in which hydrogen gas is contained in the form of minute bubbles in a liquid hydrocarbon fuel. Thus, the engine does not require a complicated system that would be used in the case where hydrogen gas and hydrocarbon fuel are supplied to fuel injectors through separate fuel supply systems. Also, since hydrogen gas is contained and stored in the form of minute bubbles in the hydrocarbon fuel, no means needs to be provided for accommodating hydrogen gas, separately from a fuel tank for accommodating the hydrocarbon fuel, and no means needs to be provided for producing hydrogen on the vehicle.

In the engine system constructed as described above, even if hydrogen gas escapes from the hydrogen-blended fuel after being left standing for a long period of time, the hydrogen gas that has escaped can be recovered and mixed back into the hydrogen-blended fuel. In this case, if the channel selector valve 38 is placed in the position for selecting the normal supply line as the fuel line, hydrogen gas can be mixed back into the hydrogen-blended fuel that is on its way to the in-cylinder injector 18. If the channel selector valve 38 is placed in the position for selecting the circulation line as the fuel line, on the other hand, hydrogen gas can be mixed back into the hydrogen-blended fuel while the fuel is circulating through the fuel tank 30 and the minute-bubble producing device 40.

Through the implementation of the above-described mixing process while the normal supply line is selected, hydrogen-blended fuel having a specified hydrogen concentration can be injected from the in-cylinder injector 18 even if the hydrogen concentration in the hydrogen-blended fuel stored in the fuel tank 30 has been lowered due to escape of hydrogen from the fuel. Through the implementation of the mixing process while the circulation line is selected, the hydrogen concentration in the hydrogen-blended fuel stored in the fuel tank 30 can be maintained at a steady level. In either case, the above arrangement of the engine system enables the in-cylinder injector 18 to inject hydrogen-blended fuel having a constant steady hydrogen concentration through the hydrogen mixing process.

The ECU 50 performs the above-described process of dissolving hydrogen gas as part of its system control. The flowchart of FIG. 2 illustrates a routine of system control associated with the hydrogen-gas mixing process implemented by the ECU 50 in the first embodiment.

In the initial step S100 of the routine of FIG. 2, it is determined whether a condition for the implementation of the hydrogen-gas mixing process is met. The dissolving of hydrogen gas back into the hydrogen-blended fuel is performed when escape of hydrogen gas from the fuel has proceeded to a certain degree or level, and the meeting of the implementation condition is determined based on the tank pressure measured by the pressure sensor 46. The tank pressure, which has a certain relationship with the degree of escape of hydrogen gas, increases with an increase in the amount of hydrogen gas present in the gas phase in the fuel tank 30. If the tank pressure exceeds a threshold level, the ECU 50 determines that the escape of hydrogen gas has proceeded to a certain degree, and determines that the condition for the implementation of the mixing process is met. If an affirmative decision (YES) is obtained in step S100, hydrogen gas is dissolved back into the hydrogen-blended fuel through the operations of step S102 to step S110.

In step S102, it is determined whether fuel cut control is under way, namely, whether the engine is currently operated under fuel cut control. If the fuel cut control is not under way, the hydrogen-blended fuel is consumed through fuel injection from the in-cylinder injector 18. By continuously feeding the hydrogen-blended fuel to the in-cylinder injector 18, it is possible to supply the hydrogen-blended fuel from the fuel tank 30 to the minute-bubble producing device 40. If the fuel cut control is under way, on the other hand, the hydrogen-blended fuel cannot be fed to the in-cylinder injector 18 because no fuel is consumed through fuel injection.

When the fuel cut control is under way, therefore, step S104 is selected as the next process step. In step S104, the channel selector valve 38 is placed in the position for selecting the circulation line as the fuel line so that the hydrogen-blended fuel is circulated between the fuel tank 30 and the minute-bubble producing device 40.

When the fuel cut control is not under way, on the other hand, step S106 is selected as the next process step. In step S106, the channel selector valve 38 is placed in the position for selecting the normal supply line as the fuel line so that the hydrogen-blended fuel is supplied to the in-cylinder injector 18.

Following the selection of the fuel line, the switching valve 42 is opened in step S108. With the switching valve 42 opened, the fuel tank 30 is brought into communication with the minute-bubble producing device 40. In this condition, hydrogen gas accumulated in the fuel tank 30 is recovered, along with vaporized hydrocarbon fuel, by the minute-bubble producing device 40.

In the next step S110, the minute-bubble producing device 40 operates to form the recovered gaseous fuel (i.e., a mixture of hydrogen gas and vaporized hydrocarbon fuel) into minute bubbles, and mix the minute bubbles of the gaseous fuel back into the hydrogen-blended fuel. In this manner, the concentration of hydrogen in the hydrogen-blended fuel is prevented from being lowered due to separation of hydrogen gas from the fuel, and hydrogen-blended fuel having a constant steady hydrogen concentration can be injected from the in-cylinder injector 18.

If the condition for the implementation of the hydrogen-gas mixing process is not satisfied in step S100, the switching valve 42 is closed, and the fluid communication between the fuel tank 30 and the minute-bubble producing device 40 is cut off in step S112. Step S114 is then executed to stop the process of forming minute bubbles by the minute-bubble producing device 40.

Second Embodiment

Figure 3:
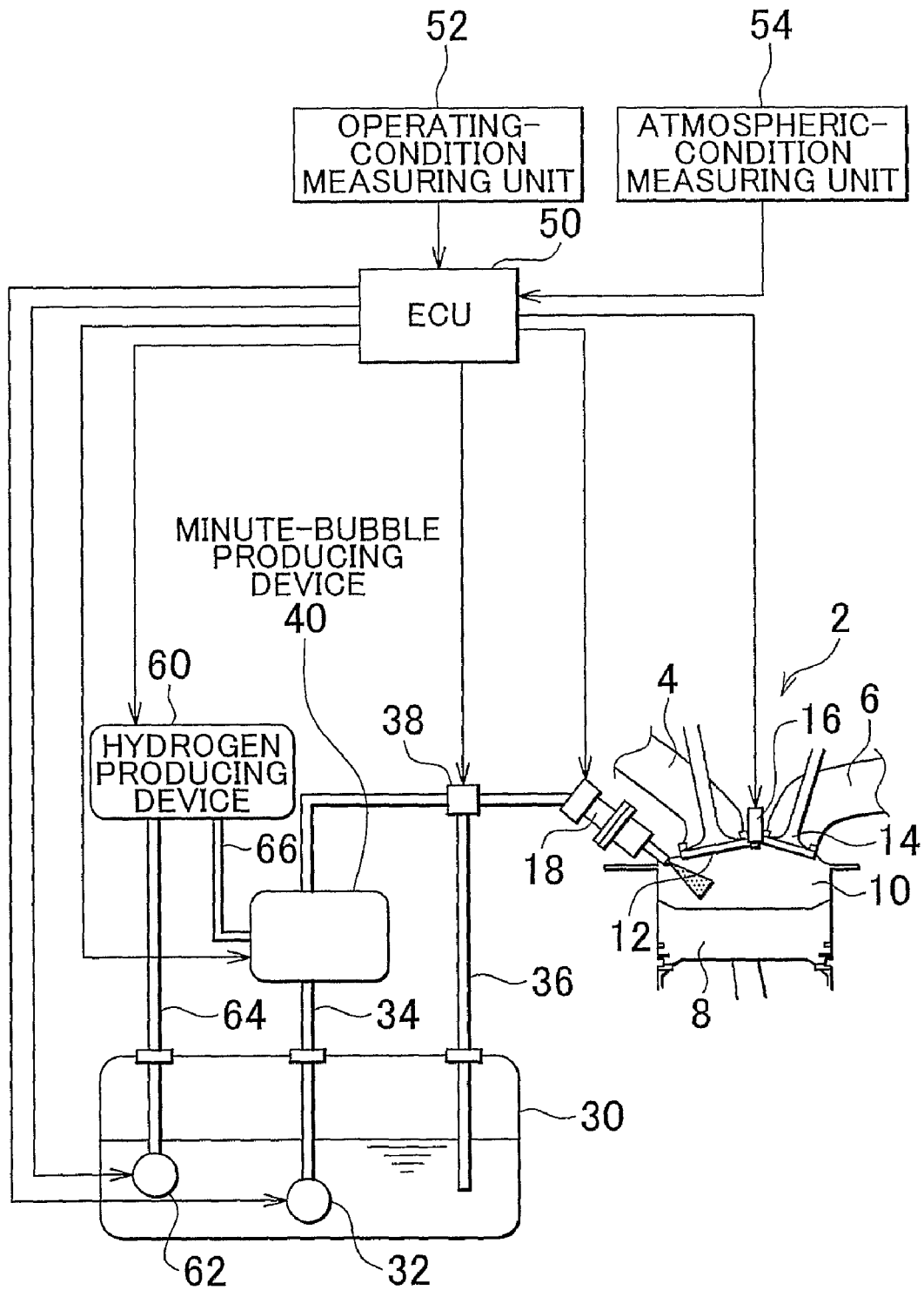
FIG. 3 is a view showing a system of a hydrogen-using internal combustion engine constructed according to a second embodiment of the invention.
Figure 4:
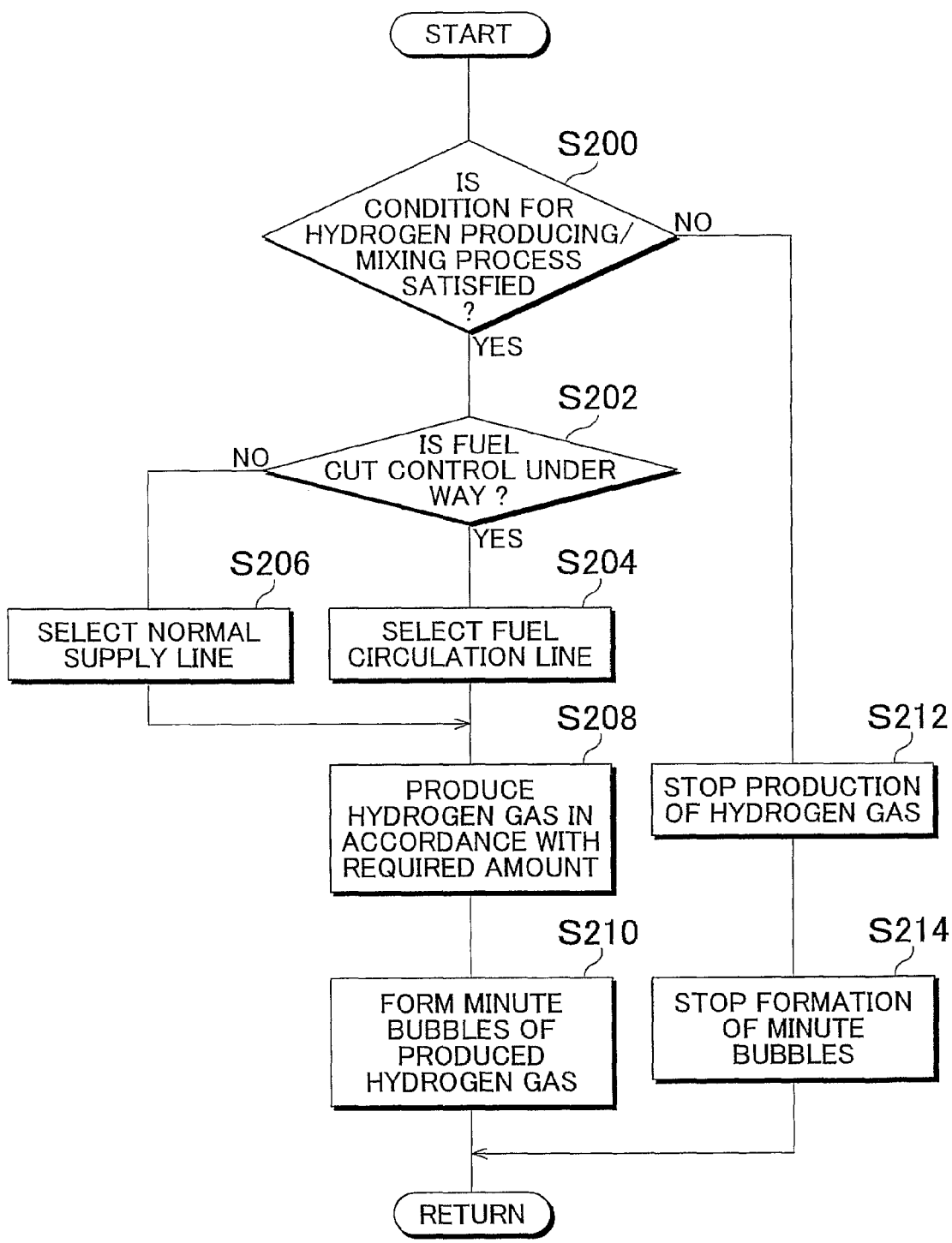
FIG. 4 is a flowchart illustrating a routine of system control associated with hydrogen-gas producing and mixing processes implemented in the second embodiment of the invention.

Referring to FIG. 3 and FIG. 4, a second exemplary embodiment of the invention will be described in detail.

FIG. 3 schematically shows a system of a hydrogen-using internal combustion engine (hereinafter simply referred to as "engine"), which is constructed according to the second embodiment of the invention. The engine of this embodiment has an engine 2. The construction of the engine 2 is substantially identical with that of the first embodiment, and thus will not be explained herein. In FIG. 3, the same reference numerals as used in FIG. 1 are used for identifying the same elements or components as those of the engine of the first embodiment.

In the second embodiment, a liquid hydrocarbon fuel, such as gasoline, is stored in the fuel tank 30. The fuel supply channel 34 connects the fuel tank 30 with the in-cylinder injector 18. The hydrocarbon fuel in the fuel tank 30 is drawn up by the fuel pump 32 disposed in the fuel supply channel 34, and is supplied to the in-cylinder injector 18 after being compressed to a certain pressure level that is higher than the pressure of combustion gas in the combustion chamber 10.

The channel selector valve 38 is disposed in the middle of the fuel supply channel 34. The return channel 36 is connected at one end to one of the two outlet ports of the channel selector valve 38, and is connected at the other end to the fuel tank 30. The other outlet port of the channel selector valve 38 is connected to the in-cylinder injector 18 via the channel supply channel 34. When the channel selector valve 38 is placed in a position in which the outlet port that leads to the in-cylinder injector 18 is opened, the normal supply line that extends from the fuel tank 30 to the in-cylinder injector 18 is established as the fuel line. When the channel selector valve 38 is placed in a position in which the outlet port connected to the return channel 36 is opened, the circulation line through which the fuel is circulated through the fuel tank 30 is established as the fuel line.

The minute-bubble producing device 40 for mixing hydrogen gas into the hydrocarbon fuel is disposed between the fuel pump 32 and the channel selector valve 38 in the fuel supply channel 34. The minute-bubble producing device 40 is adapted to form hydrogen gas into minute bubbles having a diameter of several tens of microns or smaller, and mix the minute bubbles into the hydrocarbon fuel in the fuel supply channel 34. By operating the minute-bubble producing device 40 to mix hydrogen gas in the form of minute bubbles into the hydrocarbon fuel, the hydrogen gas can be uniformly contained in large quantity within the hydrocarbon fuel. This allows the in-cylinder injector 18 to inject a substantially liquid, hydrogen-blended fuel in which hydrogen gas is contained in the form of minute bubbles in liquid hydrocarbon fuel. The method of forming minute bubbles by the minute-bubble producing device 40 is not limited to any particular method, but any of the methods (the first through third methods) illustrated, by way of example, in the first embodiment may be employed. While the size of the minute bubbles produced by the minute-bubble producing device 40 is not limited to any particular size, it is preferable to produce ultra-minute bubbles (or nano-bubbles) having a diameter of 1 μm or smaller.

The hydrogen gas to be blended into the hydrocarbon fuel is supplied from a hydrogen-producing device 60 to the minute-bubble producing device 40 via a hydrogen-gas supply channel 66. The hydrogen-producing device 60 is able to immediately produce hydrogen gas from the hydrocarbon fuel. The hydrocarbon fuel used by the hydrogen-producing device 60 for forming hydrogen gas is supplied from the fuel tank 30 via a fuel supply channel 64. A fuel pump 62 is provided in the fuel supply channel 64 for drawing up the hydrocarbon fuel in the fuel tank 30 and supplying the fuel to the hydrogen-producing device 60.

The hydrogen-producing device 60 may produce hydrogen gas from the hydrocarbon fuel by any known method. For example, hydrogen gas may be formed by decomposing hydrocarbon fuel with a low-temperature plasma, or reforming hydrocarbon fuel with a catalyst. More specifically, the hydrocarbon fuel may be subjected to dc pulse discharge, as a reforming method using low-temperature plasma. As reforming methods using a catalyst, steam reforming, reforming through partial oxidation, or reforming through dehydrogenation of an organic hydride may be employed.

In any of the above-indicated methods, a product resulting from the formation of hydrogen gas from the hydrocarbon fuel contains a component or components other than hydrogen gas. If the component other than hydrogen gas is in the gas phase, it may be supplied, along with the hydrogen gas, to the minute-bubble producing device 40. If the component other than hydrogen gas is in the liquid phase, it may be returned to the fuel tank 30, or may be supplied, along with the hydrogen gas, to the minute-bubble producing device 40.

The minute-bubble producing device 40 and the hydrogen-producing device 60 are controlled by ECU (Electronic Control Unit) 50. In addition to the minute-bubble producing device 40 and the hydrogen-producing device 60, the ignition plug 16, in-cylinder injector 18, fuel pumps 32, 62, channel selector valve 38 and various devices or components are connected to the output part of the ECU 50. To the input part of the ECU 50 are connected various sensors, including, for example, the operating-condition measuring unit 52 and the atmospheric-condition measuring unit 54. The ECU 50 controls the above-indicated devices and others according to certain control programs, based on signals received from the above-indicated sensors and others.

In the engine system constructed as described above, the engine uses, as a fuel, a hydrogen-blended fuel in which hydrogen gas is contained in the form of minute bubbles in a liquid hydrocarbon fuel. Thus, the engine does not require a complicated system that would be used in the case where hydrogen gas and hydrocarbon fuel are supplied to fuel injectors through separate fuel supply systems. Also, since hydrogen gas mixed into the hydrocarbon fuel is produced from the hydrocarbon fuel, a means for accommodating hydrogen gas separately from or in addition to the fuel tank in which the hydrocarbon fuel is stored is not required.

In the engine system constructed as described above, the fuel line established during the processes of producing hydrogen gas and mixing the hydrogen gas into the fuel can be switched between the normal supply line and the circulation line. In the case where the hydrogen-gas producing and mixing processes are carried out while the normal supply line is selected, the hydrogen gas is mixed into the hydrocarbon fuel during its supply to the in-cylinder injector 18, and, therefore, escape of hydrogen gas from the fuel can be minimized, thus allowing the in-cylinder injector 18 to inject a hydrogen-blended fuel having a steady hydrogen concentration. In the case where the hydrogen-gas producing and mixing processes are carried out while the circulation line is selected, the hydrocarbon fuel supplied from the fuel tank 30 is reformed into a hydrogen-blended fuel, which is then returned to the fuel tank 30, so that the concentration of hydrogen in the hydrocarbon fuel stored in the fuel tank 30 can be increased to a sufficiently high level.

The hydrogen-gas producing and mixing processes as explained above are performed as part of system control practiced by the ECU 50. The flowchart of FIG. 4 illustrates a routine of system control associated with the hydrogen-gas producing and mixing processes implemented by the ECU 50 in the second embodiment.

In the initial step S200 of the routine of FIG. 4, it is determined whether a condition for the implementation of the hydrogen-gas producing and mixing processes is satisfied, based on the operating conditions of the engine 2 measured by the operating-condition measuring unit 52, and the atmospheric conditions measured by the atmospheric-condition measuring unit 54. The condition for the implementation of the hydrogen-gas producing and mixing processes may be satisfied, for example, when the engine 2 operates in an operating range in which knocking is likely to occur, or when the engine 2 operates in an operating range in which combustion variations are likely to appear, or in other situations. If the condition for the hydrogen-gas producing and mixing processes is satisfied, hydrogen gas is produced and mixed into the hydrocarbon fuel through the operations of step S202 to step S210.

In step S202, it is determined whether fuel cut control is under way, namely, whether the engine is currently operated under fuel cut control. When the fuel cut control is not under way, the hydrogen-blended fuel is consumed through fuel injection from the in-cylinder injector 18. By feeding the hydrogen-blended fuel produced at the minute-bubble producing device 40 to the in-cylinder injector 18, the hydrocarbon fuel can be continuously supplied from the fuel tank 30 to the minute-bubble producing device 40. If the fuel cut control is under way, no hydrogen-blended fuel is consumed through fuel injection, and, therefore, the hydrogen-blended fuel produced at the minute-bubble producing device 40 cannot be fed to the in-cylinder injector 18.

If the fuel cut control is under way, namely, if the engine is currently operated under fuel cut control, step S204 is selected as the next process step. In step S204, the channel selector valve 38 is placed in the position for selecting the circulation line as the fuel line, so that the hydrocarbon fuel is circulated between the fuel tank 30 and the minute-bubble producing device 40. In this manner, the hydrocarbon fuel can be continuously supplied from the fuel tank 30 to the minute-bubble producing device 40.

If the fuel cut control is not under way, on the other hand, step S206 is selected as the next process step. In step S206, the channel selector valve 38 is placed in the position for selecting the normal supply line as the fuel line, so that the hydrogen-blended fuel is supplied to the in-cylinder injector 18.

In the next step S208, the hydrocarbon fuel is supplied from the fuel tank 30 to the hydrogen-producing device 60 in accordance with the required amount of hydrogen gas to be produced. Then, the required amount of hydrogen gas is produced by a hydrogen producing process in the hydrogen-producing device 60. The required amount of hydrogen gas to be produced may be calculated in different manners, depending upon whether the circulation line or the normal supply line is selected as the fuel line. When the circulation line is selected as the fuel line, the required amount of hydrogen to be produced is set to a constant value or fixed value. When the normal supply line is selected as the fuel line, the required load of the engine 2 is initially obtained from the accelerator pedal position, engine speed, and so forth, and a share of the load imposed on the hydrogen gas (which will be called "hydrogen load") is obtained from the required load. The required amount of hydrogen is determined based on the operating conditions of the engine 2 and then added. Next, the required amount of hydrogen to be produced is calculated in accordance with the hydrogen load, based on the quantity of heat generated per unit amount of hydrogen gas. It is, however, to be noted that hydrogen gas is contained in the hydrocarbon fuel in the fuel tank 30, and, therefore, the required amount of hydrogen to be produced is corrected in accordance with the concentration of hydrogen in the hydrocarbon fuel. The concentration of hydrogen in the hydrocarbon fuel can be estimated from the accumulated amount of hydrogen gas that has been produced while the circulation line is selected as the fuel line.

In step S210, the hydrogen gas produced by the hydrogen-producing device 60 (or fuel gas containing hydrogen gas) is formed into minute bubbles by the minute-bubble producing device 40, and the hydrogen gas in the form of minute bubbles is then dissolved into the hydrocarbon fuel that flows in the fuel supply channel 34. As a result, hydrogen-blended fuel that contains hydrogen gas in the form of minute bubbles can be injected from the in-cylinder injector 18 into the combustion chamber 10.

If step S200 determines that the condition for the implementation of the hydrogen-gas producing and mixing processes is not satisfied, the hydrogen-producing device 60 stops the hydrogen producing process in step S212, and the minute-bubble producing device 40 stops the process of forming minute bubbles in step S214.

Third Embodiment

Figure 5:
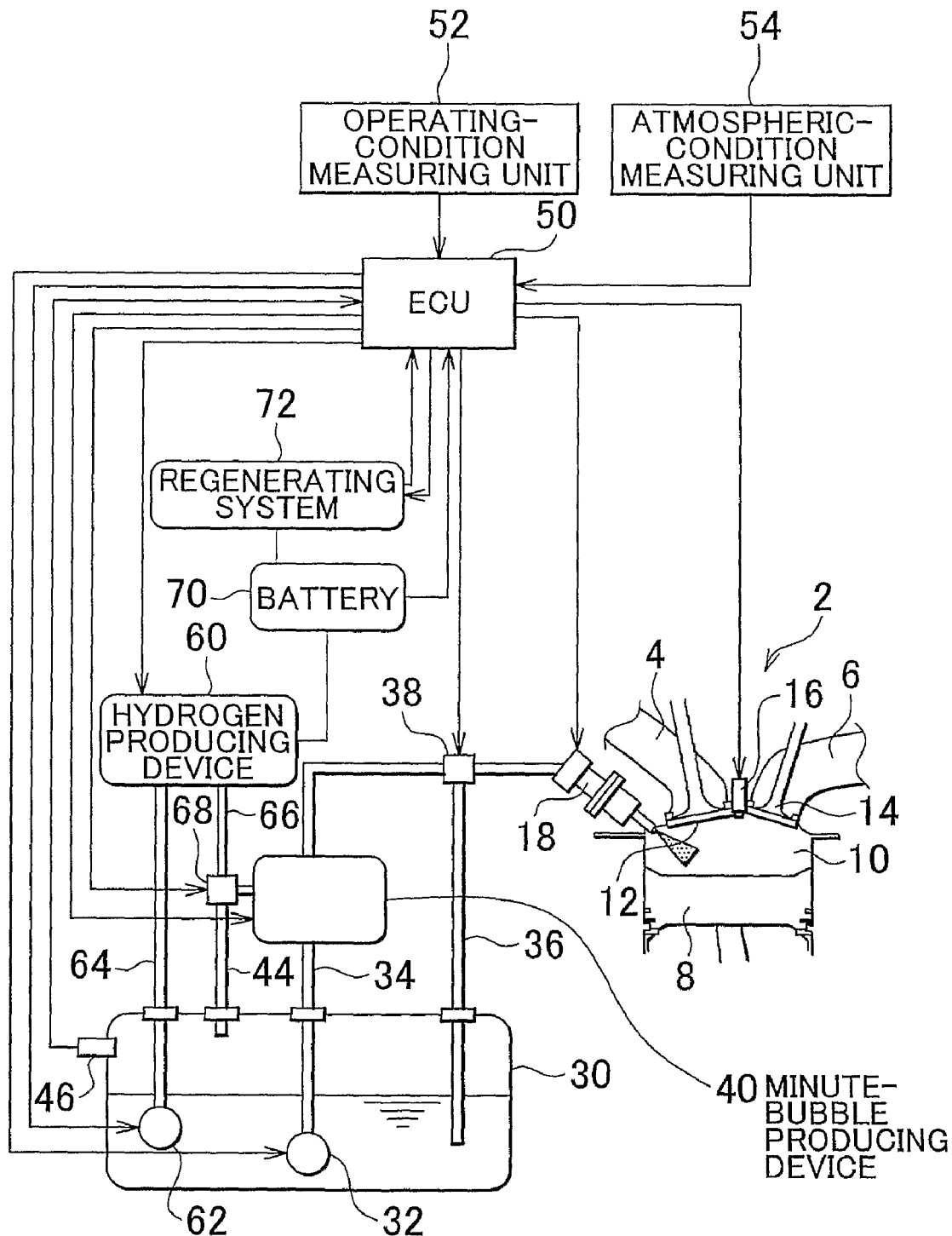
FIG. 5 is a view showing a system of a hydrogen-using internal combustion engine constructed according to a third embodiment of the invention.
Figure 6:
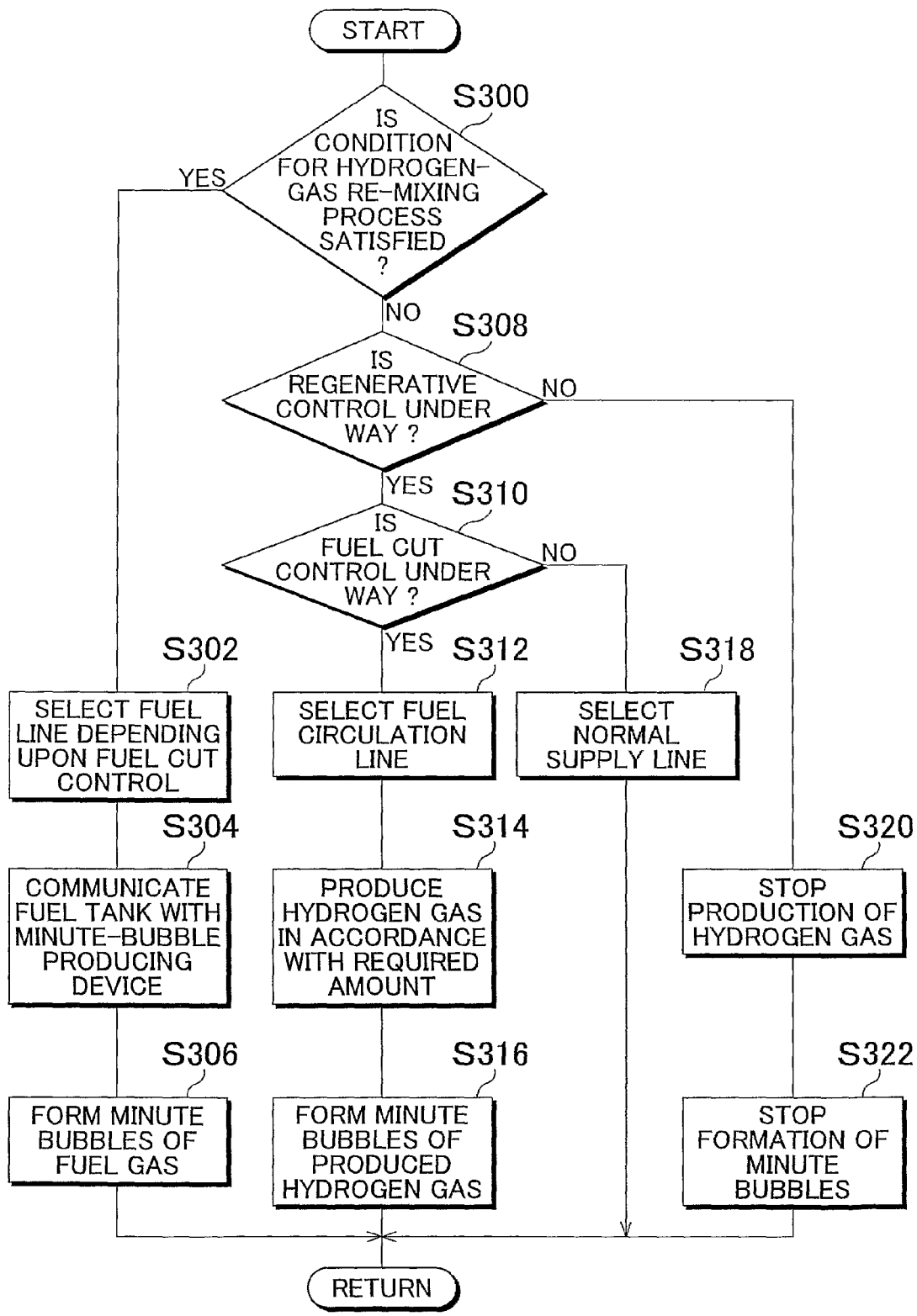
FIG. 6 is a flowchart illustrating a routine of system control associated with hydrogen-gas producing and mixing processes implemented in the third embodiment of the invention.

Referring to FIG. 5 and FIG. 6, a third exemplary embodiment of the invention will be described in detail.

FIG. 5 schematically shows a system of a hydrogen-using internal combustion engine (hereinafter simply referred to as "engine"), which is constructed according to the third embodiment of the invention. The engine of this embodiment has an engine 2. The construction of the engine 2 is substantially identical with that of the first embodiment, and thus will not be explained herein. In FIG. 5, the same reference numerals as used in FIG. 1 and FIG. 3 are used for identifying the same elements or components as those of the engine systems of the first and second embodiments.

In the third embodiment, a hydrogen-blended fuel in which hydrogen gas is contained in the form of minute bubbles in a liquid hydrocarbon fuel, such as gasoline, is stored in the fuel tank 30. However, the third embodiment differs from the first embodiment in that the hydrogen-blended fuel stored in the fuel tank 30 is produced on the vehicle. In this embodiment, a hydrocarbon fuel is supplied to the fuel tank 30 with a refueling system, and the hydrogen-blended fuel is produced on the vehicle, using the hydrocarbon fuel stored in the fuel tank 30, in the manner as described below.

The fuel tank 30 is connected to the in-cylinder injector 18 via the fuel supply channel 34. The hydrogen-blended fuel (or hydrocarbon fuel) in the fuel tank 30 is drawn up by the fuel pump 32 disposed in the fuel supply channel 34, and is supplied to the in-cylinder injector 18 after being compressed to a pressure level higher than the pressure of combustion gas in the combustion chamber 10. Pressure sensor 46 that transmits a signal indicative of the pressure in the fuel tank 30 is mounted on the fuel tank 30.

The minute-bubble producing device 40 for dissolving hydrogen gas into the hydrocarbon fuel is disposed in the fuel supply channel 34. The minute-bubble producing device 40 is adapted to form hydrogen gas into minute bubbles having a diameter of several tens of microns, preferably, ultra-minute bubbles (or nano-bubbles) having a diameter of 1 μm or smaller, and mix the minute bubbles into the hydrocarbon fuel in the fuel supply channel 34. The method of forming minute bubbles by the minute-bubble producing device 40 is not limited to any particular method, but any one of the methods (the first through third examples) as described above with respect to the first embodiment may be employed.

The hydrogen gas to be formed into the minute bubbles is supplied from the hydrogen-producing device 60 to the minute-bubble producing device 40 via the hydrogen-gas supply channel 66. The hydrogen-producing device 60 is adapted to reform the hydrocarbon fuel to produce hydrogen gas, and the hydrocarbon fuel to be reformed is supplied from the fuel tank 30 to the hydrogen-producing device 60. The hydrogen-producing device 60 and the fuel tank 30 are connected to each other via the fuel supply channel 64, and the hydrocarbon fuel in the fuel tank 30 is drawn up by the fuel pump 62 disposed in the fuel supply channel 64. The hydrogen-producing device 60 may produce hydrogen gas by any known method. For example, any one of the methods as described above with respect to the second embodiment may be employed.

The hydrogen-producing device 60 is driven or powered by electric energy. More specifically, the hydrogen-producing device 60 is powered by electric energy supplied from a battery 70. The engine system of this embodiment is equipped with a regenerating system 72 as a means for charging the battery 70. The regenerating system 72 is disposed in a driving system of the vehicle, and is adapted to recover deceleration energy of the vehicle and use it as electric energy. The electric energy (or regenerative energy) recovered by the regenerating system 72 is once stored in the battery 70, and is supplied from the battery 70 to the hydrogen-producing device 60 as needed.

The channel selector valve 38 is located upstream of the minute-bubble producing device 40 in the fuel supply channel 34. The channel selector valve 38 is a three-way valve having two outlet ports and one inlet port. The return channel 36 is connected at one end to one of the outlet ports, and is connected at the other end to the fuel tank 30. The other outlet port of the channel selector valve 38 is connected to the in-cylinder injector 18. The normal supply line is established as the fuel line when the channel selector valve 38 is placed in a position in which the outlet port that leads to the in-cylinder injector 18 is opened, and the circulation line is established as the fuel line when the channel selector valve 18 is placed in a position in which the outlet port that leads to the fuel tank 30 is opened. By switching the channel selector valve 38 to the position for selecting the circulation line as the fuel line, the hydrocarbon fuel is circulated between the fuel tank 30 and the minute-bubble producing device 40. In this condition, hydrogen gas is mixed into the circulating hydrocarbon fuel, so that the hydrocarbon fuel in the fuel tank 30 can be gradually replaced with hydrogen-blended fuel.

A channel selector valve 68 is disposed in the hydrogen-gas supply channel 66 through which hydrogen gas is supplied to the minute-bubble producing device 40. The channel selector valve 68 is a three-way valve having one outlet port and two inlet ports. A gas recovery channel 44 is connected at one end to one of the inlet ports of the channel selector valve 68, and is connected at the other end to the upper part of the fuel tank 30. When the channel selector valve 68 is placed in a position in which the inlet port connected to the gas recovery channel 44 is opened, the interior of the fuel tank 30 communicates with the minute-bubble producing device 40. In this condition, hydrogen gas separated from the hydrogen-blended fuel in the fuel tank 30 is supplied to the minute-bubble producing device 40, so that the hydrogen gas can be re-mixed into the hydrogen-blended fuel in the fuel supply channel 34. When the channel selector valve 68 is placed in a position in which the inlet port connected to the hydrogen-producing device 60 is opened, hydrogen gas produced in the hydrogen-producing device 60 is supplied to the minute-bubble producing device 40. In the following description, a hydrogen-gas line that is established when the channel selector valve 68 communicates the hydrogen-producing device 60 with the minute-bubble producing device 40 will be called "produced gas supply line", and a hydrogen-gas line that is established when the channel selector valve 68 communicates the fuel tank 30 with the minute-bubble producing device 40 will be called "recovered gas supply line".

The minute-bubble producing device 40 and the hydrogen-producing device 60 are controlled by ECU (Electronic Control Unit) 50 as a control unit of the engine system. In addition to the minute-bubble producing device 40 and the hydrogen-producing device 60, various devices or systems including, for example, the ignition plug 16, in-cylinder injector 18, fuel pumps 32, 62, channel selector valves 38, 68, and the regenerating system 72 are connected to the output part of the ECU 50. The input part of the ECU 50 is connected to various sensors including, for example, the operating-condition measuring unit 52 and the atmospheric-condition measuring unit 54. The ECU 50 also receives a signal indicative of the power generating condition of the regenerating system 72. The ECU 50 controls the above-indicated devices or systems and others according to certain control programs, based on signals received from the above-indicated sensors and others.

In the engine system constructed as described above, the engine uses, as a fuel, a hydrogen-blended fuel in which hydrogen gas is contained in the form of minute bubbles in a liquid hydrocarbon fuel. Thus, the engine does not require a complicated system that would be used in the case where hydrogen gas and hydrocarbon fuel are supplied to fuel injectors through separate fuel supply systems. Also, since the hydrogen gas mixed into the hydrocarbon fuel is formed from the hydrocarbon fuel, no means is required for accommodating hydrogen gas, separately from the fuel tank in which the hydrocarbon fuel is stored.

In the engine system constructed as described above, the hydrogen-producing device 60 can utilize regenerative energy provided by the regenerating system 72, in the process of producing hydrogen. In particular, if the hydrogen-gas producing and mixing processes are carried out during operation of the regenerating system 72, the deceleration energy of the vehicle (i.e., energy generated during regenerative braking) can be recovered even if the battery 72 is fully charged, thus assuring high energy-efficiency. The hydrogen-gas producing and mixing processes may also be carried out exclusively when the circulation line is selected as the fuel line, such as when the vehicle is decelerated under fuel cut control, so as to reform the hydrocarbon fuel in the fuel tank 30 into hydrogen-blended fuel. In this manner, the hydrogen-gas producing and mixing processes can be accomplished without requiring precise or sophisticated control, thus enhancing the robustness of the system.

In the engine system constructed as described above, even if hydrogen gas is separated from the hydrogen-blended fuel as it is left standing in the fuel tank 30 for a long period of time, the hydrogen gas separated can be recovered and mixed back into the hydrogen-blended fuel. In the case where the process of re-mixing the hydrogen gas into the hydrogen-blended fuel is carried out while the normal supply line is selected, the in-cylinder injector 18 is able to inject hydrogen-blended fuel having a specified or suitably controlled hydrogen concentration even if the hydrogen concentration in the fuel stored in the fuel tank 30 has been reduced due to separation of hydrogen gas from the fuel. In the case where the re-mixing process is carried out while the circulation line is selected, the hydrogen concentration in the hydrogen-blended fuel stored in the fuel tank 30 can be kept at a steady level. In either case, the engine system of this embodiment allows the in-cylinder injector 18 to inject suitable hydrogen-blended fuel having a constant steady hydrogen concentration through the hydrogen-gas re-mixing process.

The hydrogen-gas producing and mixing processes as explained above are performed as part of system control of the ECU 50. The flowchart of FIG. 6 illustrates a routine of system control associated with the hydrogen-gas producing and mixing processes implemented by the ECU 50 in the third embodiment.

In the initial step S300 of the routine shown in FIG. 6, it is determined whether a condition for implementation of the hydrogen-gas re-mixing process is satisfied. It is determined that the condition for the re-mixing process is satisfied if the tank pressure measured by the pressure sensor 46 exceeds a threshold value. If the condition for the re-mixing process is not satisfied, step S308 through step S322 are executed.

In step S308, it is determined whether regenerative control is under way, namely, the vehicle is currently operated under regenerative control, based on a signal from the regenerating system 72. When regenerative control is under way, namely, when the deceleration energy of the vehicle is recovered by the regenerating system 72, the ECU 50 proceeds to step S310.

In step S310, it is determined whether fuel cut control is under way, namely, whether the vehicle is currently operated under fuel cut control. When fuel cut control is under way during regenerative control, for example, when the vehicle is decelerated with no fuel supplied thereto, step S312 is selected as the next process step. In step S312, the channel selector valve 38 is placed in the position for selecting the circulation line as the fuel line, so that the hydrocarbon fuel is circulated between the fuel tank 30 and the minute-bubble producing device 40.

In the next step S314, the hydrocarbon fuel is supplied from the fuel tank 30 to the hydrogen-producing device 60 in accordance with the required amount of hydrogen gas to be produced, and the required amount of hydrogen gas is produced by a hydrogen producing process in the hydrogen-producing device 60. In step S316, the hydrogen gas (or fuel gas containing hydrogen gas) produced in the hydrogen-producing device 60 is formed into minute bubbles by the minute-bubble producing device 40, and the minute bubbles of the hydrogen gas are mixed into the hydrocarbon fuel in the fuel supply channel 34. In this manner, the hydrocarbon fuel in the fuel tank 30 is gradually replaced by hydrogen-blended fuel while it is circulating along the circulation line.

When fuel cut control is not under way during regenerative control, on the other hand, step S318 is selected as the next process step. In step S318, the channel selector valve 38 is placed in the position for selecting the normal supply line as the fuel line, so that the hydrogen-blended fuel stored in the fuel tank 30 is supplied to the in-cylinder injector 18. In the present embodiment, the hydrogen-gas producing and mixing processes are carried out exclusively when the circulation line is selected, but not carried out when the normal supply line is selected. Thus, the engine system can accomplish the hydrogen-gas producing and mixing processes without requiring precise or sophisticated control.

If it is determined in step S308 that regenerative control is not under way, the hydrogen producing process in the hydrogen-producing device 60 is stopped in step S320, and then the process of forming minute bubbles by the minute-bubble producing device 40 is stopped in step S322.

If it is determined in step S300 that the condition for the implementation of the hydrogen-gas re-mixing process is satisfied, for example, if separation of hydrogen gas from the hydrogen-blended fuel has proceeded to a certain degree as the fuel is left standing in the fuel tank 30 for a long period, step S302 through step S306 are executed to mix hydrogen gas back into the hydrogen-blended fuel.

In step S302, the fuel line is selected depending upon whether the vehicle is operating under fuel cut control. More specifically, if the fuel cut control is under way, the channel selector valve 38 is placed in the position for selecting the circulation line as the fuel line, and the hydrogen-blended fuel is circulated between the fuel tank 30 and the minute-bubble producing device 40. If the fuel cut control is not under way, on the other hand, the channel selector valve 38 is placed in the position for selecting the normal supply line as the fuel line, so that the hydrogen-blended fuel in the fuel tank 30 is supplied to the in-cylinder injector 18.

Following the selection of the fuel line, step S304 is executed. In step S304, the channel selector valve 68 is operated to switch the hydrogen-gas line from the produced gas supply line to the recovered gas supply line. Upon switching to the recovered-gas supply line, the fuel tank 30 is brought into communication with the minute-bubble producing device 40. In this condition, hydrogen gas accumulated in the fuel tank 30 is recovered or collected, along with vaporized hydrocarbon fuel, by the minute-bubble producing device 40.

In the next step S306, the minute-bubble producing device 40 operates to form the recovered fuel gas (i.e., a mixture of hydrogen gas and vaporized hydrocarbon fuel) into minute bubbles, and mix the fuel gas in the form of minute bubbles back into the hydrogen-blended fuel. With the re-mixing process, the hydrogen concentration in the hydrogen-blended fuel is prevented from being lowered due to the escape of hydrogen gas from the fuel, and hydrogen-blended fuel having a constant steady hydrogen concentration can be injected from the in-cylinder injector 18.

Modified Examples of First to Third Embodiments

The first to third embodiments as illustrated above may be modified, for example, in the manners as described below.

The engine system of each of the illustrated embodiments may be equipped with port injectors for injecting fuel into intake ports, instead of the in-cylinder injectors 18. It is also possible to provide port injectors in addition to the in-cylinder injectors 18, and use both types of injectors depending upon the operating conditions.

In the engine system of each of the illustrated embodiments, the minute-bubble producing device 40 may be disposed in the fuel tank 30, and hydrogen gas may be mixed into the hydrocarbon fuel or hydrogen-blended fuel in the fuel tank 30. Alternatively, two minute-bubble producing devices 40 may be disposed in the fuel supply channel 34 and the fuel tank 30, and hydrogen gas may be mixed into the fuel at the respective locations.

In the engine systems of the first and third embodiments, a hydrogen sensor, instead of the pressure sensor 46, may be provided in the fuel tank 30 for measuring the concentration of gaseous hydrogen contained in the fuel tank 30. In this case, it is determined that the condition for the implementation of the hydrogen-gas re-mixing process is satisfied if the concentration of gaseous hydrogen contained in the fuel tank 30 exceeds a threshold value.

In the engine system of the third embodiment, the regenerating system 72 may supply electric energy directly to the hydrogen-producing device 60. In this case, the battery 70 may be charged with electric energy generated while the hydrogen-producing device 60 is not in operation.

Fourth Embodiment

Referring to FIG. 7 through FIG. 12, a fourth exemplary embodiment of the invention will be described.

Figure 7:
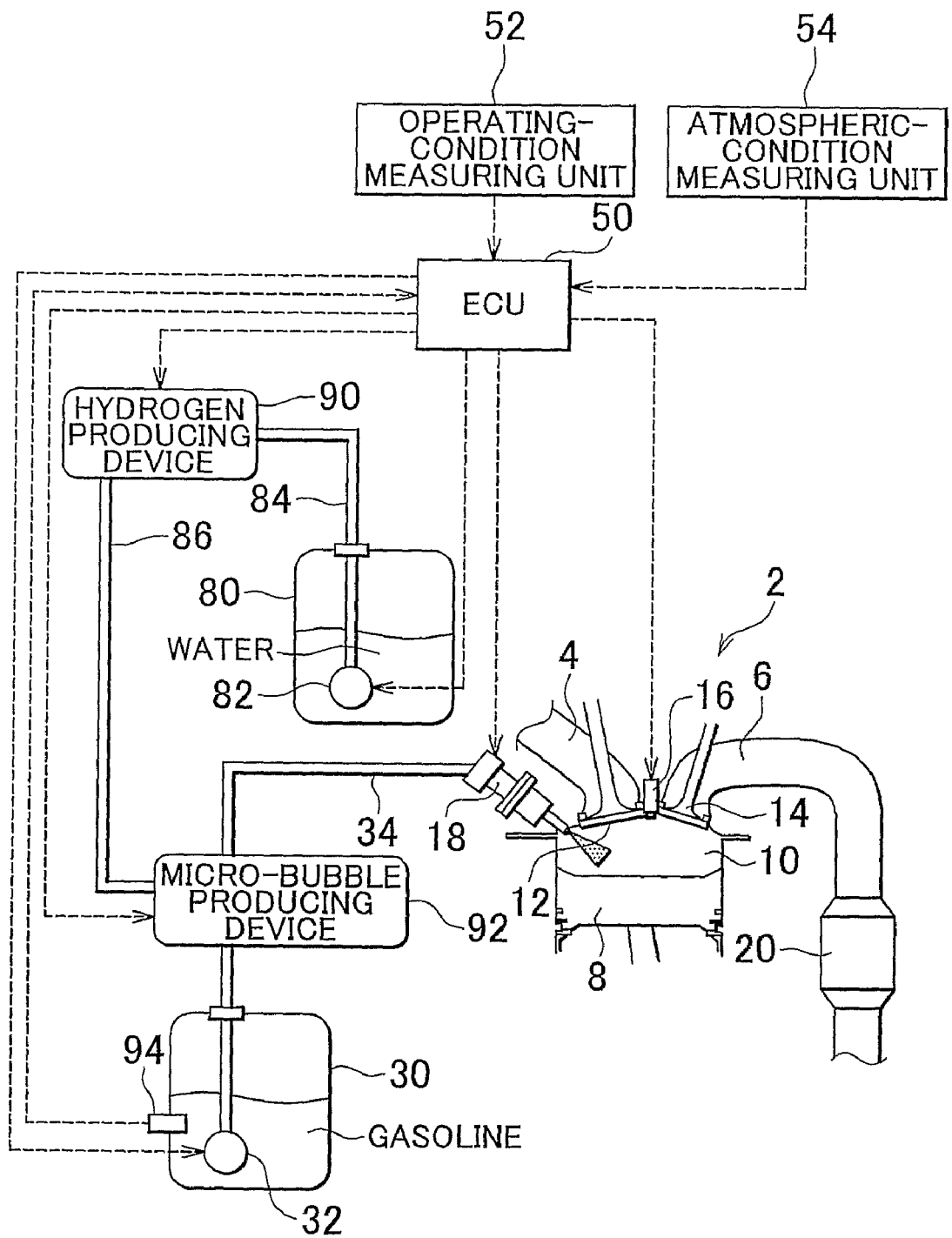
FIG. 7 is a view showing a system of a hydrogen-using internal combustion engine constructed according to a fourth embodiment of the invention.

FIG. 7 schematically shows a system of a hydrogen-using internal combustion engine (hereinafter simply referred to as "engine"), which is constructed according to the fourth embodiment of the invention. The engine of this embodiment has an engine 2. The construction of the engine 2 is substantially identical with that of the first embodiment, except that a catalyst (e.g., NOx catalyst) 20 for purifying combustion gas is disposed in the exhaust passage 6, and no explanation of the engine 2 will be provided herein. In FIG. 7, the same reference numerals as used in FIG. 1 are used for identifying the same elements or components as those of the engine system of the first embodiment.

In the engine system of FIG. 7, the in-cylinder injector 18 is connected to the fuel tank 30 via the fuel supply line 34, and a liquid hydrocarbon fuel, such as gasoline, is stored in the fuel tank 30. The liquid fuel in the fuel tank 30 is drawn up by the fuel pump (high-pressure pump) 32 disposed in the fuel supply line 34, and is supplied to the in-cylinder injector 18 after being compressed to a certain pressure level that is higher than the pressure of combustion gas in the combustion chamber 10. The fuel pump 32 may be a mechanical pump that is driven by the engine 2, or an electric pump that is driven by a motor. A fuel property sensor 94 that transmits a signal or signals representing the properties, such as specific gravity, octane, and degree of addition of alcohol, of the liquid fuel stored in the fuel tank 30 is attached to the fuel tank 30.

A micro-bubble producing device 92 for mixing hydrogen gas into the liquid fuel is disposed downstream of the fuel pump 32 in the fuel supply line 34. The micro-bubble producing device 92 forms hydrogen gas into minute bubbles (which will be called "micro-bubbles") having a diameter of several tens of microns, and mixes the micro-bubbles into the liquid fuel in the fuel supply line 34. The method of producing micro-bubbles by use of the micro-bubble producing device 92 is not limited to any particular method provided that hydrogen gas can be formed into micro-bubbles in the liquid fuel. For example, the micro-bubble producing device 92 of this embodiment may employ any one of the first to third methods of producing micro-bubbles as described below by way of example.

In a first method of producing micro-bubbles, hydrogen gas is blown into an intense flow of the liquid fuel so that strong shearing force generated in the flow of the liquid fuel causes the hydrogen gas to be crushed into micro-bubbles.

In a second method of producing micro-bubbles, pressure is applied to hydrogen gas so that a larger amount of hydrogen gas is dissolved in the liquid fuel. In this condition, cavities are formed by, for example, increasing the flow rate of the liquid fuel.

In a third method of producing micro-bubbles, ultrasonic waves are applied to the liquid fuel so as to oscillate and split bubbles of hydrogen gas contained in the liquid fuel.

By using the micro-bubble producing device 92 for forming hydrogen gas into micro-bubbles and mixing the micro-bubbles into the liquid fuel, hydrogen gas can be uniformly mixed and dissolved into the liquid fuel. By forming hydrogen gas into micro-bubbles, the hydrogen gas can be uniformly present in the form of micro-bubbles in the liquid fuel without escaping from the fuel, even in the case where the amount of hydrogen supplied is greater, by a certain degree, than the amount of hydrogen with which the liquid fuel is saturated. Thus, the hydrogen gas once mixed into the liquid fuel is unlikely to escape from the liquid fuel during a period between the mixing of hydrogen gas and injection of the fuel, and the mixture of hydrogen gas and the liquid fuel can be substantially handled as a liquid.

The hydrogen gas to be mixed into the liquid fuel is supplied from a hydrogen-producing device 90 to the micro-bubble producing device 92 via a hydrogen-gas supply line 86. The hydrogen-producing device 90 is adapted to immediately form hydrogen gas from a liquid hydride. Water, alcohol, gasoline, light oil, or the like, may be used as the liquid hydride. In the present embodiment, water is used as the liquid hydride. The method of producing hydrogen gas by the hydrogen-producing device 90 may be selected from, for example, the first to third methods as described below.

In a first method of producing hydrogen, counter-electromotive force is applied to a fuel cell so as to form hydrogen through electrolysis of water.

In a second method of producing hydrogen, a liquid hydride is decomposed with low-temperature plasma. More specifically, the liquid hydride is subjected to dc pulse charge so as to form hydrogen gas.

In a third method of producing hydrogen, water is reduced using a metal that is in a highly active state. For example, aluminum or an aluminum alloy is subjected to rubbing in pure water so as to accelerate corrosive reactions between water and the metal and decompose water molecules, thereby to produce pure hydrogen gas. Also, water may be supplied to a powder of magnesium hydride or magnesium hydride alloy so as to form pure hydrogen gas. Furthermore, metal iron obtained by reducing iron oxide may be reacted with water vapor so that pure hydrogen gas can be produced through oxidation of the iron.

In any of the above-described methods, hydrogen gas can be immediately produced as needed from a liquid hydride, such as water. According to the third method, in particular, only pure hydrogen gas can be produced. Since hydrogen gas can be formed at a relatively low temperature or room temperature in any of the above methods, a relatively large amount of hydrogen gas can be dissolved into the liquid fuel when the micro-bubble producing device 92 mixes the hydrogen gas into the liquid fuel.

By using the hydrogen-producing device 90 for producing hydrogen gas, hydrogen to be used by the engine may be mainly stored in a liquid state in the engine system. As compared with the case where hydrogen is stored in the gas phase in, for example, a pressure tank, hydrogen can be more easily handled, and can be stored in a reduced space, assuring high installation efficiency. In the present embodiment, water used for forming hydrogen gas in the hydrogen-producing device 90 is supplied from a water tank 80 via a water supply line 84. A water pump 82 for drawing up water from the water tank 80 and supplying it to the hydrogen producing device 90 is disposed in the water supply line 84.

In the engine system as described above, gaseous hydrogen needs to be handled in only in a limited range, namely, in the hydrogen-gas supply line 86 between the hydrogen producing device 90 and the micro-bubble producing device 92. This makes it easier to take measures against, for example, leakage of hydrogen gas, as compared with the case where gaseous hydrogen is handled in all the way from a storage tank to the location of fuel injection as in conventional systems. In addition, the hydrogen-blended fuel to be supplied to the in-cylinder injector 18, which is obtained by mixing hydrogen gas into the liquid fuel, is substantially in a liquid phase, and, therefore, conventional in-cylinder injectors for use with liquid fuel may be used without modification.

The engine system of the fourth embodiment includes ECU (Electronic Control Unit) 50 as its control unit. The output part of the ECU 50 is connected to various devices or equipment including, for example, the ignition plug 16, in-cylinder injector 18, fuel pump 32, water pump 82, micro-bubble producing device 92, and the hydrogen producing device 90. The input part of the ECU 50 is connected to various sensors including, for example, the fuel property sensor 94, operating-condition measuring unit 52 for acquiring information (including, for example, the accelerator pedal position, vehicle speed, engine speed, air/fuel ratio, water temperature and a knock signal) concerning the operating conditions of the engine 2, and the atmospheric-condition measuring unit 54 for acquiring information (including, for example, the ambient temperature, humidity, and barometric pressure) concerning the conditions of the atmosphere. The ECU 50 controls the above-indicated devices and others according to certain control programs, based on the outputs of the above-indicated sensors and others.

Figure 8:
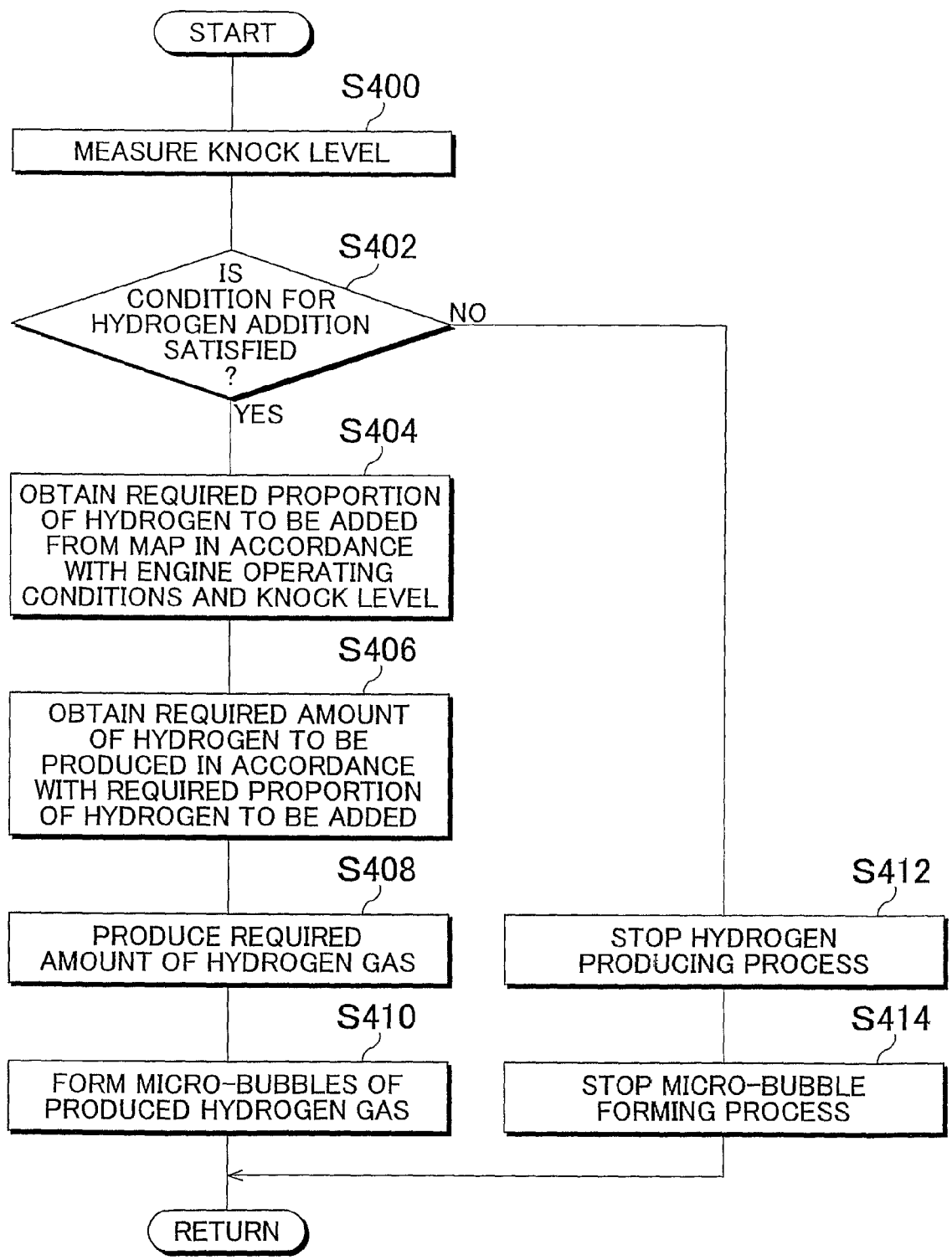
FIG. 8 is a flowchart illustrating a first example of routine of hydrogen addition control implemented in the fourth embodiment of the invention.

The engine of the fourth embodiment uses hydrogen gas added to the liquid fuel for suppressing knocking during a high-load operation. FIG. 8 is a flowchart illustrating a first example of routine of hydrogen addition control implemented by the ECU 50 in this embodiment. The routine shown in FIG. 8 is executed at regular intervals, for example, each time the crankshaft reaches a predetermined crank angle.

In the initial step S400 of the routine shown in FIG. 8, the operating-condition measuring unit 52 measures the knock level, or the magnitude of knocking generated in the engine 2. In step S402, the knock level in the engine to which no hydrogen is added is obtained from the measured knock level, and it is determined based on the knock level at which no hydrogen is added whether a condition for the implementation of hydrogen addition is satisfied. If the condition for the hydrogen addition is satisfied, hydrogen gas is added to the liquid fuel through the operations of step S404 to step S410.

In step S404, the required amount of hydrogen to be added is obtained from a pre-stored map, in accordance with the knock level and other operating conditions of the engine 2 including, for example, the accelerator pedal position, engine speed, water temperature, and the air/fuel ratio. The amount of hydrogen to be added may be defined, for example, as the ratio of the heating value of hydrogen gas to the total heating value of the fuel as a whole (i.e., a mixture of liquid fuel and hydrogen gas). In the map, the required amount of hydrogen to be added is increased as the knock level in the engine with no hydrogen added increases.

In step S406, the required amount of hydrogen to be produced (i.e., the amount of hydrogen gas that needs to be produced) is obtained in accordance with the required amount of hydrogen to be added. More specifically, the required load of the engine 2 is obtained from the accelerator pedal position, engine speed, and so forth, and a share of the load imposed on hydrogen gas (which will be called "hydrogen load") is obtained from the required load and the required amount of hydrogen to be added. Then, the required amount of hydrogen to be produced is calculated in accordance with the hydrogen load, based on, for example, the quantity of heat generated per unit amount of hydrogen gas.

In the next step S408, the water pump 82 operates to supply water from the water tank 80 to the hydrogen-producing device 90 in an amount corresponding to the required amount of hydrogen to be produced. Then, the hydrogen-producing device 90 carries out a hydrogen producing process so as to produce the required amount of hydrogen gas. The hydrogen gas thus produced is then supplied from the hydrogen-producing device 90 to the micro-bubble producing device 92.

In the next step S410, the micro-bubble producing device 92 operates to form the hydrogen gas into micro-bubbles, and mix the micro-bubbles of hydrogen gas into the liquid fuel. The liquid fuel mixed with the hydrogen gas is then supplied from the micro-bubble producing device 92 to the in-cylinder injector 18, so that the liquid fuel is injected from the in-cylinder injector 18 directly into the combustion chamber 10.

Through the injection of the fuel containing highly combustible hydrogen gas, knocking at a high load is suppressed, and the knock level measured in step S400 is reduced. If step S402 determines that the condition for the implementation of hydrogen addition is no longer satisfied, the hydrogen producing process in the hydrogen-producing device 90 is stopped in step S412, and the process of forming micro-bubbles by the micro-bubble producing device 92 is subsequently stopped in step S414.

According to the hydrogen addition control routine as described above, when hydrogen gas is needed for suppressing knocking, hydrogen gas is immediately produced from water by the hydrogen-producing device 90, and the produced hydrogen gas is formed into micro-bubbles and mixed into the liquid fuel. In this manner, knocking can be quickly suppressed in the engine operating at a high load, thus allowing the engine to operate at a high efficiency, for example, with the ignition timing advanced.

In the above arrangement in which hydrogen gas is produced from water as needed, there is no need to store gaseous hydrogen, which is difficult to handle and requires larger storage space and results in poor installation efficiency. Furthermore, since only the required amount of hydrogen gas is produced, and the hydrogen gas thus produced is entirely formed into micro-bubbles and mixed into the liquid fuel, there is no need to provide a buffer tank for accommodating any excess in the amount of hydrogen gas produced over the amount of hydrogen gas supplied.

Figure 9:
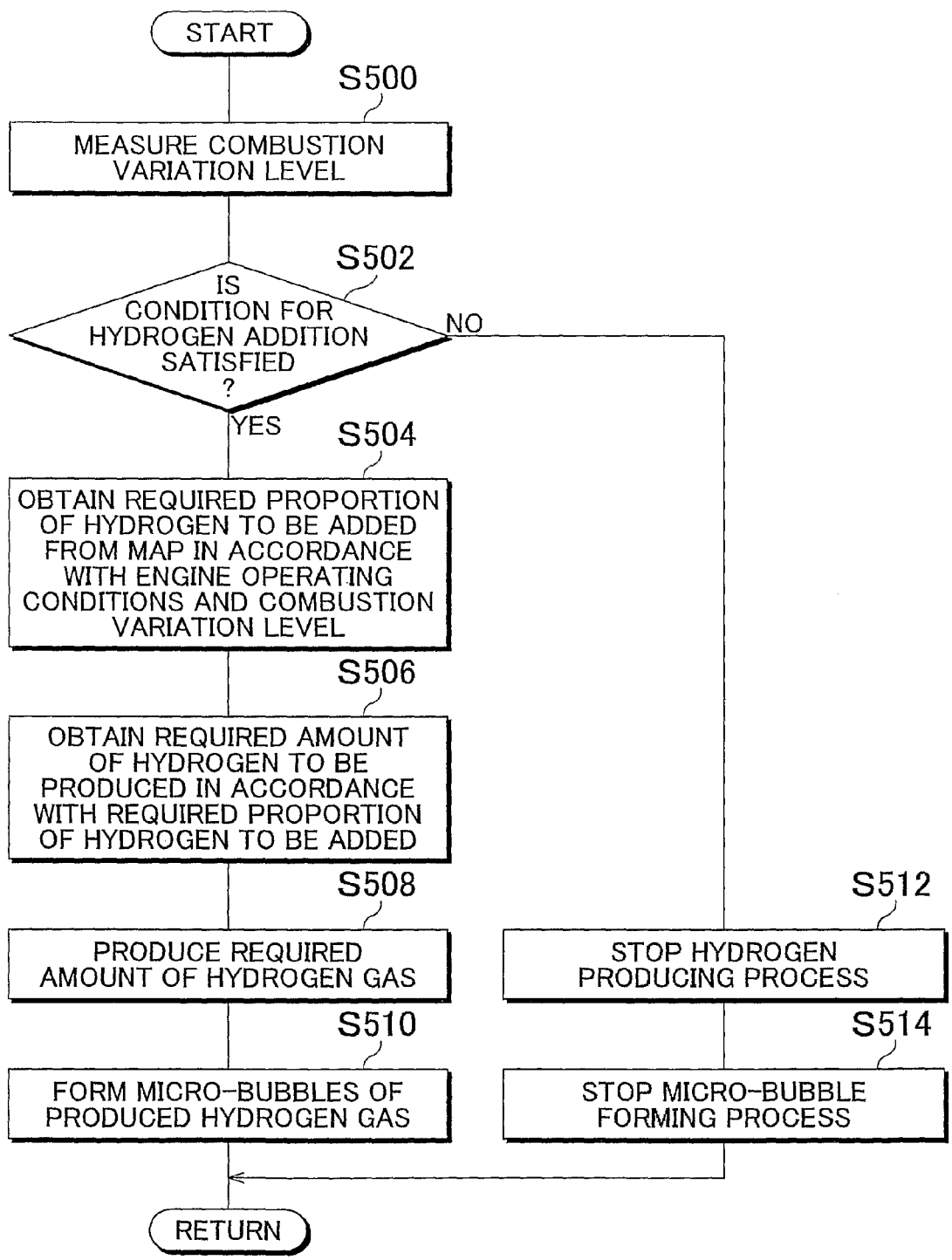
FIG. 9 is a flowchart illustrating a second example of routine of hydrogen addition control implemented in the fourth embodiment of the invention.

FIG. 9 is a flowchart illustrating a second example of routine of hydrogen addition control implemented by the ECU 50 in the fourth embodiment. By causing the ECU 50 to execute the routine of FIG. 9 in place of or in addition to the routine of FIG. 8, the engine system of this embodiment is able to add hydrogen gas to the liquid fuel for the purpose of suppressing or dampening combustion variations during lean-burn operations. The routine shown in FIG. 9 is executed at regular intervals, for example, each time the crankshaft reaches a predetermined crank angle.

In the initial step S500 of the routine shown in FIG. 9, the operating-condition measuring unit 52 measures the combustion variation level, namely, the magnitude of combustion variations that appear in the engine 2. More specifically, the combustion variation level may be measured from variations or changes in the engine speed and/or the pressure in the cylinder. In the next step S502, the combustion variation level of the engine to which no hydrogen is added is obtained from the measured combustion variation level, and it is determined based on the combustion variation level with no hydrogen added whether a condition for the implementation of hydrogen addition is satisfied. If the condition for the hydrogen addition is satisfied, hydrogen gas is added to the liquid fuel through the operations of step S504 to step S510.

In step S504, the required amount of hydrogen to be added is obtained from a pre-stored map, in accordance with the combustion variation level and other operating conditions of the engine 2 including, for example, the accelerator pedal position, engine speed, water temperature, and the air/fuel ratio. In the map, the required amount of hydrogen to be added increased as the combustion variation level of the engine with no hydrogen added increases and the engine load obtained from the accelerator pedal position and the engine speed decreases. In the next step S506, the required amount of hydrogen to be produced is obtained in accordance with the required amount of hydrogen to be added.

In the next step S508, the water pump 82 and the hydrogen-producing device 90 are operated to carry out a hydrogen producing process in accordance with the required amount of hydrogen to be produced. The hydrogen gas produced by the hydrogen-producing device 90 is then fed to the micro-bubble producing device 92, which in turn forms the hydrogen gas into micro-bubbles and mixes the micro-bubbles into the liquid fuel (step S510). The liquid fuel mixed with the hydrogen gas is then supplied from the micro-bubble producing device 92 to the in-cylinder injector 18, and is injected from the in-cylinder injector 18 directly into the combustion chamber 10.

Through the injection of the fuel containing highly combustible hydrogen gas, combustion variations at a low load are suppressed, and the combustion variation level measured in step S500 is reduced. If step S502 determines that the condition for the implementation of hydrogen addition is no longer satisfied, the hydrogen producing process in the hydrogen producing device 90 stops in step S512, and the process of forming micro-bubbles by the micro-bubble producing device 92 subsequently stops in step S514.

According to the hydrogen addition control routine as described above, when hydrogen gas is needed for suppressing combustion variations, hydrogen gas is immediately produced from water by the hydrogen producing device 90, and the produced hydrogen gas is formed into micro-bubbles and mixed into the liquid fuel. In this manner, combustion variations can be quickly suppressed or avoided during lean-burn operations of the engine, thus allowing the engine to operate over an expanded lean-burn region.

Figure 10:
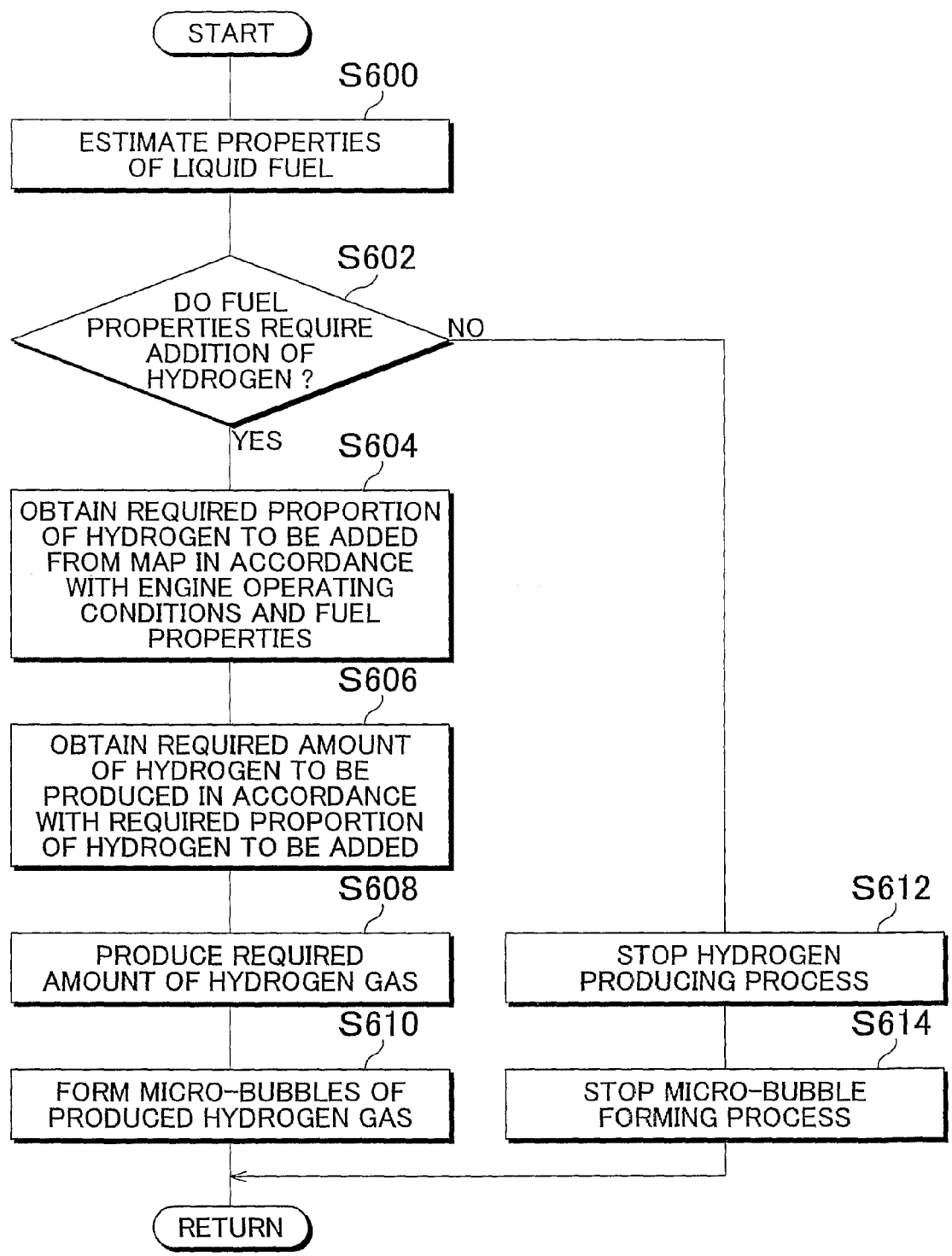
FIG. 10 is a flowchart illustrating a third example of routine of hydrogen addition control implemented in the fourth embodiment of the invention.

FIG. 10 is a flowchart illustrating a third example of routine of hydrogen addition control implemented by the ECU 50 in the fourth embodiment. By causing the ECU 50 to execute the routine of FIG. 10 in place of or in addition to the routines of FIG. 8 and FIG. 9, the engine system of this embodiment is able to add hydrogen gas to the liquid fuel for the purpose of correcting the properties of the fuel. As the properties of the liquid fuel change, the performance or operating characteristics (such as misfire limit and knocking limit) of the engine 2 may vary in accordance with the changes in the fuel properties. In this example, hydrogen gas is added to correct the fuel properties, thereby to provide constant steady engine performance. The routine shown in FIG. 10 is executed at regular intervals, for example, each time the crankshaft reaches a predetermined crank angle.

In the initial step S600 of the routine shown in FIG. 10, the properties (such as the weight, octane and the degree of addition of alcohol) of the liquid fuel stored in the fuel tank 30 are estimated from a signal received from the fuel property sensor 94. The fuel properties may also be estimated from variations in the engine speed and/or the pressure in the cylinder. In the next step S602, it is determined whether the estimated fuel properties require addition of hydrogen. If the liquid fuel is, for example, a heavy fuel, or a low-octane fuel, or a fuel having a high degree of addition of alcohol, hydrogen will need to be added to the fuel. If it is determined that the estimated fuel properties require the addition of hydrogen, then hydrogen gas is added to the liquid fuel through the operations of step S604 to step S610.

In step S604, the required amount of hydrogen to be added is obtained from a pre-stored map, in accordance with the fuel properties and the operating conditions of the engine 2. In the map, the required amount of hydrogen added is increased as weight of the fuel increases, the octane number decreases, or the proportion of added alcohol increases. In the next step S606, the required amount of hydrogen to be produced is obtained in accordance with the required amount of hydrogen to be added.

In the next step S608, the water pump 82 and the hydrogen-producing device 90 are operated to carry out a hydrogen producing process in accordance with the required amount of hydrogen to be produced. The hydrogen gas produced by the hydrogen-producing device 90 is then fed to the micro-bubble producing device 92, which in turn forms the hydrogen gas into micro-bubbles and mixes the micro-bubbles into the liquid fuel (step S610). The liquid fuel mixed with the hydrogen gas is supplied from the micro-bubble producing device 92 to the in-cylinder injector 18, and is injected from the in-cylinder injector 18 directly into the combustion chamber 10.

If the properties of the liquid fuel in the fuel tank 30 change due to, for example, refueling, it may be determined in step S602 that there is no need to add hydrogen to the fuel. In this case, the hydrogen producing process in the hydrogen-producing device 90 stops in step S612, and the process of forming micro-bubbles by the micro-bubble producing device 92 subsequently stops in step S614.

According to the hydrogen addition control routine as described above, when the properties of the liquid fuel require addition of hydrogen to the fuel, hydrogen gas is immediately produced from water by the hydrogen producing device 90, and the produced hydrogen gas is formed into micro-bubbles and mixed into the liquid fuel. In this manner, variations in the fuel properties can be corrected or eliminated by controlling the degree of addition of hydrogen, and constant steady engine performance can be maintained without depending upon the fuel properties.

Figure 11:
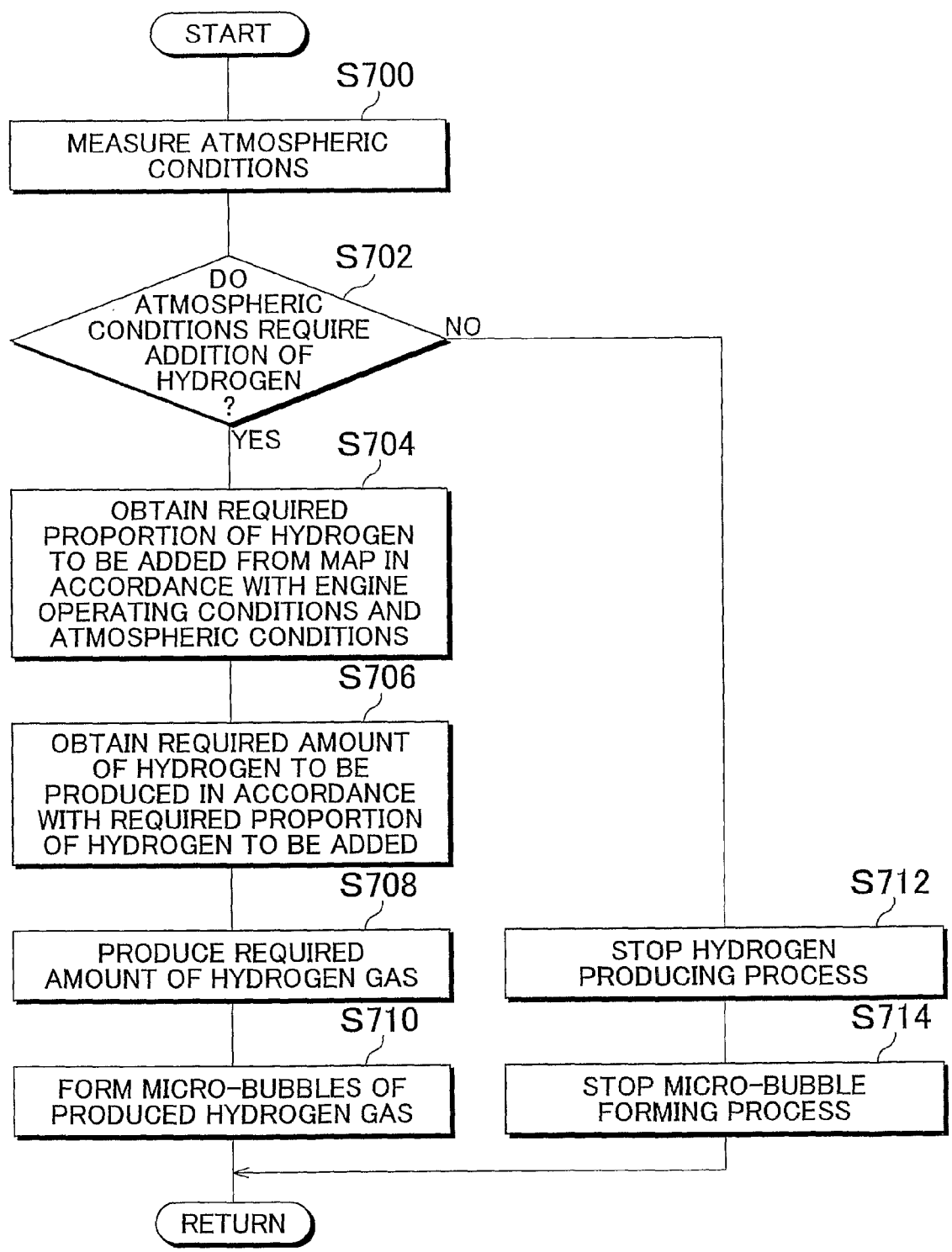
FIG. 11 is a flowchart illustrating a fourth example of routine of hydrogen addition control implemented in the fourth embodiment of the invention.

FIG. 11 is a flowchart illustrating a fourth example of routine of hydrogen addition control implemented by the ECU 50 in the fourth embodiment. By causing the ECU 50 to execute the routine of FIG. 11 in place of or in addition to the routines of FIG. 8, FIG. 9 and FIG. 10, the engine system of this embodiment is able to add hydrogen gas to the liquid fuel in order to correct or eliminate influences of the atmospheric conditions on the performance or operating characteristics (such as misfire limit and knocking limit) of the engine 2. The routine shown in FIG. 11 is executed at regular intervals, for example, each time the crankshaft reaches a predetermined crank angle.

In the initial step S700 of the routine shown in FIG. 11, the current atmospheric conditions (such as the ambient temperature, humidity, and barometric pressure) are measured by the atmospheric-condition measuring unit 54. In the next step S702, it is determined whether the measured atmospheric conditions require addition of hydrogen to the liquid fuel. For example, knocking is more likely to occur as the temperature and barometric pressure increase and the humidity decreases, and addition of hydrogen may be needed to suppress knocking, depending upon the atmospheric conditions. Meanwhile, misfire is more likely to occur as the temperature and barometric pressure decrease, and addition of hydrogen may be needed to prevent misfire in the engine, depending upon the atmospheric conditions. If the current atmospheric conditions require addition of hydrogen to the fuel, hydrogen gas is added to the liquid fuel through the operations of step S704 to step S710.

In step S704, the required amount of hydrogen to be added is obtained from a pre-stored map in accordance with the atmospheric conditions and the operating conditions of the engine 2. In the map, the required amount of hydrogen to be added is increased as the temperature and barometric pressure increase and the humidity decreases when the engine load calculated from the accelerator pedal position and the engine speed is high. When the engine load is low, the required amount of hydrogen to be added is increased as the temperature and the barometric pressure decrease. In step S706, the required amount of hydrogen to be produced is obtained in accordance with the required amount of hydrogen to be added.

In the next step S708, the water pump 82 and the hydrogen-producing device 90 are operated to carry out a hydrogen producing process in accordance with the required amount of hydrogen to be produced. The hydrogen gas produced by the hydrogen-producing device 90 is fed to the micro-bubble producing device 92, which in turn forms the hydrogen gas into micro-bubbles and mixes the micro-bubbles into the liquid fuel (step S710). The liquid fuel blended with the hydrogen gas is then supplied from the micro-bubble producing device 92 to the in-cylinder injector 18, and is injected from the in-cylinder injector 18 directly into the combustion chamber 10.

When the atmospheric conditions change due to, for example, changes in the weather or changes in the altitude of the running vehicle, it may be determined in step S702 that there is no longer a need to add hydrogen to the liquid fuel. In this case, the hydrogen producing process in the hydrogen-producing device 90 is stopped in step S712, and the process of forming micro-bubbles by the micro-bubble producing device 92 is subsequently stopped in step S714.

According to the hydrogen addition control routine as described above, when the current atmospheric conditions require addition of hydrogen to the liquid fuel, hydrogen gas is immediately produced from water by the hydrogen-producing device 90, and the produced hydrogen gas is formed into micro-bubbles and mixed into the liquid fuel. With the addition of hydrogen gas to the fuel, knocking or misfire due to the influences of the temperature, humidity and/or barometric pressure is suppressed or prevented during high-load operations (in the case of knocking) or low-load operations (in the case of misfire). Thus, the engine is able to maintain constant steady performance without depending upon the atmospheric conditions.

Figure 12:
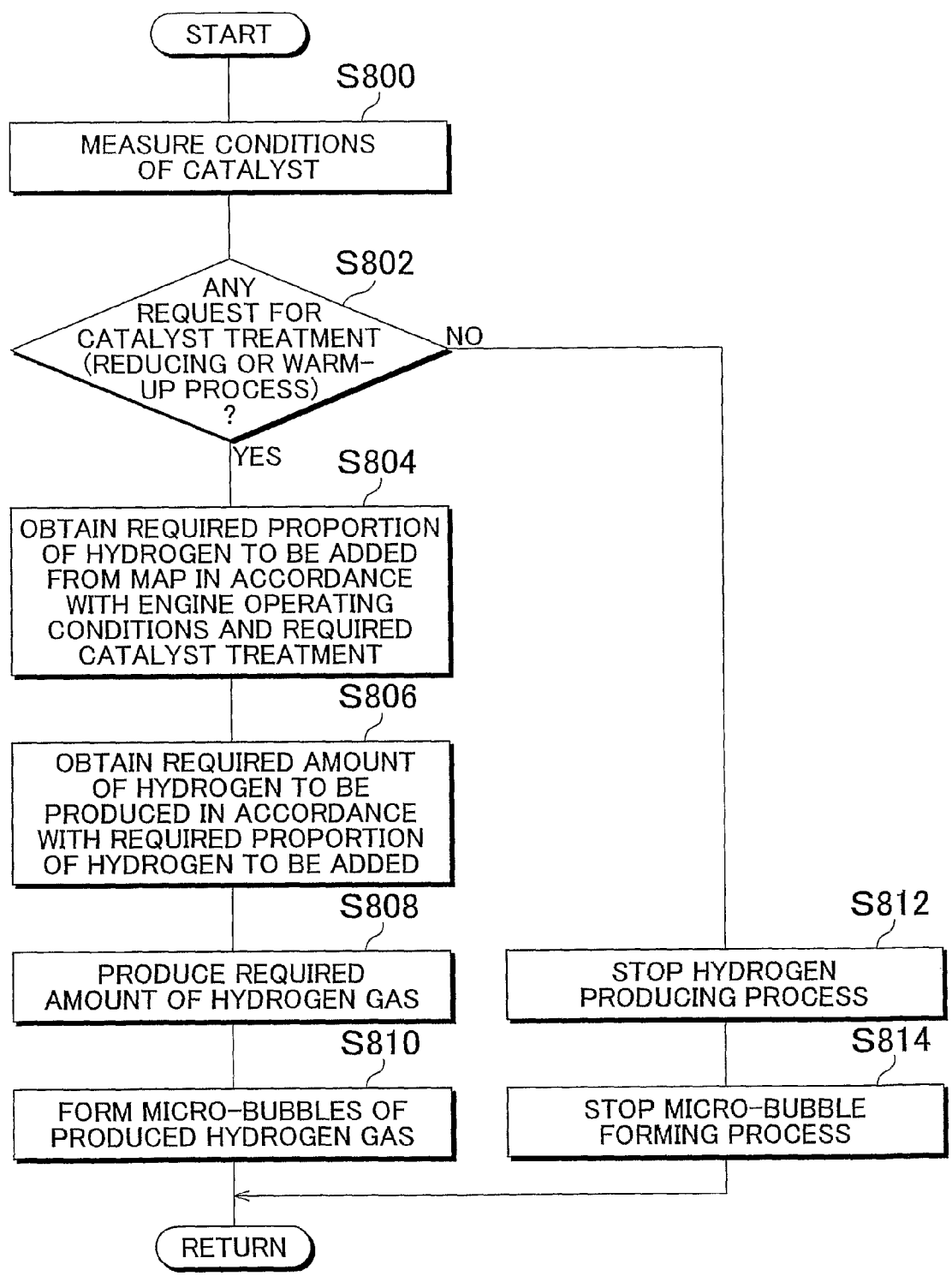
FIG. 12 is a flowchart illustrating a fifth example of routine of hydrogen addition control implemented in the fourth embodiment of the invention.

FIG. 12 is a flowchart illustrating a fifth example of routine of hydrogen addition control implemented by the ECU 50 in the fourth embodiment. By causing the ECU 50 to execute the routine of FIG. 12 in place of or in addition to the routines of FIG. 8 through FIG. 11, the engine system of this embodiment is able to add hydrogen gas to the liquid fuel so as to perform a reducing process or warm-up process for the catalyst 20. The routine shown in FIG. 12 is executed at regular intervals, for example, each time the crankshaft reaches a predetermined crank angle.

In the initial step S800 of the routine shown in FIG. 12, the current conditions of the catalyst 20 are measured by the operating-condition measuring unit 52. More specifically, the amount of NOx adsorbed by the catalyst 20 and the temperature of the catalyst 20 are measured. The amount of NOx adsorbed by the catalyst 20 may be indirectly obtained from the total time of lean-burn operations as measured from the last reducing process. The temperature of the catalyst 20 may be directly measured by a temperature sensor, or may be indirectly obtained from the temperature of exhaust gas.

In the next step S802, it is determined from the current conditions of the catalyst 20 measured in step S800 whether any request for treating the catalyst 20 is made. For example, where the amount of NOx adsorbed by the catalyst 20 is close to its limit, it is judged as being necessary to perform a reducing process for the catalyst 20. Where the temperature of the catalyst 20 is lower than an appropriate temperature at which the purifying capability of the catalyst 20 reaches its maximum, it is judged as being necessary to perform a warm-up process for the catalyst 20. In either case, the liquid fuel to which hydrogen gas is added may be supplied to the catalyst 20. With the addition of hydrogen gas for the reducing process, the hydrogen gas acts on the catalyst 20 as a reductant so as to efficiently recover the adsorption capability of the catalyst 20. With the addition of hydrogen gas for the warm-up process, the hydrogen gas reacts with oxygen on the catalyst 20 so that the heat of the reaction can be used for efficiently warming up the catalyst 20. In the presence of a request for either of the catalyst treatments (i.e., reducing process and warm-up process), hydrogen gas is added to the liquid fuel through the operations of step S804 to step S810.

In step S804, the required amount of hydrogen to be added is obtained from a pre-stored map, in accordance with the content of the request for the catalyst treatment (i.e., whether the reducing process or warm-up process is requested) and the operating conditions of the engine 2. In the next step S806, the required amount of hydrogen to be produced is obtained in accordance with the required amount of hydrogen to be added.

In the next step S808, the water pump 82 and the hydrogen producing device 90 are operated to carry out a hydrogen producing process in accordance with the required amount of hydrogen to be produced. The hydrogen gas thus produced by the hydrogen-producing device 90 is fed to the micro-bubble producing device 92, which in turn forms the hydrogen gas into micro-bubbles and mixes the micro-bubbles into the liquid fuel (step S810). The liquid fuel blended with the hydrogen gas is then supplied from the micro-bubble producing device 92 to the in-cylinder injector 18, and is injected from the in-cylinder injector 18 directly into the combustion chamber 10. In this example, the fuel injection consists of two injection steps, namely, a main injection step in which the fuel is injected during an intake stroke or a compression stroke, and an auxiliary injection step in which the fuel is injected during an expansion stroke or an exhaust stroke. The hydrogen gas in the fuel injected in the auxiliary injection step reaches the catalyst 20 without being burned in the combustion chamber 10, for use in the reducing process or warm-up process for the catalyst 20.

Upon completion of the reducing process or warm-up process for the catalyst 20, step S802 determines that the catalyst treatment is no longer required. In this case, the hydrogen producing process in the hydrogen-producing device 90 is stopped in step S812, and the process of forming micro-bubbles by the micro-bubble producing device 92 is subsequently stopped in step S814.

According to the hydrogen addition control routine as described above, when the reducing process or warm-up process for the catalyst 20 is needed, hydrogen gas is immediately produced from water by the hydrogen-producing device 90, and the produced hydrogen gas is formed into micro-bubbles and blended into the liquid fuel. With the addition of hydrogen gas to the fuel, the NOx adsorption capability of the catalyst 20 can be quickly recovered where the reducing process is requested, and the temperature of the catalyst 20 can be quickly elevated to an appropriate temperature where the warm-up process is requested.

Fifth Embodiment

Figure 13:
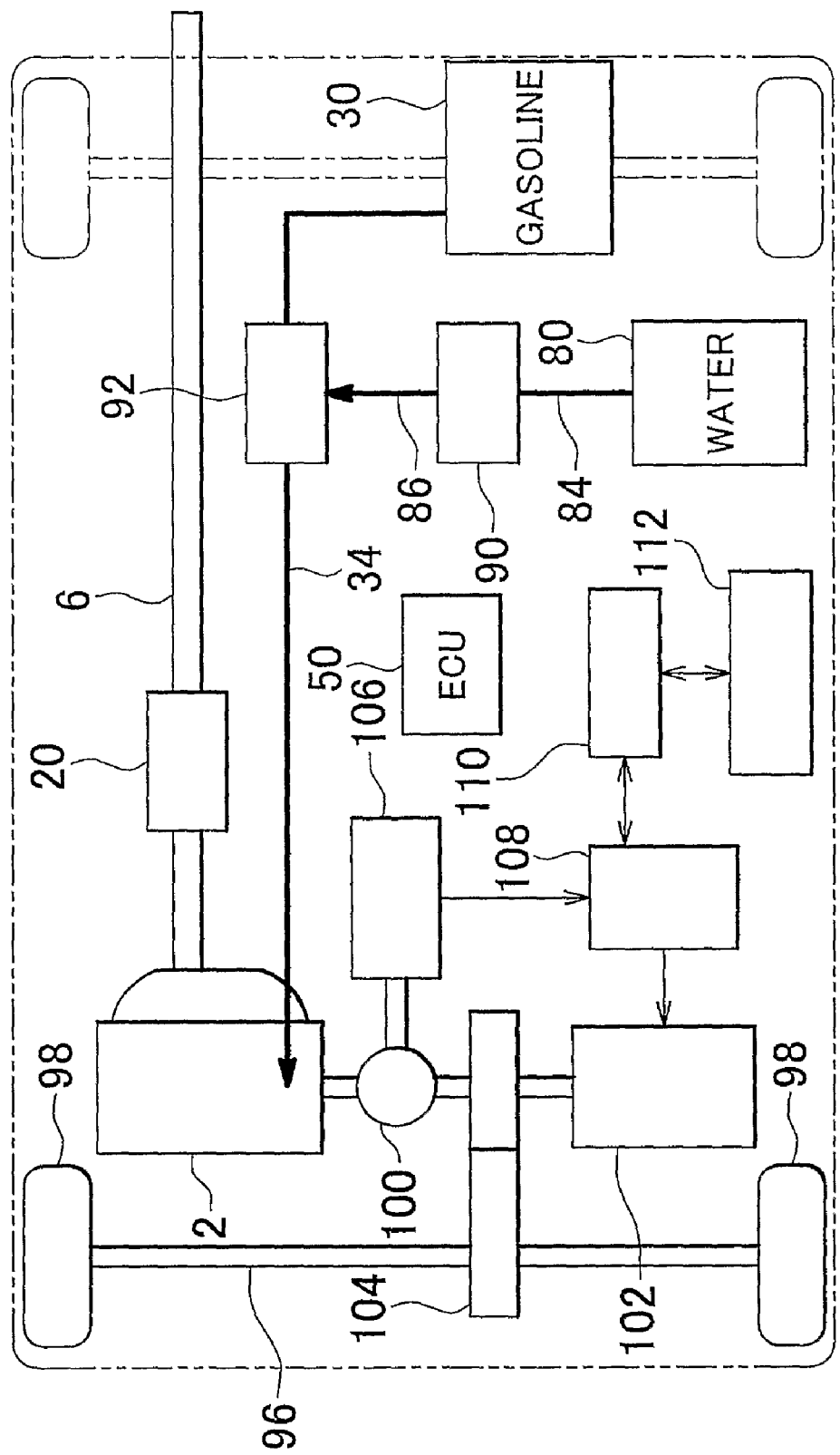
FIG. 13 is a view showing a drive system of a hybrid vehicle that employs a hydrogen-using internal combustion engine, as a fifth embodiment of the invention.
Figure 14A:
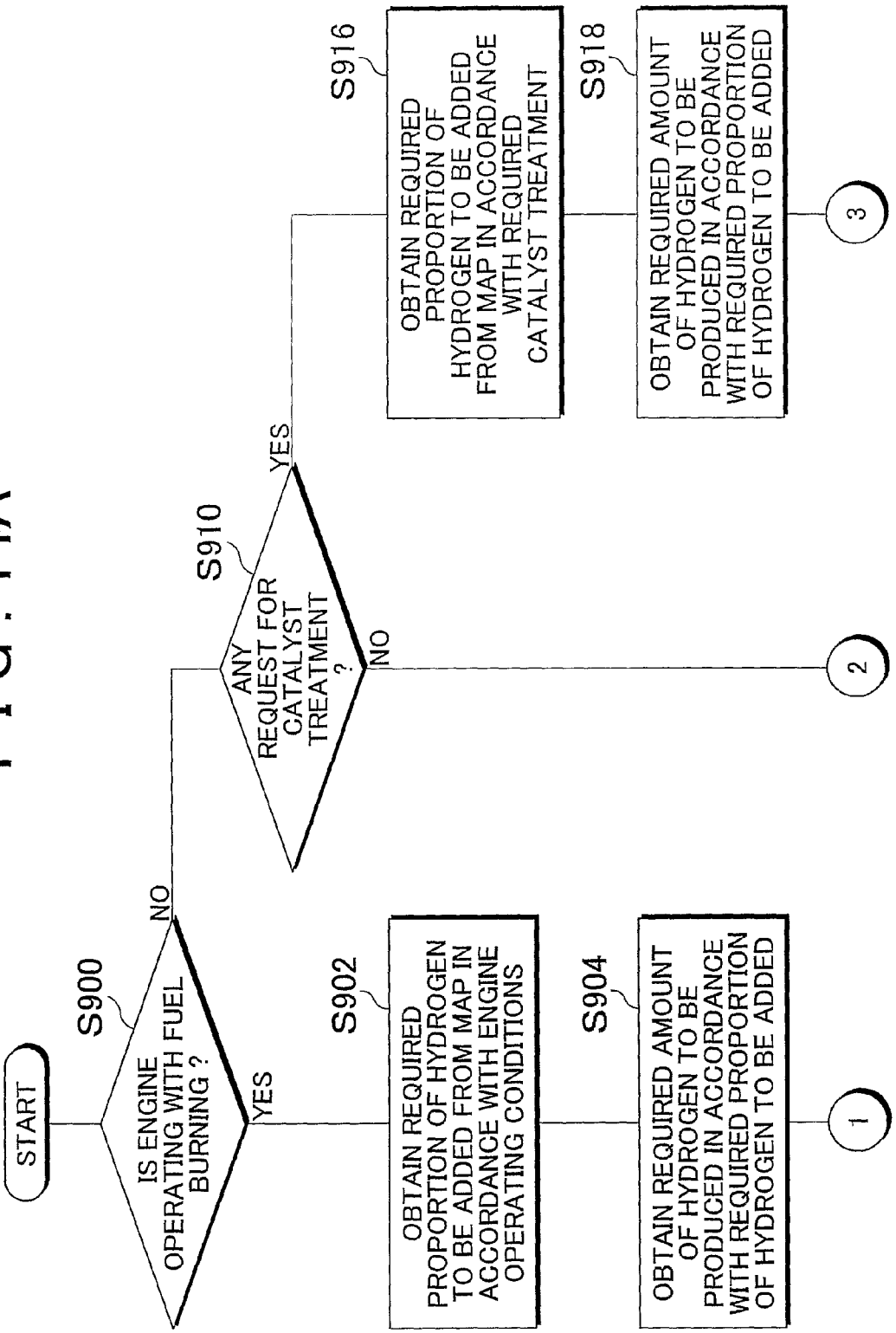

Referring to FIG. 13, FIG. 14A and FIG. 14B, a fifth exemplary embodiment of the invention will be described in detail.

FIG. 13 schematically shows a drive system of a hybrid vehicle that employs a hydrogen-using internal combustion engine according to the invention. The drive system of the hybrid vehicle of this embodiment includes, as a power unit, the engine system of the fourth embodiment as shown in FIG. 7. In FIG. 13, the same reference numerals as used in FIG. 7 are used for identifying the same elements or components as used in the fourth embodiment.

The drive system of the hybrid vehicle shown in FIG. 13 includes a motor 102 as another power unit, and a generator 106 that is supplied with driving force of the engine 2 and generates electric power. The engine 2, motor 102 and the generator 106 are coupled to one another via a power dividing mechanism 100. A reduction gearbox 104 is connected to a rotary shaft of the motor 102 that is linked to the power dividing mechanism 100. The reduction gearbox 104 couples the rotary shaft of the motor 102 with a drive shaft 96 that is linked to drive wheels 98. The power dividing mechanism 100 is adapted to divide the driving force of the engine 2 into a first portion supplied to the generator 106 and a second portion supplied to the reduction gearbox 104. The proportion of the first and second portions of the driving force divided by the power dividing mechanism 100 may be changed as desired.

The drive system further includes an inverter 108, a converter 110 and a high voltage battery 112. The inverter 108 is connected to the generator 106 and the motor 102, and is also connected to the high voltage battery 112 via the converter 110. The electric power generated by the generator 106 may be supplied to the motor 102 via the inverter 108, or may charge the high voltage battery 112 via the inverter 108 and the converter 110. The power stored in the high voltage battery 112 may be supplied to the motor 102 via the converter 110 and the inverter 108.

The drive system constructed as described above is able to rotate the drive wheels 98 by using only the driving force of the engine 2 while stopping the motor 102, or, alternatively, is able to rotate the drive wheels 98 by using only the driving force of the motor 102 while stopping the engine 2. The drive system is also able to operate both the motor 102 and the engine 2 and rotate the drive wheels 98 by using the driving forces of the motor 102 and the engine 2. In the drive system, the motor 102 may function as a starter of the engine 2. More specifically, when the engine 2 is started, a part of or the whole of the driving force of the motor 102 may be transmitted to the engine 2 via the power dividing mechanism 100, so as to crank the engine 2. In addition, the motor 102 is able to force the engine 2 that is at rest to rotate as needed, regardless of whether the engine 2 is started or not.

The drive system of the present embodiment is controlled by the ECU 50. The ECU 50 comprehensively controls the whole drive system including, for example, the motor 102, generator 106, power dividing mechanism 100, inverter 108 and the converter 110, as well as the engine system including the engine 2. FIG. 14A and FIG. 14B are a flowchart illustrating a routine of hydrogen addition control implemented by the ECU 50 in this embodiment. The routine shown in FIG. 14A and FIG. 14B is executed at regular intervals, for example, each time the crankshaft reaches a predetermined crank angle.

In the initial step S900 of the routine shown in FIG. 14A, it is determined whether the engine 2 is operating with the fuel burning in the combustion chamber 10. If the engine 2 is operating with the fuel burning, hydrogen gas is added to the liquid fuel through the operations of step S902 to step S908.

In step S902, the required amount of hydrogen to be added is obtained from a pre-stored map, in accordance with the operating conditions of the engine 2. For example, the amount of hydrogen to be added for suppressing knocking is obtained when the engine is operating at a high load, and the amount of hydrogen to be added for preventing or suppressing misfire or combustion variations is obtained when the engine is operating at a low load. In the next step S904, the required amount of hydrogen to be produced is obtained in accordance with the required amount of hydrogen to be added.

In the next step S906, the hydrogen-producing device 90 operates to carry out a hydrogen producing process in accordance with the required amount of hydrogen to be produced. The hydrogen gas produced by the hydrogen-producing device 90 is fed to the micro-bubble producing device 92, which in turn forms the hydrogen gas into micro-bubbles and mix the micro-bubbles into the liquid fuel (step S908). By supplying the engine 2 with the liquid fuel blended with the hydrogen gas, it is possible to quickly suppress knocking during high-load operations, thus allowing the engine to operate at a high efficiency, for example, with the ignition timing advanced. It is also possible to quickly suppress or prevent misfire or combustion variations during low-load operations, thus allowing the engine to operate in an expanded lean-burn region.

If step S900 determines that the combustion is stopped in the engine 2, on the other hand, the ECU 50 proceeds to step S910. In step S910, it is determined from the current conditions of the catalyst 20 whether any request for catalyst treatment is made. When the amount of NOx adsorbed by the catalyst 20 is close to its limit, it is judged as being necessary to perform a reducing process for the catalyst 20. When the temperature of the catalyst 20 is lower than an appropriate temperature at which its purifying capability is maximized, it is judged as being necessary to perform a warm-up process for the catalyst 20. If it is determined in step S910 that either of the catalyst treatments is requested, step S916 through step S924 as explained below are executed to add hydrogen gas to the liquid fuel and supply the catalyst 20 with the liquid fuel to which the hydrogen gas is added.

In step S916, the required amount of hydrogen to be added is obtained from a pre-stored map, in accordance with the content of the request for the catalyst treatment (whether the reducing process or warm-up process is requested). In step S918, the required amount of hydrogen to be produced is obtained in accordance with the required amount of hydrogen to be added. In step S920, the hydrogen-producing device 90 is operated to carry out a hydrogen producing process in accordance with the required amount of hydrogen to be produced. The hydrogen gas produced by the hydrogen-producing device 90 is fed to the micro-bubble producing device 92, which in turn forms the hydrogen gas into micro-bubbles and mixes the micro-bubbles into the liquid fuel (step S922).

In step S924, the power dividing mechanism 100 is operated so that a part of or the whole of the driving force of the motor 102 is transmitted to the engine 2 via the power dividing mechanism 100. As a result, the engine 2 is forcibly rotated by the driving force of the motor 102, to operate as a pump for taking in air from the intake passage and discharging it into the exhaust passage 6.

In step S924, concurrently with the forced rotation of the engine 2 by the motor 102, the ECU 50 transmits an injection command to the in-cylinder injector or injectors so that the liquid fuel (hydrogen-blended fuel) mixed with hydrogen gas is injected from the in-cylinder injector or injectors into the combustion chamber or chambers. In this case, the in-cylinder injector of each cylinder may be operated, or only the in-cylinder injector or injectors of a particular cylinder or cylinders may be operated. The number of the in-cylinder injectors to be operated may also be determined depending upon the amount of the hydrogen-blended fuel to be supplied to the catalyst 20.

With the engine 2 operating as a pump, the hydrogen-blended fuel injected from each of the in-cylinder injectors into the corresponding combustion chamber is discharged as it is (i.e., without being burned) into the exhaust passage 6, along with air taken in from the intake passage. At this time, the throttle of the intake passage is closed in the case where the required catalyst treatment is a reducing process. With the throttle closed, the amount of intake air is restricted, and the percentage of air in a mixture of the hydrogen-blended fuel and air can be reduced. As a result, gas having a considerably high concentration of hydrogen is fed to the catalyst 20 so that a hydrogen-rich reducing atmosphere surrounds the catalyst 20.

In the case where the required catalyst treatment is a warm-up process, on the other hand, the throttle is opened so that air is drawn into the combustion chamber in an amount corresponding to the amount of fuel injected. The throttle opening is controlled so that the air/fuel ratio, or the ratio of air to the hydrogen-blended fuel, becomes equal to a certain air/fuel ratio suitable for burning reactions on the catalyst 20. The resulting mixture of the hydrogen-blended fuel and air is supplied to the catalyst 20 through the exhaust passage 6, and the hydrogen-blended fuel and oxygen undergo burning reactions on the catalyst 20, thereby to elevate the temperature of the catalyst 20.

Upon completion of the reducing process or warm-up process for the catalyst 20, step S910 determines that the catalyst treatment is no longer required. In this case, the hydrogen producing process in the hydrogen-producing device 90 is stopped in step S912, and the process of forming micro-bubbles by the micro-bubble producing device 92 is subsequently stopped in step S914.

According to the hydrogen addition control routine as described above, hydrogen is added to the liquid fuel in accordance with the operating conditions of the engine 2 while the engine 2 is operating with the fuel burning, so that the engine 2 can be efficiently operated in an expanded operating region defined by the knocking limit or lean-burn limit. Since the injection of the hydrogen-blended fuel is effected with the engine 2 being rotated by the motor 102 while the combustion is being stopped in the engine 2, the reducing process or warm-up process for the catalyst 20 can be efficiently performed without affecting the performance or operating characteristics of the engine 2.

Modified Examples of Fourth and Fifth Embodiments

The fourth and fifth embodiments of the invention as illustrated above may be modified, for example, in the manners as described below.

While the in-cylinder injector 18 that injects fuel directly into the combustion chamber 10 is provided as a fuel injection device in the engine shown in FIG. 7, a port injector that injects fuel into the intake port may be used. While the engine shown in FIG. 7 is a gasoline engine, the invention may also be applied to a diesel engine.

While the hybrid vehicle as shown in FIG. 13 is capable of running by using one or both of the engine 2 and the motor 102, the invention may be applied to other types of hybrid vehicles provided that the vehicle is capable of running by using at least the motor 102. Namely, the engine 2 may be used exclusively for generating electric power.

Sixth Embodiment

Figure 15:
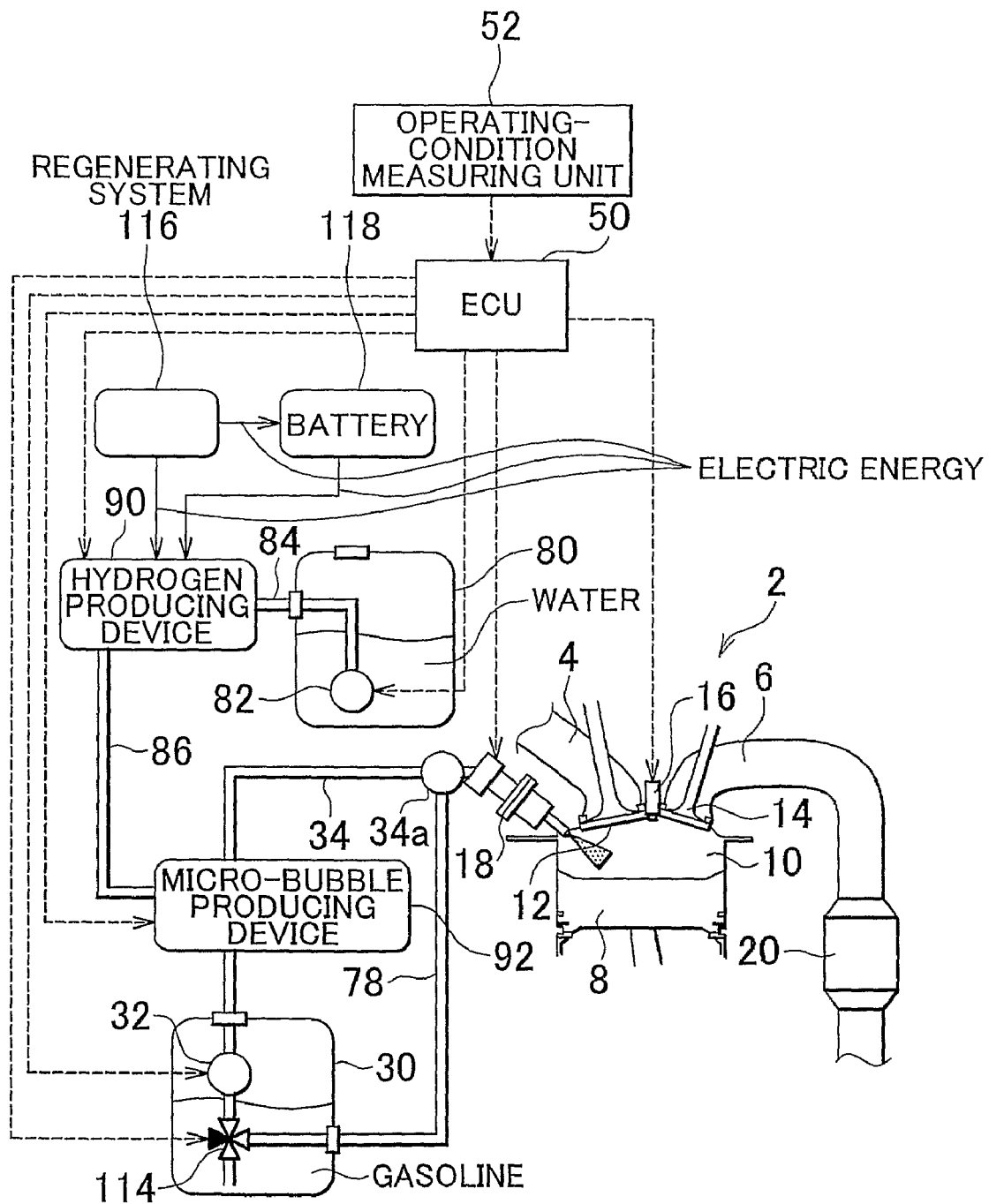
FIG. 15 is a view showing a system of a hydrogen-using internal combustion engine constructed according to a sixth embodiment of the invention.
Figure 16A:
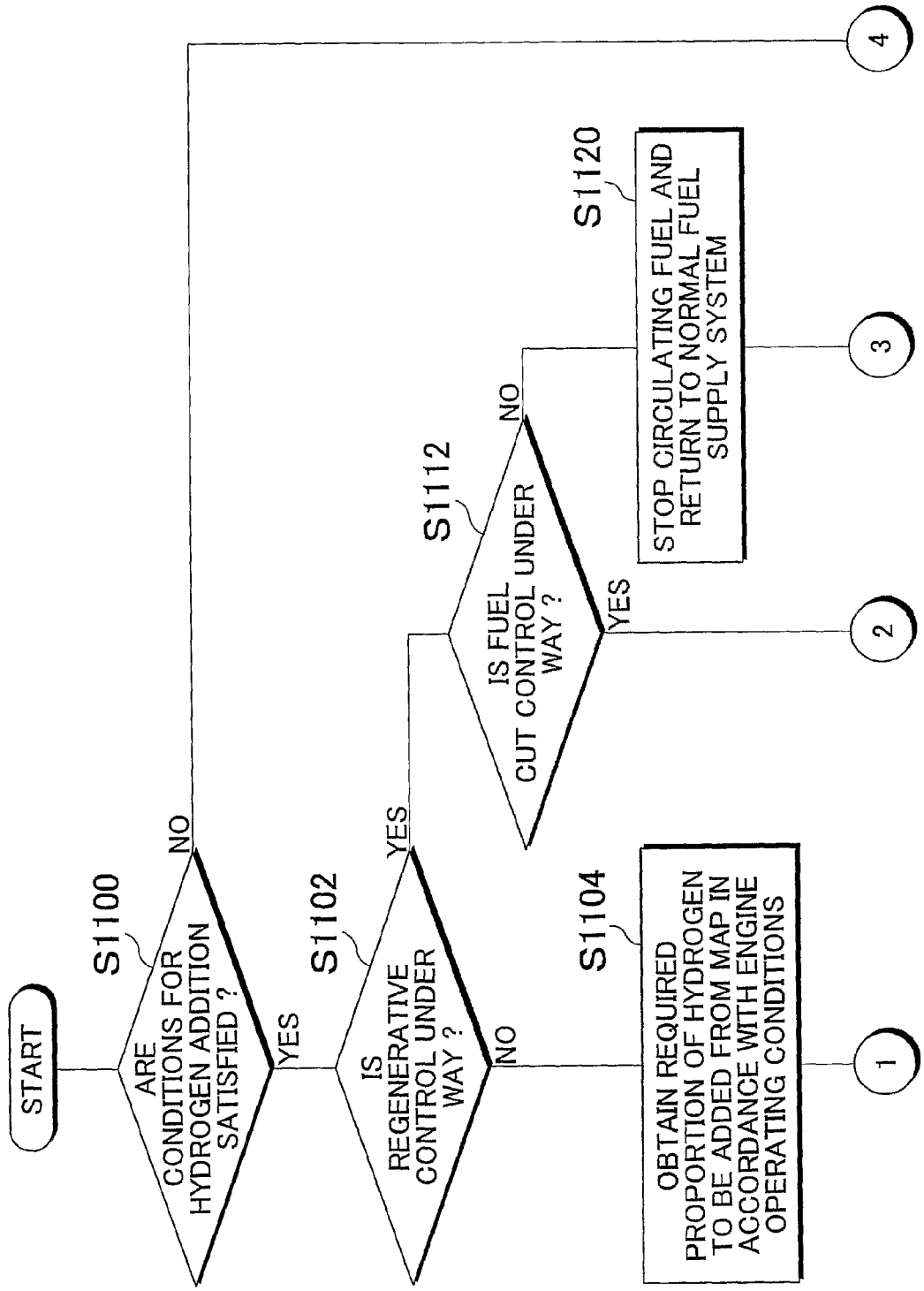

Referring next to FIG. 15, FIG. 16A and FIG. 16B, a sixth exemplary embodiment of the invention will be described in detail.

FIG. 15 schematically shows a system of a hydrogen-using internal combustion engine (hereinafter simply referred to as "engine"), which is constructed according to the sixth embodiment of the invention. The engine of this embodiment has an engine 2. The construction of the engine 2 is substantially identical with that of the first embodiment, except that a catalyst (e.g., NOx catalyst) 20 for purifying combustion gas is disposed in the exhaust passage 6, and no explanation of the engine 2 will be provided herein. In FIG. 15, the same reference numerals as used in FIG. 1 and FIG. 7 are used for identifying the same elements or components as those of the engine system of the first embodiment and the fourth embodiment.

In the engine system of FIG. 15, the in-cylinder injector 18 of the engine 2 is connected to the fuel tank 30 via the fuel supply line 34. A liquid hydrocarbon fuel, such as gasoline, is stored in the fuel tank 30. The liquid fuel in the fuel tank 30 is drawn up by the fuel pump (high-pressure pump) 32 disposed in the fuel supply line 34, and is supplied to the in-cylinder injector 18 after being compressed to a certain pressure level that is higher than the pressure of combustion gas in the combustion chamber 10. The fuel pump 32 may be a mechanical pump that is driven by the engine 2, or an electric pump that is driven by a motor.

A channel selector valve 114 is disposed upstream of the fuel pump 32 in the fuel supply line 34. The channel selector valve 114 may be a three-way valve having one outlet port and two inlet ports. The outlet port is connected to the downstream side (i.e., the side closer to the fuel pump 32) of the fuel supply line 34, and one of the inlet ports is connected to the upstream side (i.e., the side closer to the fuel inlet) of the fuel supply line 34. The other inlet port of the channel selector valve 114 is connected to one end of a fuel circulation line 78. The fuel circulation line 78 is arranged in parallel with the fuel supply line 34, and the other end of the line 78 is connected to the vicinity of the in-cylinder injector 18 in the fuel supply line 34, more specifically, to a delivery pipe 34a for distributing the liquid fuel among the in-cylinder injectors 18 of the respective cylinders.

The channel selector valve 114 is normally placed in a position in which the inlet port connected to the upstream side of the fuel supply line 34 is opened. In this case, the liquid fuel, which is drawn up from the fuel tank 30 and pressurized by the fuel pump 32, is supplied to the in-cylinder injector 18, as described above. When the channel selector valve 114 is switched to a position in which the inlet port connected to the fuel circulation line 78 is opened, a circulation system of the liquid fuel, which consists of the fuel supply line 34 and the liquid circulation line 78, is established. In this case, the injection of fuel from the in-cylinder injector 18 is stopped, and the fuel pump 32 is operated to circulate the liquid fuel under a high pressure through the circulation system.

A micro-bubble producing device 92 for mixing hydrogen gas as the other fuel into the liquid fuel is disposed downstream of the fuel pump 32 in the fuel supply line 34. The micro-bubble producing device 92 forms hydrogen gas into minute bubbles (which will be called "micro-bubbles") having a diameter of several tens of microns or smaller, and mixes the micro-bubbles into the liquid fuel in the fuel supply line 34. By using the micro-bubble producing device 92 for mixing the micro-bubbles of hydrogen gas into the liquid fuel, the hydrogen gas can be uniformly blended in the liquid fuel, and dissolution of the hydrogen gas into the liquid fuel can be promoted. The method of producing micro-bubbles by the micro-bubble producing device 92 is not limited to any particular method provided that hydrogen gas can be formed into micro-bubbles in the liquid fuel. For example, any of the first through third methods as illustrated above with respect to the fourth embodiment may be employed.

The hydrogen gas mixed into the liquid fuel is supplied from a hydrogen-producing device 90 to the micro-bubble producing device 92 via a hydrogen-gas supply line 86. The hydrogen-producing device 90 is able to immediately form hydrogen gas from a liquid hydride. For example, water, alcohol, gasoline, light oil, or the like may be used as the liquid hydride. In the present embodiment, water is used as the liquid hydride. The hydrogen-producing device 90 may produce hydrogen gas by, for example, one of the first through third methods as illustrated above with respect to the fourth embodiment.

The hydrogen-producing device 90 is driven or powered by electric energy. The hydrogen-producing device 90 may receive electric energy from a battery 118, or may receive electric energy directly from a regenerating system 116. The regenerating system 116 is disposed in a drive system of the vehicle, and is adapted to recover deceleration energy of the vehicle (i.e., energy generated during deceleration of the vehicle) as electric energy. The electric energy recovered by the regenerating system 116 is normally used for charging the battery 118, but may be supplied directly to the hydrogen-producing device 90 if certain conditions as described below are met.

By using the hydrogen-producing device 90 to produce hydrogen gas, hydrogen to be used by the engine can be mainly stored in a liquid state in the engine system. As compared with the case where gaseous hydrogen is stored in, for example, a pressure tank, hydrogen can be more easily handled, and can be stored in reduced space, assuring high installation efficiency. In the present embodiment, water used for forming hydrogen gas in the hydrogen-producing device 90 is supplied from a water tank 80 via a water supply line 84. A water pump 82 for drawing up water from the water tank 80 and supplying it to the hydrogen producing device 90 is disposed in the water supply line 84.

The engine system of the sixth embodiment includes ECU (Electronic Control Unit) 50 as its control unit. To the output part of the ECU 50 are connected various devices or components including, for example, the ignition plug 16, in-cylinder injector 18, fuel pump 32, water pump 82, micro-bubble producing device 92, hydrogen-producing device 90, and the channel selector valve 114. To the input part of the ECU 50 are connected various sensors including, for example, the operating-condition measuring unit 52 for acquiring information (e.g., the accelerator pedal position, vehicle speed, engine speed, air/fuel ratio, water temperature and knock signal) concerning the operating conditions of the engine 2. The ECU 50 controls the above-indicated devices and others according to certain control programs, based on the outputs of the above-indicated sensors and others.

With the engine system constructed as described above, when it becomes necessary to add hydrogen gas to the liquid fuel, hydrogen gas is immediately produced from water by the hydrogen-producing device 90, and the produced hydrogen gas is formed into micro-bubbles and mixed into the liquid fuel. The routine shown in the flowchart of FIG. 16A and FIG. 16B is a first example of routine of hydrogen addition control implemented by the ECU 50 in the sixth embodiment. In the following, the hydrogen addition control according to this embodiment will be more specifically explained with reference to the flowchart of FIG. 16A and FIG. 16B. The routine of FIG. 16A and FIG. 16B is executed at regular intervals, for example, each time the crankshaft reaches a predetermined crank angle.

In the initial step S1100 of the routine shown in FIG. 16A, it is determined whether conditions for implementation of hydrogen addition are satisfied, based on the operating conditions of the engine 2 measured by the operating-condition measuring unit 52. The conditions for the implementation of hydrogen addition may be satisfied, for example, when the engine is operated in an operating region in which knocking is likely to occur, or when the engine 2 is operated in an operating region in which combustion variations are likely to appear. If the conditions for the hydrogen addition are satisfied, a further determination is made in step S1102, and a suitable process of adding hydrogen is carried out depending upon the result of determination in this step.

In step S1102, it is determined whether regenerative control is under way, namely, whether the regenerating system 116 is currently in operation. For example, when the engine 2 operates with fuel burning, as in the case where the vehicle is accelerating or running at a constant speed, regenerative control is not under way, or the regenerating system 116 is not in operation. In this case, hydrogen gas is added to the liquid fuel through the operations of step S1104 to step S1110 as explained below.

In step S1104, the required amount of hydrogen to be added is obtained from a pre-stored map, in accordance with the operating conditions of the engine 2. The amount of hydrogen to be added may be defined as, for example, the ratio of the heating value of hydrogen gas to the total heating value of the fuel as a whole (i.e., a blend of the liquid fuel and hydrogen gas). In the next step S1106, the required amount of hydrogen to be produced (i.e., the amount of hydrogen gas that needs to be produced per unit time) is obtained in accordance with the required amount of hydrogen to be added. More specifically, the required load of the engine 2 is obtained from the accelerator pedal position, engine speed, and so forth, and a share of the load imposed on the hydrogen gas (which will be called "hydrogen load") is obtained from the required load and the required amount of hydrogen to be added. Then, the required amount of hydrogen to be produced is calculated in accordance with the hydrogen load, based on the quantity of heat generated per unit amount of hydrogen gas.

In the next step S1108, the water pump 82 operates to supply water from the water tank 80 to the hydrogen-producing device 90 in an amount corresponding to the required amount of hydrogen to be produced. Then, the hydrogen-producing device 90 carries out a hydrogen producing process to produce the required amount of hydrogen gas. At this time, the hydrogen-producing device 90 is powered with electric energy stored in the battery 118. The hydrogen gas thus produced is supplied from the hydrogen-producing device 90 to the micro-bubble producing device 92.

In the next step S1110, the micro-bubble producing device 92 operates to form micro-bubbles of the hydrogen gas, and mix the hydrogen gas in the form of micro-bubbles into the liquid fuel. The liquid fuel blended with the hydrogen gas is then supplied from the micro-bubble producing device 92 to the in-cylinder injector 18, and is injected from the in-cylinder injector 18 directly into the combustion chamber 10.

Through the injection of the fuel containing highly combustible hydrogen gas, knocking is suppressed during high-load engine operations, or combustion variations are suppressed or reduced during low-load engine operations. If the conditions for the implementation of hydrogen addition are not satisfied in step S1100, the hydrogen producing process in the hydrogen producing device 90 is stopped in step S1122, and the process of forming micro-bubbles by the micro-bubble producing device 92 is subsequently stopped in step S1124.

If the ECU 50 determines in step S1102 that the regenerative control is under way, it is determined in step S1112 whether fuel cut control is under way, namely, whether injection of the fuel from the in-cylinder injector 18 is currently stopped. During deceleration of the vehicle, fuel injection of the in-cylinder injector 18 is basically stopped under fuel cut control, and, therefore, an affirmative decision (YES) is obtained in step S1112. If the engine speed is reduced down to a certain speed (for example, idle speed), however, fuel injection is temporarily resumed so as to prevent further reduction of the engine speed. In this case, a negative decision (NO) is obtained in step S1112. When an affirmative decision (YES) is obtained in step S1112, hydrogen gas is added to the liquid fuel through the operations of step S1114 through step S1118 as explained below.

In step S1114, the channel selector valve 114 is switched to the position in which the inlet port connected to the fuel circulation line 78 is opened while the fuel pump 32 is being operated. As a result, high-pressure liquid fuel whose pressure has been raised by the fuel pump 32 is fed back to the fuel supply line 34 through the fuel circulation line 78, and circulates through the circulation system of the liquid fuel which consists of the fuel supply line 34 and the fuel circulation line 78. The flow rate of the fuel delivered from the fuel pump 32 during circulation of the fuel is set to a predetermined circulation-time flow rate.

In step S1116, the water pump 82 and the hydrogen-producing device 90 operate to carry out a hydrogen producing process in accordance with the required amount of hydrogen to be produced. The required amount of hydrogen to be produced is calculated from the flow rate of the liquid fuel during circulation of the fuel in the circulation system and the required amount of hydrogen to be added. At this time, the regenerating system 116, which has been connected to the battery 118, is connected to the hydrogen-producing device 90, so that all of the electric energy generated by the regenerating system 116 is supplied to the hydrogen-producing device 90 for use in the hydrogen producing process.

In step S1118, the micro-bubble producing device 92 operates to form the hydrogen gas into micro-bubbles and mix the micro-bubbles of hydrogen gas into the liquid fuel flowing in the circulation system. By forming and mixing the micro-bubbles of hydrogen gas into the circulating liquid fuel, the hydrogen gas produced can be stored in the liquid fuel.

If a negative decision (NO) is obtained in step S1112, step S1120 is executed. In step S1120, the channel selector valve 114 is switched back to the normal position in which the inlet port connected to the fuel inlet is opened, so that the liquid fuel stops circulating, and a normal fuel supply system is resumed in which the fuel is supplied from the fuel tank 30 to the in-cylinder injector 18. At this time, hydrogen gas has already been added to the liquid fuel in the fuel supply line 34 to meet the required amount of hydrogen to be added, and, therefore, the liquid fuel blended with a sufficient amount of hydrogen gas can be injected from the in-cylinder injector 18 immediately after the fuel injection is restarted.

According to the hydrogen addition control routine as described above, the hydrogen-producing device 90 utilizes the electric energy generated by the regenerating system 116 in the hydrogen producing process. This makes it possible to operate the regenerating system 116 to recover deceleration energy of the vehicle even in the case where the battery 118 is fully charged. Thus, the engine system of this embodiment is able to produce hydrogen gas by effectively utilizing the deceleration energy of the vehicle, thus saving energy and achieving high energy-efficiency.

According to the hydrogen addition control routine as described above, the produced hydrogen gas is mixed into the circulating liquid fuel during fuel cut control, so that the liquid fuel to which hydrogen gas has been added can be supplied to the in-cylinder injector 18 from the beginning upon re-start of fuel injection.

Furthermore, according to the hydrogen addition control routine as described above, the liquid fuel is circulated along the fuel supply line 34 and the fuel circulation line 78, and hydrogen gas is blended into the circulating liquid fuel, so that a relatively large amount of hydrogen gas can be stored in the liquid fuel. In particular, by mixing the hydrogen gas in the form of micro-bubbles into the liquid fuel as in this embodiment, dissolution of hydrogen gas into the liquid fuel can be promoted, and an even larger amount of hydrogen gas can be stored in the liquid fuel. This makes it possible to utilize an increased amount of deceleration energy for production of hydrogen gas, thus assuring even greater energy efficiency.

FIG. 17 is a flowchart illustrating a second example of routine of hydrogen addition control implemented by the ECU 50 in the sixth embodiment. By causing the ECU 50 to execute the routine of FIG. 17 in place of the routine of FIG. 16A and FIG. 16B, the engine system of this embodiment utilizes addition of hydrogen gas to the liquid fuel for a reducing process for the catalyst 20. In FIG. 17, the same step numbers as used in FIG. 16A and FIG. 16B are used for identifying process steps having the same contents as those of the hydrogen addition control routine shown in FIG. 16A and FIG. 16B, and no explanation is provided for the overlapping process steps. The routine of FIG. 17 is executed at regular intervals, for example, each time the crankshaft reaches a predetermined crank angle.

In the routine shown in FIG. 17, if the conditions for the implementation of hydrogen addition are satisfied ("YES" is obtained in step S1100), and the vehicle is currently operating under regenerative control ("YES" is obtained in step S1102) and fuel cut control ("YES" is obtained in step S1112), step S1200 is executed after the operations of step S1114 through step S1118.

In step S1200, it is determined whether a condition for implementation of a catalyst reducing process is satisfied. The condition is satisfied if the amount of NOx adsorbed by the catalyst 20 exceeds a predetermined threshold amount. The amount of NOx adsorbed by the catalyst 20 may be indirectly measured or derived from the total lean-burn operating time as measured from the last reducing process. Step S1202 and step S1204 as described below are skipped until the condition for the implementation of the catalyst reducing process is satisfied.

If the condition for the implementation of the catalyst reducing process is satisfied, step S1202 and step S1204 are executed. In step S1202, the channel selector valve 114 is switched to the normal position so as to stop circulation of the liquid fuel, and the normal fuel supply system is resumed in which the fuel is supplied from the fuel tank 30 to the in-cylinder injector 18.

In the next step S1204, an injection command is supplied to the in-cylinder injector 18, and the liquid fuel (hydrogen-rich fuel) blended with hydrogen gas is injected from the in-cylinder injector 18 directly into the combustion chamber 10. Since hydrogen gas has already been added to the liquid fuel in the fuel supply line 34 through the operations of step S1114 through step S1118, the liquid fuel mixed with a sufficient amount of hydrogen gas is injected from the in-cylinder injector 18 immediately after the fuel injection is started. If the ignition plug 16 is in operation during fuel cut control, the timing of fuel injection by the in-cylinder injector 18 is set to a point in time after activation of the ignition plug 16, for example, to a point during the expansion stroke or exhaust stroke, so as to prevent the fuel from burning upon ignition. In step S1204, the in-cylinder injectors 18 of all of the cylinders may be operated, or only the in-cylinder injector or injectors 18 of a particular cylinder or cylinders may be operated. The number of the in-cylinder injectors 18 to be operated may also be determined depending upon the amount of the hydrogen-blended fuel to be supplied to the catalyst 20.

According to the hydrogen addition control routine as described above, the liquid fuel mixed with the hydrogen gas can be supplied as it is to the catalyst 20, without being burned in the combustion chamber 10. Since hydrogen gas has a high reducing capability, the supply of hydrogen gas to the catalyst 20 allows the reducing process to be effectively performed on the catalyst 20.

Modified Examples of Sixth Embodiment

The sixth embodiment of the invention as illustrated above may be modified, for example, in the manners as described below.

While electric energy is directly supplied from the regenerating system 116 to the hydrogen-producing device 90 in the illustrated embodiment, the electric energy may also be supplied from the regenerating system 116 to the hydrogen-producing device 90 via the battery 118. In this case, the electric energy generated by the regenerating system 116 may be initially used for charging the battery 118, and the rest of the electric energy may be supplied to the hydrogen-producing device 90.

While the in-cylinder injector 18 that injects fuel directly into the combustion chamber 10 is provided as a fuel injection device in the engine shown in FIG. 15, a port injector that injects fuel into the intake port may be used in place of the in-cylinder injector 18. In this case, the operation of the ignition plug is stopped during fuel cut control, so that the hydrogen-blended fuel is prevented from burning in the combustion chamber when the fuel is injected from the port injector for the catalyst reducing process.

While the engine shown in FIG. 15 is a gasoline engine, the invention may also be applied to a diesel engine.

Seventh Embodiment

Figure 18:
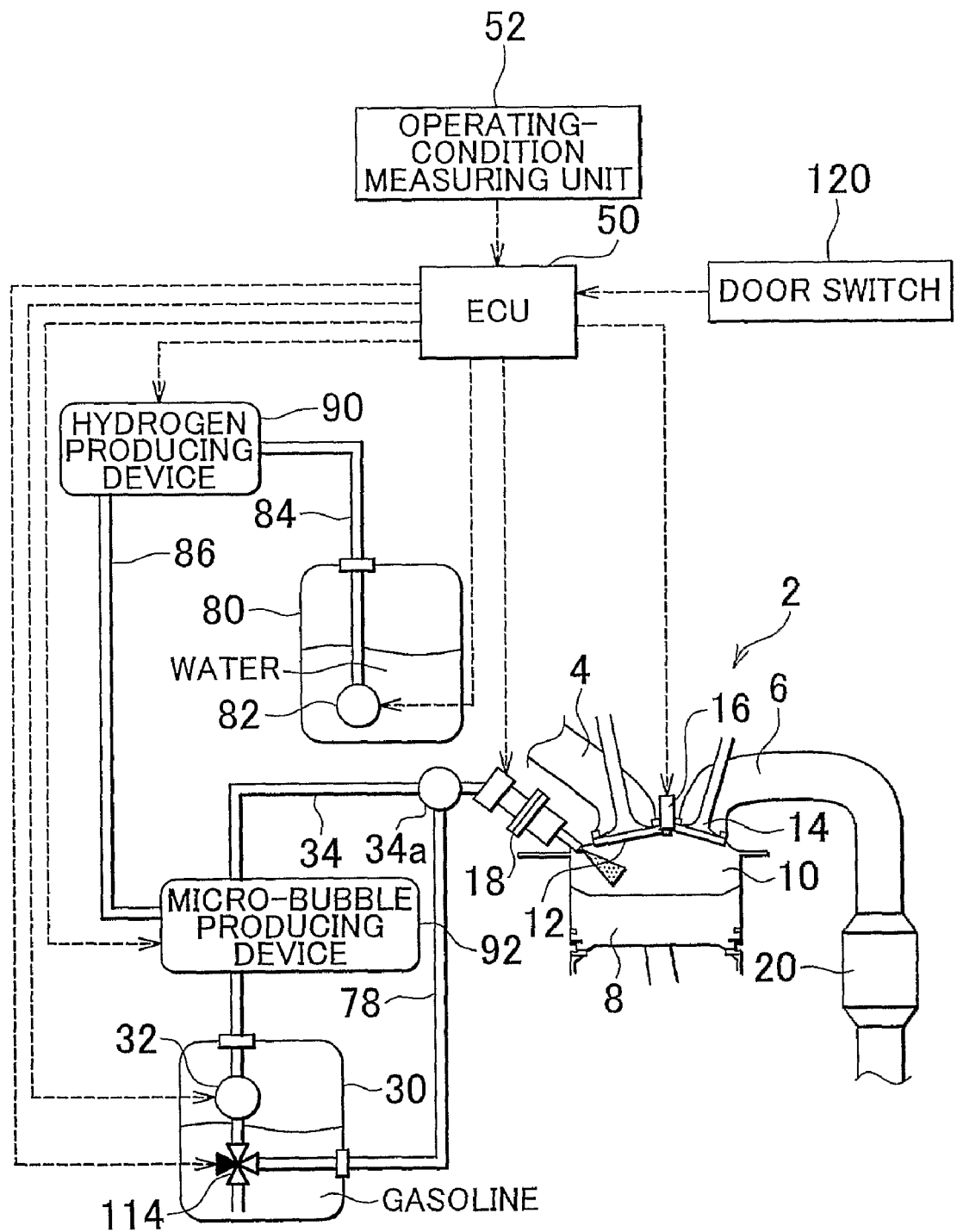
FIG. 18 is a view showing a system of a hydrogen-using internal combustion engine constructed according to a seventh embodiment of the invention.
Figure 19B:
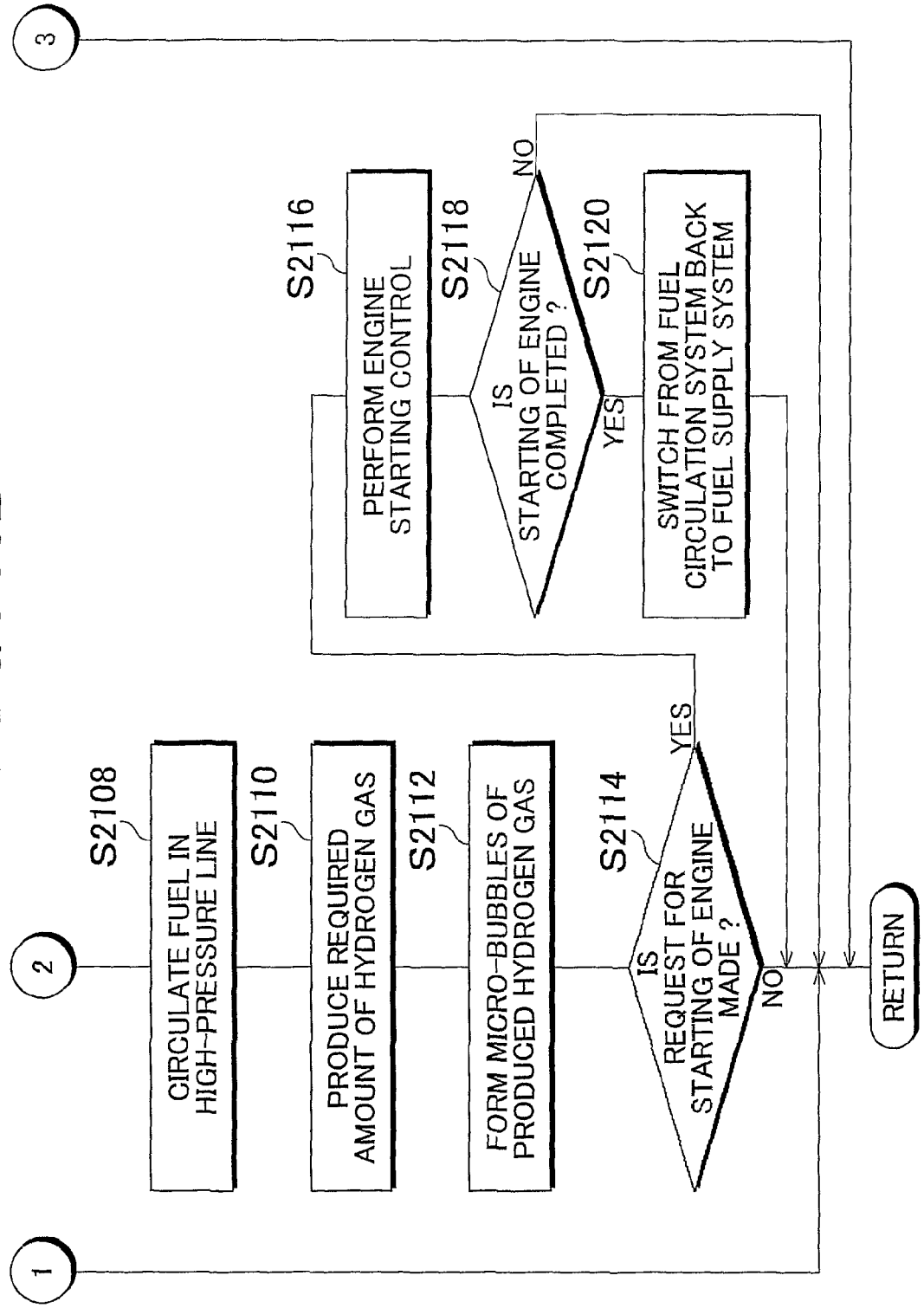

Referring next to FIG. 18, FIG. 19A and FIG. 19B, a seventh exemplary embodiment of the invention will be described in detail.

FIG. 18 schematically shows a system of a hydrogen-using internal combustion engine 2 (hereinafter simply referred to as "engine"), which is constructed according to the seventh embodiment of the invention. The construction of the engine 2 is substantially identical with that of the first embodiment, except that a catalyst (e.g., NOx catalyst) 20 for purifying combustion gas is disposed in the exhaust passage 6. Thus, no further explanation of the engine 2 will be provided. In FIG. 18, the same reference numerals as used in FIG. 1 and FIG. 7 are used for identifying the same elements or components as those of the engine system of the first and fourth embodiments.

In the engine system of the seventh embodiment, the in-cylinder injector 18 of the engine 2 is connected to the fuel tank 30 via the fuel supply line 34. A liquid hydrocarbon fuel, such as gasoline, is stored in the fuel tank 30. The liquid fuel in the fuel tank 30 is drawn up by the fuel pump (high-pressure pump) 32 disposed in the fuel supply line 34, and is supplied to the in-cylinder injector 18 after being compressed to a certain pressure level that is higher than the pressure of combustion gas in the combustion chamber 10. The fuel pump 32 may be a mechanical pump that is driven by the engine 2, or an electric pump that is driven by a motor.

A channel selector valve 114 is disposed upstream of the fuel pump 32 in the fuel supply line 34. The channel selector valve 114 is a three-way valve having one outlet port and two inlet ports. The outlet port is connected to the downstream side (i.e., the side closer to the fuel pump 32) of the fuel supply line 34, and one of the inlet ports is connected to the upstream side (i.e., the side closer to the fuel inlet) of the fuel supply line 34. The other inlet port of the channel selector valve 114 is connected to one end of a fuel circulation line 78. The fuel circulation line 78 is arranged in parallel with the fuel supply line 34, and the other end of the line 78 is connected to the vicinity of the in-cylinder injector 18 in the fuel supply line 34, more specifically, to a delivery pipe 34a for distributing the liquid fuel among the in-cylinder injectors 18 of the respective cylinders.

The channel selector valve 114 is normally placed in a position in which the inlet port connected to the upstream side of the fuel supply line 34 is opened. In this case, the liquid fuel, which is drawn up from the fuel tank 30 and pressurized by the fuel pump 32, is supplied to the in-cylinder injector 18, as described above. When the channel selector valve 114 is switched to a position in which the inlet port connected to the fuel circulation line 78 is opened, a circulation system of the liquid fuel, which consists of the fuel supply line 34 and the liquid circulation line 78, is established. In this case, the injection of fuel from the in-cylinder injector 18 is stopped, and the fuel pump 32 is operated to circulate the liquid fuel under a high pressure through the circulation system.

A micro-bubble producing device 92 for mixing hydrogen gas as the other fuel into the liquid fuel is disposed downstream of the fuel pump 32 in the fuel supply line 34. The micro-bubble producing device 92 forms hydrogen gas into minute bubbles (which will be called "micro-bubbles") having a diameter of several tens of microns or smaller, and mixes the micro-bubbles into the liquid fuel in the fuel supply line 34. By using the micro-bubble producing device 92 for blending the micro-bubbles of hydrogen gas into the liquid fuel, the hydrogen gas can be uniformly mixed in the liquid fuel, and dissolution of the hydrogen gas into the liquid fuel can be promoted. The method of producing micro-bubbles by the micro-bubble producing device 92 is not limited to any particular method provided that hydrogen gas can be formed into micro-bubbles in the liquid fuel. For example, any of the first through third methods as illustrated above with respect to the fourth embodiment may be employed.

The hydrogen gas mixed into the liquid fuel is supplied from a hydrogen-producing device 90 to the micro-bubble producing device 92 via a hydrogen-gas supply line 86. The hydrogen-producing device 90 is able to immediately form hydrogen gas from a liquid hydride. The liquid hydride may be selected from, for example, water, alcohol, gasoline, light oil, and other compounds. In the present embodiment, water is used as the liquid hydride. The hydrogen-producing device 90 may produce hydrogen gas by, for example, one of the first through third methods as illustrated above with respect to the fourth embodiment.

By using the hydrogen-producing device 90 for producing hydrogen gas, hydrogen to be used by the engine can be mainly stored in a liquid state in the engine system. As compared with the case where gaseous hydrogen is stored in, for example, a pressure tank, hydrogen can be more easily handled, and can be stored in reduced space, assuring high installation efficiency. In the present embodiment, water used for forming hydrogen gas in the hydrogen-producing device 90 is supplied from a water tank 80 via a water supply line 84. A water pump 82 for drawing up water from the water tank 80 and supplying it to the hydrogen producing device 90 is disposed in the water supply line 84.

The engine system of the seventh embodiment includes ECU (Electronic Control Unit) 50 as its control unit. To the output part of the ECU 50 are connected various devices or components including, for example, the ignition plug 16, in-cylinder injector 18, fuel pump 32, water pump 82, micro-bubble producing device 92, hydrogen-producing device 90, and the channel selector valve 114. To the input part of the ECU 50 are connected various sensors including, for example, the operating-condition measuring unit 52 for acquiring information (e.g., the accelerator pedal position, vehicle speed, engine speed, air/fuel ratio, water temperature and knock signal) concerning the operating conditions of the engine 2, and a door switch 120 for detecting opening of the driver's-side door. The ECU 50 controls the above-indicated devices and others according to certain control programs, based on the outputs of the above-indicated sensors and others.

With the engine system constructed as described above, when it becomes necessary to add hydrogen gas to the liquid fuel, hydrogen gas is immediately produced from water by the hydrogen-producing device 90, and the produced hydrogen gas is formed into micro-bubbles and mixed into the liquid fuel. The routine illustrated in the flowchart of FIG. 19A and FIG. 19B is a routine of hydrogen addition control executed by the ECU 50 upon starting of the engine according to the seventh embodiment. In the following, the hydrogen addition control implemented upon starting of the engine will be more specifically explained with reference to the flowchart of FIG. 19A and FIG. 19B. The routine of FIG. 19A and FIG. 19B is executed at regular intervals, for example, each time the crankshaft reaches a predetermined crank angle.

In the initial step S2100 of the routine shown in FIG. 19A, it is determined from a signal transmitted from the door switch 120 whether the driver's-side door is opened. When the driver's-side door is opened, the signal of the door switch 120 is switched from OFF to ON. From the opening of the driver's-side door, it is presumed that the driver has an intention of starting the engine 2. Namely, starting of the engine 2 is predicted. While the driver's side door is in the closed state, the following steps are not executed, but only step S2100 is repeatedly executed.

When the driver's-side door is opened, namely, when starting of the engine 2 is predicted, step S2102 is executed to determine whether a condition or conditions for implementation of hydrogen addition upon starting of the engine is/are satisfied. The condition for implementation of hydrogen addition upon starting of the engine may be satisfied, for example, when the coolant temperature is equal to or lower than a threshold temperature, or the atmospheric conditions are likely to cause misfire during low-load operations of the engine, or the properties of the liquid fuel in the fuel tank 30 are likely to induce misfire. If the condition for hydrogen addition is not satisfied, the hydrogen-producing device 90 does not carry out a hydrogen producing process in step S2122, and the micro-bubble producing device 92 does not carry out a process of forming micro-bubbles in step S2124.

If the condition for implementation of hydrogen addition is satisfied, step S2104 and subsequent steps are executed to add hydrogen gas into the liquid fuel. In step S2104, the required amount of hydrogen to be added upon starting of the engine is obtained from a pre-stored map. The amount of hydrogen to be added may be defined as, for example, the ratio of the heating value of hydrogen gas to the total heating value of the fuel as a whole (i.e., a mixture of liquid fuel and hydrogen gas). In the next step S2106, the required amount of hydrogen to be produced (i.e., the amount of hydrogen gas that needs to be produced) is obtained from the flow rate of the liquid fuel circulating in the above-indicated circulation system (i.e., the flow rate of the fuel delivered from the hydraulic fuel pump 32) and the required amount of hydrogen to be added.

In step S2108, the fuel pump 32 operates to start raising the pressure of the liquid fuel, and the channel selector valve 114 is switched to the position in which the inlet port connected to the fuel circulation line 78 is opened. As a result, the high-pressure liquid fuel, whose pressure has been raised by the fuel pump 32, returns to the fuel supply line 34 through the fuel circulation line 78, and circulates along a fuel circulation system that consists of the fuel supply line 34 and the fuel circulation line 78. During circulation of the fuel, the flow rate of the fuel delivered from the fuel pump 32 is set to a predetermined circulation-time flow rate.

In step S2110, the water pump 82 and the hydrogen-producing device 90 operate to carry-out a hydrogen producing process in accordance with the required amount of hydrogen to be produced. In the next step S2112, the hydrogen gas produced by the hydrogen-producing device 90 is fed to the micro-bubble producing device 92, which in turn forms the hydrogen gas into micro-bubbles and mixes the micro-bubbles into the liquid fuel circulating in the circulation system. By mixing the micro-bubbles of hydrogen gas into the circulating liquid fuel, the hydrogen gas produced prior to starting of the engine 2 can be stored in the liquid fuel.

After the hydrogen gas is added to the liquid fuel through the operations of step S2104 through step S2112 as described above, step S2114 is executed to determine whether a request for starting of the engine 2 is made. It can be judged that a request for starting is made when a start switch, such as an ignition switch, is switched from OFF to ON. In the presence of a request for starting of the engine 2, engine starting control, for example, cranking using a starter, is performed so as to start the engine 2 in step S2116.

After implementation of the engine starting control, it is determined in step S2118 whether starting of the engine 2 is completed. For example, it can be judged that starting is completed when the engine speed is raised up to a predetermined threshold speed. During starting of the engine 2 (i.e., until starting of the engine 2 is completed), the channel selector valve 114 is not switched to the normal position unless the fuel pressure is reduced to be lower than a predetermined level, and the liquid fuel is kept circulating in the circulation system.

Upon completion of starting of the engine 2, step S2120 is executed. In step S2120, the channel selector valve 114 is switched back to the normal position so as to stop circulation of the liquid fuel, and the normal fuel supply system is re-established in which the fuel is supplied from the fuel tank 30 to the in-cylinder injector 18. Since the hydrogen gas has already been added to the liquid fuel in the fuel supply line 34 to meet the required amount of hydrogen, the liquid fuel blended with a sufficient amount of hydrogen gas can be injected from the in-cylinder injector 18 immediately after the fuel injection is started.

According to the hydrogen addition control routine as described above, hydrogen gas is produced by the hydrogen-producing device 90 prior to starting of the engine 2, and the hydrogen gas thus produced is mixed into the circulating liquid fuel, so that the liquid fuel to which hydrogen gas has been added can be supplied to the in-cylinder injector 18 from the beginning upon start of fuel injection. Furthermore, since hydrogen gas is formed into micro-bubbles and mixed in the form of micro-bubbles into the liquid fuel, dissolution of the hydrogen gas into the liquid fuel can be promoted, and liquid fuel having a high amount of hydrogen gas can be supplied. Accordingly, the engine of this embodiment can realize stable combustion due to addition of hydrogen gas from the beginning of the operation of the engine 2 (i.e., immediately after the engine 2 is started), and is thus allowed to operate with a considerably lean air/fuel ratio, or operate with the ignition timing largely retarded so as to quickly raise the temperature of the catalyst 20.

According to the hydrogen addition control routine as described above, hydrogen gas is produced from water when starting of the engine 2 is predicted, and the hydrogen gas thus produced is stored in the form of micro-bubbles in the circulating liquid fuel. Thus, the engine system of this embodiment does not require a tank for accommodating gaseous hydrogen gas, thus assuring a reduced manufacturing cost and increased easiness or efficiency with which the system is installed on the vehicle.

Eighth Embodiment

Figure 20:
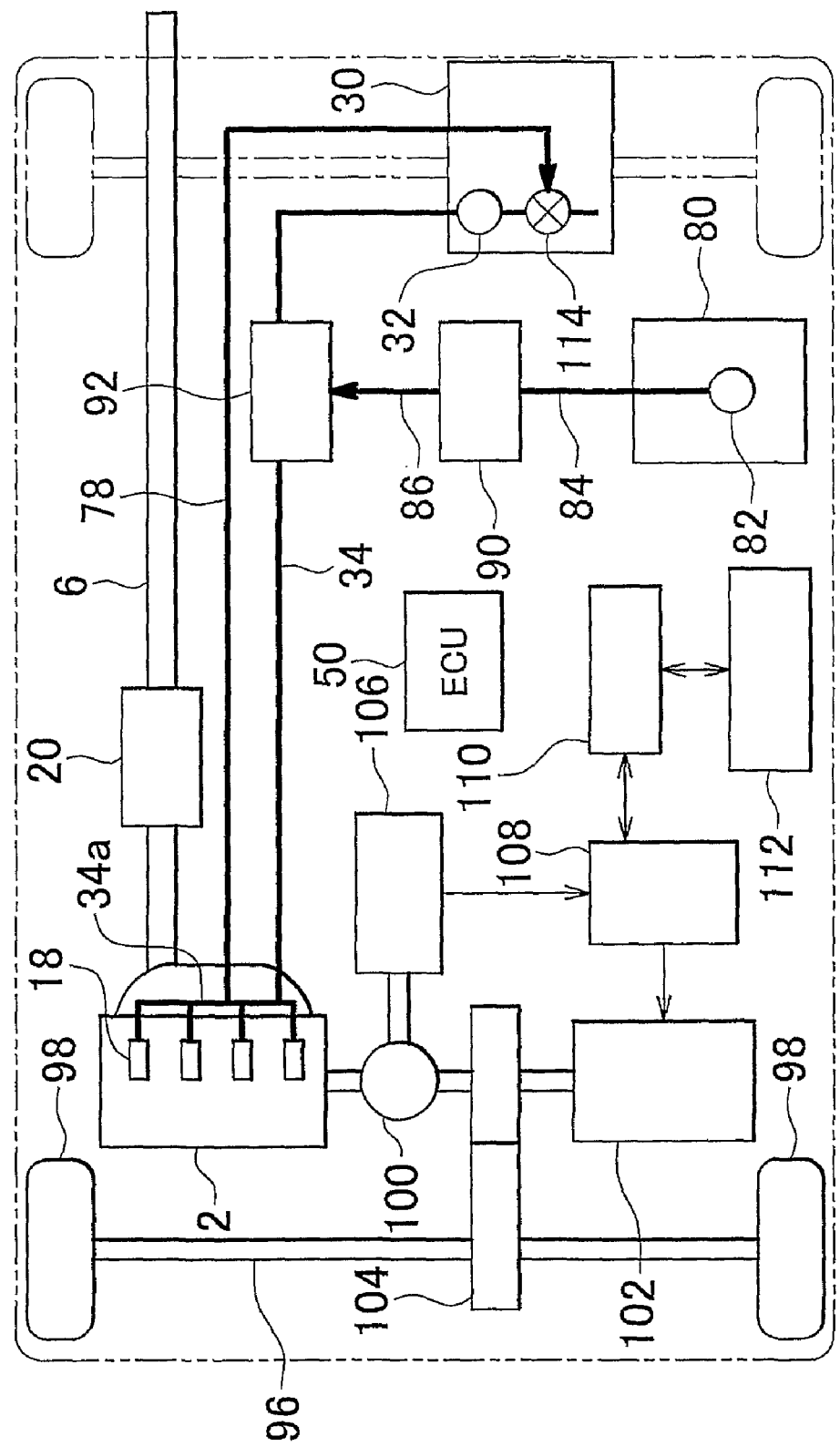
FIG. 20 is a view showing a drive system of a hybrid vehicle that employs a hydrogen-using internal combustion engine, as an eighth embodiment of the invention.
Figure 21A:
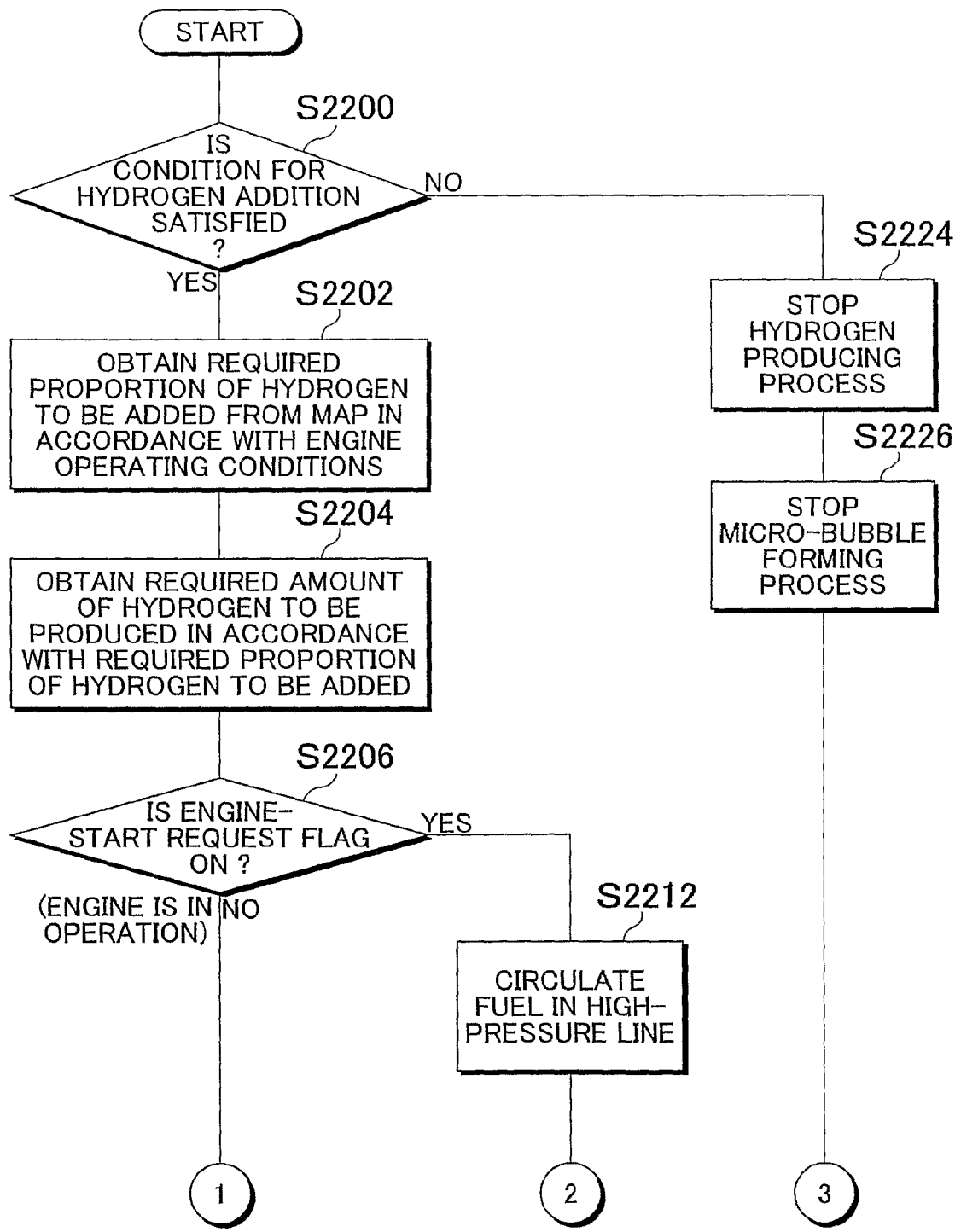
FIG. 21A and FIG. 21B are a flowchart illustrating a routine of hydrogen addition control implemented in the eighth embodiment of the invention.
Figure 21B:
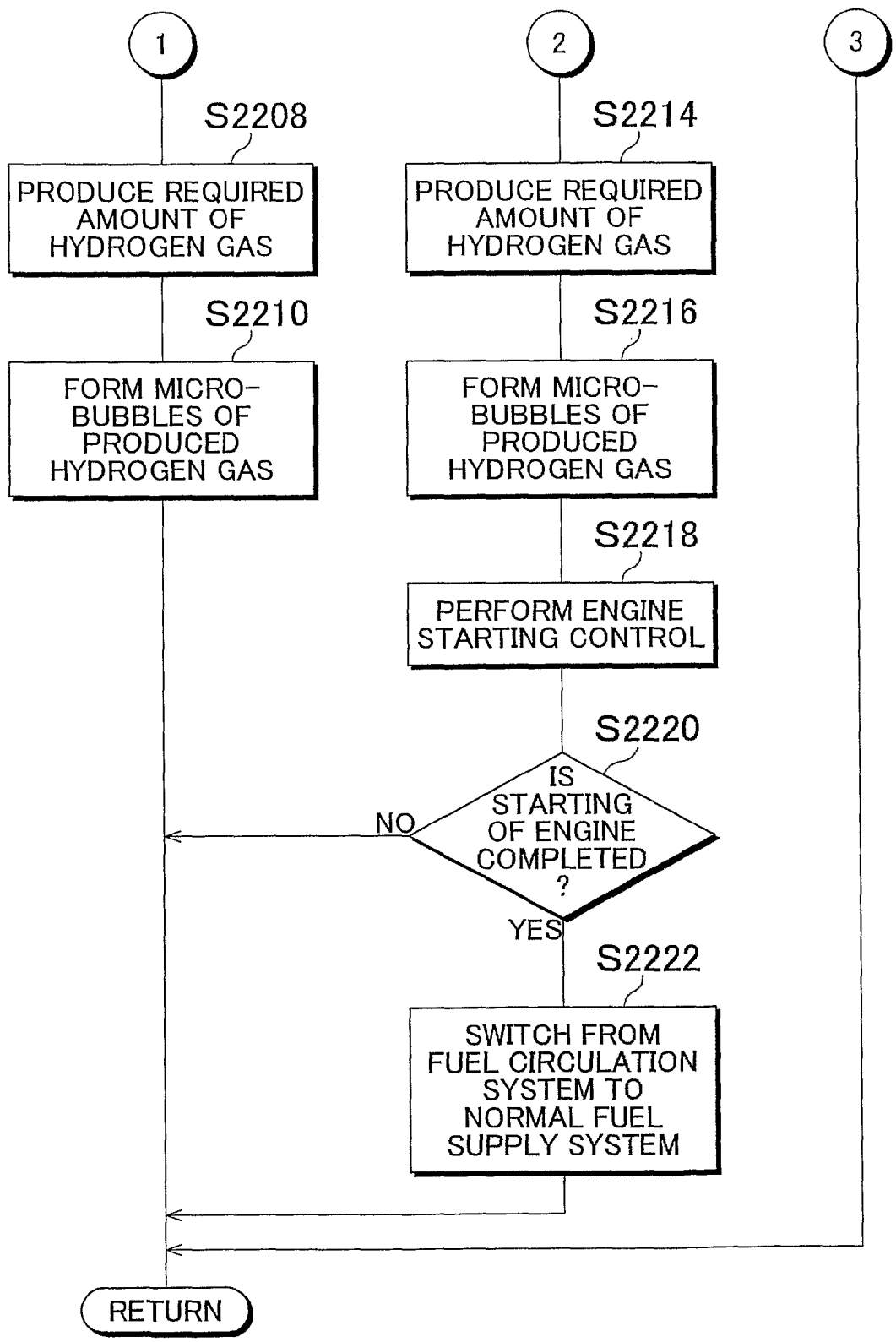

Referring to FIG. 20, FIG. 21A and FIG. 21B, an eighth exemplary embodiment of the invention will be described in detail.

FIG. 20 schematically shows a drive system of a hybrid vehicle that employs a hydrogen-using internal combustion engine according to the invention. The drive system of the hybrid vehicle of this embodiment includes, as a power unit, the engine system of the seventh embodiment as shown in FIG. 18. In FIG. 20, the same reference numerals as used in FIG. 18 will be used for identifying the same elements as used in the seventh embodiment.

The drive system of the hybrid vehicle shown in FIG. 20 includes a motor 102 as another power unit, and a generator 106 that is supplied with driving force of the engine 2 and generates electric power. The engine 2, motor 102 and the generator 106 are coupled to one another via a power dividing mechanism 100. A reduction gearbox 104 is connected to the rotary shaft of the motor 102 that is linked to the power dividing mechanism 100. The reduction gearbox 104 couples the rotary shaft of the motor 102 with a drive shaft 96 that is linked to drive wheels 98. The power dividing mechanism 100 is adapted to divide the driving force of the engine 2 into a first portion supplied to the generator 106 and a second portion supplied to the reduction gearbox 104. The amount of the first and second portions of the driving force divided by the power dividing mechanism 100 may be changed as desired.

The drive system further includes an inverter 108, a converter 110 and a high voltage battery 112. The inverter 108 is connected to the generator 106 and the motor 102, and is also connected to the high voltage battery 112 via the converter 110. The electric power generated by the generator 106 may be supplied to the motor 102 via the inverter 108, or may charge the high voltage battery 112 via the inverter 108 and the converter 110. The power stored in the high voltage battery 112 may be supplied to the motor 102 via the converter 110 and the inverter 108.

The drive system constructed as described above is able to rotate the drive wheels 98 by using only the driving force of the engine 2 while stopping the motor 102, or, to the contrary, is able to rotate the drive wheels 98 by using only the driving force of the motor 102 while stopping the engine 2. The drive system is also able to operate both the motor 102 and the engine 2 and rotate the drive wheels 98 by using the driving forces of the motor 102 and the engine 2. In the drive system, the motor 102 may function as a starter of the engine 2. More specifically, when the engine 2 is started, a part of or the whole of the driving force of the motor 102 may be transmitted to the engine 2 via the power dividing mechanism 100, so as to crank the engine 2. In addition, the motor 102 is able to force the engine 2 that is at rest to rotate as needed, regardless of whether the engine 2 is started or not.

The drive system of the present embodiment is controlled by the ECU 50. The ECU 50 comprehensively controls the whole drive system including, for example, the motor 102, generator 106, power dividing mechanism 100, inverter 108 and the converter 110, as well as the engine system including the engine 2. FIG. 21A and FIG. 21B are a flowchart illustrating a routine of hydrogen addition control implemented by the ECU 50 in this embodiment. This routine includes engine starting control with which the engine 2 is started while the vehicle is running by the operation of the motor 102. Referring to the flowchart of FIG. 21A and FIG. 21B, hydrogen addition control in the hybrid vehicle will be specifically explained. The routine shown in FIG. 21A and FIG. 21B is executed at regular intervals, for example, each time the crankshaft reaches a predetermined crank angle.

In the initial step S2200 of the routine shown in FIG. 21A, it is determined whether a condition or conditions for implementation of hydrogen addition is/are satisfied. In the case where the engine 2 has not been started at this point in time, the condition for implementation of hydrogen addition may be satisfied, for example, when the coolant temperature is equal to or lower than a threshold temperature, or the atmospheric conditions are likely to cause misfire during low-load operations of the engine, or the properties of the liquid fuel in the fuel tank 30 are likely to induce misfire. In the case where the engine 2 has been started at this point in time, on the other hand, the condition for hydrogen addition may also be satisfied, for example, when the engine 2 is operated in an operating region in which knocking is likely to occur, or when the engine 2 is operated in an operating region in which combustion variations are likely to appear. If the condition for implementation of hydrogen addition is not satisfied, the hydrogen-producing device 90 does not carry out a hydrogen producing process in step S2224, and the micro-bubble producing device 92 does not carry out a process of forming micro-bubbles in step S2226.

If the condition for implementation of hydrogen addition is satisfied, step S2202 and subsequent steps are executed to add hydrogen gas into the liquid fuel. In step S2202, the required amount of hydrogen to be added is obtained from a pre-stored map, in accordance with the operating conditions of the engine 2. Where the engine 2 has not been started at this point in time, the required amount of hydrogen to be added is an amount of hydrogen that will be required to be added upon starting of the engine. Where the engine 2 has already been started at this point in time, on the other hand, the required amount of hydrogen to be added is an amount of hydrogen that is required to be added based on the accelerator pedal position, engine speed, and so forth.

In step S2204, the required amount of hydrogen to be produced is obtained in accordance with the required amount of hydrogen to be added. Where the engine 2 has not been started at this point in time, the required amount of hydrogen to be produced is calculated from the required amount of hydrogen to be added and the flow rate of the liquid fuel that is circulating in the circulation system (i.e., the flow rate of the fuel delivered from the hydraulic fuel pump 32). Where the engine 2 has been started at this point in time, the required amount of hydrogen to be produced is calculated from, for example, the required amount of hydrogen to be added, the required load of the engine 2, and the quantity of heat generated per unit amount of hydrogen gas.

In step S2206, it is determined whether an engine-start request flag is ON. The engine-start request flag is switched from OFF to ON when the ECU 50 judges that the engine needs to be started. The engine-start request flag is switched from ON to OFF when starting of the engine 2 is completed.

If the engine-start request flag is ON, hydrogen addition control upon starting of the engine is carried out through the operations of step S2212 to step S2222. In step S2212, the fuel pump 32 operates to start raising the pressure of the liquid fuel, and the channel selector valve 114 is switched to the position in which the inlet port connected to the fuel circulation line 78 is opened. As a result, high-pressure liquid fuel, whose pressure has been raised by the fuel pump 32, returns to the fuel supply line 34 through the fuel circulation line 78, and thus circulates in a fuel circulation system that consists of the fuel supply line 34 and the fuel circulation line 78. The flow rate of the fuel delivered from the fuel pump 32 during circulation of the fuel is set to a predetermined circulation-time flow rate.

In step S2214, the water pump 82 and the hydrogen-producing device 90 operate to carry out a hydrogen producing process in accordance with the required amount of hydrogen to be added. In the next step S2216, the hydrogen gas produced by the hydrogen-producing device 90 is fed to the micro-bubble producing device 92, which in turn forms the hydrogen gas into micro-bubbles and mixes the micro-bubbles into the liquid fuel circulating in the circulation system. By mixing the hydrogen gas in the form of micro-bubbles into the circulating liquid fuel, the hydrogen gas produced prior to starting of the engine 2 can be stored in the liquid fuel.

After hydrogen gas is added to the liquid fuel through the operations of step S2212 to step S2216 as described above, engine starting control for starting the engine 2 is carried out in step S2218. In the engine starting control, the power dividing mechanism 100 is operated to transmit a part of or the whole of the driving force of the motor 102 to the engine 2 via the power dividing mechanism 100. The engine 2 receiving the driving force of the motor 102 starts cranking, and the hydrogen-blended fuel is then injected from the in-cylinder injector 18, thereby to start the engine 2.

After implementation of the engine starting control, it is determined in step S2220 whether starting of the engine 2 is completed. The ECU 50 can judge that starting is completed, for example, when the engine speed is raised up to a predetermined threshold speed. During starting of the engine 2 (i.e., until starting of the engine 2 is completed), the channel selector valve 114 is not switched to the normal position unless the pressure of the fuel is decreased below a predetermined level, and the liquid fuel is kept circulating in the circulation system.

When starting of the engine 2 is completed, step S2222 is executed. In step S2222, the channel selector valve 114 is switched back to the normal position so as to stop circulation of the liquid fuel, and the normal fuel supply system is re-established in which the fuel is supplied from the fuel tank 30 to the in-cylinder injector 18. Since the required amount of hydrogen gas has already been added to the liquid fuel in the fuel supply line 34, liquid fuel mixed with a sufficient amount of hydrogen gas can be injected from the in-cylinder injector 18 immediately after the fuel injection is started.

Upon completion of starting of the engine 2, the engine-start request flag is switched from ON to OFF. As a result, a negative decision (NO) is obtained in step S2206 in the next cycle of the routine of FIG. 21A. In this case, hydrogen addition control during engine operation is carried out through the operations of steps S2208 and S2210. In step S2208, the hydrogen-producing device 90 carries out a hydrogen producing process in accordance with the required amount of hydrogen to be produced. The hydrogen gas produced by the hydrogen-producing device 90 is then fed to the micro-bubble producing device 92, which in turn forms the hydrogen gas into micro-bubbles and mixes the micro-bubbles into the liquid fuel in step S2210. By supplying the engine 2 with the liquid fuel mixed with hydrogen gas, it is possible to readily suppress knocking during high-load engine operations, thus allowing the engine 2 to operate at a high efficiency, for example, with the ignition timing advanced. It is also possible to readily suppress or prevent misfire or combustion variations during low-load engine operations, thus allowing the engine 2 to operate in an expanded lean-burn region.

According to the hydrogen addition control routine as described above, hydrogen gas is produced by the hydrogen-producing device 90 prior to starting of the engine 2 while the vehicle is running with the driving force of the motor 102, and the hydrogen gas thus produced is mixed into the circulating liquid fuel, so that the liquid fuel blended with the hydrogen gas can be supplied to the in-cylinder injector 18 from the beginning upon start of fuel injection. Furthermore, since the hydrogen gas is mixed in the form of micro-bubbles into the liquid fuel, dissolution of the hydrogen gas into the liquid fuel is promoted, and liquid fuel having a high amount of hydrogen gas can be supplied. In the drive system of the hybrid vehicle according to the eighth embodiment, the engine 2 can realize stable combustion due to addition of hydrogen gas from the beginning of the operation of the engine 2, namely, immediately after the engine 2 is started, and is thus allowed to operate at a considerably lean air/fuel ratio, or operate with the ignition timing largely retarded so as to quickly raise the temperature of the catalyst 20.

In addition, according to the hydrogen addition control routine as described above, hydrogen gas is produced from water immediately before the engine 2 is started, and the hydrogen gas thus produced is stored in the form of micro-bubbles in the circulating liquid fuel. Thus, the drive system of the hybrid vehicle of this embodiment does not require a tank for accommodating gaseous hydrogen gas, thus assuring a reduced manufacturing cost and increased easiness or efficiency with which the driven system is installed on the vehicle.

Modified Examples of Seventh and Eighth Embodiments

The seventh and eighth embodiments as illustrated above may be modified, for example, in the manners as described below.

While the in-cylinder injector 18 that injects fuel directly into the combustion chamber 10 is provided as a fuel injection device in the engine shown in FIG. 18, a port injector that injects fuel into the intake port may be used in place of the in-cylinder injector 18. While the engine shown in FIG. 18 is a gasoline engine, the invention may also be applied to a diesel engine.

While the hybrid vehicle as shown in FIG. 20 is capable of running by using one or both of the engine 2 and the motor 102, the invention may be applied to other types of hybrid vehicles provided that the vehicle is capable of running by using at least the motor 102. Namely, the engine 2 may be used exclusively for generating electric power.

While the invention has been described with reference to the illustrated embodiments, it is to be understood that the invention is not limited to the exemplary embodiments or constructions, but may be otherwise embodied with various changes, modifications or equivalent arrangements, without departing from the spirit and scope of the invention.

The invention claimed is:

1. A hydrogen-using internal combustion engine, comprising:
   a fuel injection device that injects a liquid fuel, and
   a fuel supplying device that supplies the fuel injection device with a hydrogen-blended fuel as the liquid fuel, in which hydrogen gas is contained in the form of minute bubbles in a liquid hydrocarbon fuel.

2. A hydrogen-using internal combustion engine as defined in claim 1, wherein the fuel supplying device comprises a fuel tank in which the hydrogen-blended fuel is stored, and a mixing device that forms hydrogen gas that has escaped from the hydrogen-blended fuel in the fuel tank into minute bubbles and mixes the minute bubbles of the hydrogen gas back into the hydrogen-blended fuel.

3. A hydrogen-using internal combustion engine as defined in claim 2, wherein the mixing device mixes the escaped hydrogen gas back into the hydrogen-blended fuel during supply of the hydrogen-blended fuel to the fuel injection device, in a fuel supply passage that connects the fuel tank with the fuel injection device.

4. A hydrogen-using internal combustion engine as defined in claim 2, wherein the mixing device mixes the escaped hydrogen gas back into the hydrogen-blended fuel circulating in a fuel circulation passage through which the hydrogen-blended fuel delivered from the fuel tank returns to the fuel tank.

5. A hydrogen-using internal combustion engine as defined in claim 1, wherein the fuel supplying device comprises a fuel tank in which the liquid hydrocarbon fuel is stored, a hydrogen producing device that produces hydrogen gas from the hydrocarbon fuel in the fuel tank, and a mixing device that forms the hydrogen gas produced from the hydrocarbon fuel into minute bubbles and mixes the minute bubbles of the hydrogen gas into the hydrocarbon fuel.

6. A hydrogen-using internal combustion engine as defined in claim 5, wherein the mixing device mixes the hydrogen gas produced from the hydrocarbon fuel into the hydrocarbon fuel during supply of the hydrogen-blended fuel to the fuel injection device, in a fuel supply passage that connects the fuel tank with the fuel injection device.

7. A hydrogen-using internal combustion engine as defined in claim 5, wherein the mixing device mixes the hydrogen gas produced from the hydrocarbon fuel into the hydrocarbon fuel that is circulating in a fuel circulation passage through which the hydrocarbon fuel delivered from the fuel tank returns to the fuel tank.

8. A hydrogen-using internal combustion engine as defined in claim 5, further comprising a regenerating system that recovers deceleration energy of a vehicle to provide electric energy, wherein the hydrogen-producing device produces hydrogen gas from the hydrocarbon fuel by utilizing the deceleration energy recovered by the regenerating device.

9. A hydrogen-using internal combustion engine as defined in claim 1, wherein:
   the fuel supplying device comprises a storage device that accommodates a liquid hydride, a hydrogen producing device that produces hydrogen gas from the liquid hydride stored in the storage device, and a hydrogen mixing device that mixes the hydrogen gas produced by the hydrogen producing device into the liquid fuel supplied to the fuel injection device;
   a controller is provided for determining whether it is necessary to supply hydrogen gas to the internal combustion engine, and to activate the hydrogen producing device and the hydrogen mixing device when it is determined that it is necessary to supply hydrogen gas to the internal combustion engine.

10. A hydrogen-using internal combustion engine as defined in claim 9, wherein the hydrogen mixing device produces minute bubbles of the hydrogen gas, and mixes the minute bubbles of the hydrogen gas into the liquid fuel.

11. A hydrogen-using internal combustion engine as defined in claim 9, wherein the controller determines whether it is necessary to supply the hydrogen gas to the internal combustion engine, based on operating conditions of the engine.

12. A hydrogen-using internal combustion engine as defined in claim 9, wherein the controller determines whether it is necessary to supply the hydrogen gas to the internal combustion engine, based on the properties of the liquid hydrocarbon fuel.

13. A hydrogen-using internal combustion engine as defined in claim 9, wherein the controller determines whether it is necessary to supply the hydrogen gas to the internal combustion engine, based on atmospheric conditions.

14. A hydrogen-using internal combustion engine as defined in claim 9, wherein the controller determines whether it is necessary to supply the hydrogen gas to the internal combustion engine, based on conditions of a catalyst disposed in an exhaust passage of the internal combustion engine.

15. A hydrogen-using internal combustion engine as defined in claim 9, the controller determines a required amount of hydrogen to be mixed into the liquid fuel when it is determined that it is necessary to supply the hydrogen gas to the internal combustion engine, wherein the controller causes the hydrogen-producing device to produce hydrogen gas in accordance with the required amount of hydrogen.

16. A hydrogen-using internal combustion engine as defined in claim 15, wherein the controller determines the required amount of hydrogen to be mixed, based on operating conditions of the internal combustion engine.

17. A hydrogen-using internal combustion engine as defined in claim 15, wherein the controller determines the required amount of hydrogen to be mixed, based on the properties of the liquid hydrocarbon fuel.

18. A hydrogen-using internal combustion engine as defined in claim 15, wherein the controller determines the required amount of hydrogen to be mixed, based on atmospheric conditions.

19. A hydrogen-using internal combustion engine as defined in claim 15, wherein the controller determines the required amount of hydrogen to be mixed, based on conditions of a catalyst disposed in an exhaust passage of the internal combustion engine.

20. A control system of a hybrid vehicle including the hydrogen-using internal combustion engine of claim 14 and a motor, the hybrid vehicle using at least the motor for driving the vehicle, wherein:
   when the controller determines that it is necessary to supply the hydrogen gas to the internal combustion engine, the motor forces the engine to rotate while combustion is stopped in the engine, and the hydrogen-producing device and the hydrogen mixing device are operated so that the hydrogen-blended fuel is injected from the fuel injection device.

21. A hydrogen-using internal combustion engine as defined in claim 1, wherein:
   the fuel supplying device comprises a fuel tank in which the liquid fuel is stored, the hydrogen producing device that produces hydrogen gas from a liquid hydride by using electric energy, and the hydrogen mixing device that mixes the hydrogen gas produced by the hydrogen producing device into the liquid fuel supplied from the fuel tank to the fuel injection device;

a circulating device is provided for circulating the liquid fuel through the fuel tank and the hydrogen mixing device;

a regenerating system is provided for recovering deceleration energy of a vehicle to provide electric energy; and a controller is provided for activating the hydrogen-producing device to produce hydrogen gas by utilizing the deceleration energy recovered by the regenerating system and activating the hydrogen mixing device to mix the produced hydrogen gas into the liquid fuel while causing the circulating device to circulate the liquid fuel, when the deceleration energy is being recovered by the regenerating system and fuel injection by the fuel injection device is being stopped.

22. A hydrogen-using internal combustion engine as defined in claim 21, wherein the hydrogen mixing device produces minute bubbles of the hydrogen gas and mixes the minute bubbles of the hydrogen gas into the liquid fuel.

23. A hydrogen-using internal combustion engine as defined in claim 21, further comprising an ignition device that ignites an air-fuel mixture in a combustion chamber, wherein:

the controller inhibits the ignition device from igniting the air-fuel mixture and causes the fuel injection device to inject the hydrogen blended fuel when a condition for a reducing process for a catalyst provided in an exhaust passage of the engine is satisfied while the regenerating system is recovering the deceleration energy and the fuel injection device is otherwise stopped from injecting fuel.

24. A hydrogen-using internal combustion engine as defined in claim 21, wherein:

the fuel injection device is arranged to inject the liquid fuel directly into a combustion chamber; and the controller causes the fuel injection device to inject the liquid fuel in such timing that the injected fuel does not burn in the combustion chamber when a condition for a reducing process for a catalyst provided in an exhaust passage of the engine is satisfied while the regenerating system is recovering the deceleration energy and the fuel injection device is otherwise stopped from injecting fuel.

25. A hydrogen-using internal combustion engine as defined in claim 1, wherein:

the fuel supplying device comprises a fuel tank in which the liquid fuel is stored, a hydrogen producing device that produces hydrogen gas from a liquid hydride, and a hydrogen mixing device that mixes the hydrogen gas produced by the hydrogen producing device into the liquid fuel supplied from the fuel tank to the fuel injection device;

a circulating device is provided for circulating the liquid fuel through the fuel tank and the hydrogen mixing; device, and for activating the hydrogen-producing device to produce hydrogen gas and activating the hydrogen mixing device to mix the produced hydrogen gas into the liquid fuel while causing the circulating device to circulate the liquid fuel, prior to start of fuel injection by the fuel injection device, when the internal combustion engine is started or starting of the engine is predicted.

26. A hydrogen-using internal combustion engine as defined in claim 25, wherein the hydrogen mixing device produces minute bubbles of the hydrogen gas, and mixes the minute bubbles of the hydrogen gas into the liquid fuel.

* * * * *